(12) United States Patent
Singer

(10) Patent No.: US 11,872,961 B2
(45) Date of Patent: Jan. 16, 2024

(54) COLLAPSIBLE FOLDING TRUCK TRUNK

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 18/055,850

(22) Filed: Nov. 16, 2022

(65) Prior Publication Data

US 2023/0079942 A1 Mar. 16, 2023

Related U.S. Application Data

(63) Continuation of application No. 17/089,391, filed on Nov. 4, 2020, now Pat. No. 11,529,909, which is a continuation-in-part of application No. 16/432,065, filed on Jun. 5, 2019, now Pat. No. 11,007,949, which is a continuation of application No. 15/796,643, filed
(Continued)

(51) Int. Cl.
| | |
|---|---|
| *B60R 9/06* | (2006.01) |
| *B62D 33/023* | (2006.01) |
| *B60P 3/42* | (2006.01) |
| *B60R 11/06* | (2006.01) |
| *B60J 7/16* | (2006.01) |
| *B60P 7/14* | (2006.01) |

(Continued)

(52) U.S. Cl.
CPC ............ *B60R 9/065* (2013.01); *B60J 7/1621* (2013.01); *B60P 1/6427* (2013.01); *B60P 3/42* (2013.01); *B60P 7/14* (2013.01); *B60R 11/06* (2013.01); *B62D 33/023* (2013.01); *B60R 9/06* (2013.01); *B62D 33/0273* (2013.01)

(58) Field of Classification Search
CPC ........... B60R 9/065; B60R 11/06; B60R 9/06; B62D 33/023; B62D 33/0273; B60P 3/42; B60P 1/6427; B60P 7/14; B60J 7/1621
See application file for complete search history.

(56) References Cited

U.S. PATENT DOCUMENTS

| | | |
|---|---|---|
| 4,749,226 A | 6/1988 | Heft |
| 5,088,636 A | 2/1992 | Barajas |

(Continued)

OTHER PUBLICATIONS

BAKFlip Tonneau Covers.com—Home (online), Amazing Truck Accessories LP, Retrieved on Feb. 8, 2016, Retrieved from the internet <URL: http://www.bakfliptonneaucover.com/home>.
(Continued)

*Primary Examiner* — Dennis H Pedder
*Assistant Examiner* — Melissa Ann Bonifazi
(74) *Attorney, Agent, or Firm* — KOS IP Law LLP

(57) ABSTRACT

A collapsible trunk for use with a vehicle having a wheel well. The trunk comprises a base wall and a side wall pivotally connected thereto. The side wall extends from the base wall and terminates at an upper edge. The side wall and base wall collectively define a storage cavity. The base wall and the side wall each have an expandable portion conformable to the wheel well in response to placement of the base wall and the side wall over the wheel well. The trunk is selectively transitional between a collapsed configuration and a deployed configuration. In the collapsed configuration, the base panels overlap each other, and in the deployed configuration, the plurality of base panels are co-planar to each other. The upper edge of the side wall moves away from the base wall as the trunk transitions from the collapsed configuration toward the deployed configuration.

15 Claims, 60 Drawing Sheets

Related U.S. Application Data on Oct. 27, 2017, now Pat. No. 10,343,616, which is a continuation of application No. 15/666,450, filed on Aug. 1, 2017, now Pat. No. 9,827,916, which is a continuation-in-part of application No. 15/397,916, filed on Jan. 4, 2017, now Pat. No. 9,751,469, which is a continuation of application No. 15/177,270, filed on Jun. 8, 2016, now Pat. No. 9,573,530, which is a continuation of application No. 15/046,203, filed on Feb. 17, 2016, now Pat. No. 9,566,915.

(60) Provisional application No. 62/930,548, filed on Nov. 4, 2019.

(51) Int. Cl.
*B60P 1/64* (2006.01)
*B62D 33/027* (2006.01)

(56) References Cited

U.S. PATENT DOCUMENTS

| | | | |
|---|---|---|---|
| 5,186,510 A | 2/1993 | Stapp | |
| 5,299,704 A | 4/1994 | Thorby | |
| 5,324,089 A | 6/1994 | Schlachter | |
| 5,853,116 A | 12/1998 | Schreiner | |
| 5,857,724 A | 1/1999 | Jarman | |
| 5,992,719 A | 11/1999 | Carter, III | |
| 6,116,673 A | 9/2000 | Clonan | |
| 6,170,724 B1 | 1/2001 | Carter | |
| 6,174,012 B1 | 1/2001 | Saffold | |
| 6,257,640 B1 | 7/2001 | Leitner | |
| 6,325,439 B1 | 12/2001 | Crossman | |
| 6,401,995 B1 | 6/2002 | Yuille | |
| 6,464,277 B2 | 10/2002 | Wilding | |
| 6,507,701 B2 | 1/2003 | Lake | |
| 6,536,826 B1 | 3/2003 | Reed | |
| 6,557,918 B2 | 5/2003 | Iafrate | |
| 6,676,182 B2 | 1/2004 | Fitts | |
| D534,856 S | 1/2007 | Herrera | |
| 7,156,273 B2 | 1/2007 | Morris | |
| 7,234,618 B2 | 6/2007 | Warganich | |
| D586,123 S | 2/2009 | Lowrey | |
| 7,654,598 B2 | 2/2010 | Lietner | |
| 7,758,092 B2 | 7/2010 | Kolpasky | |
| 8,240,527 B1 * | 8/2012 | Casselton | B60R 9/065 224/404 |
| 8,544,708 B2 | 10/2013 | Maimin | |
| 8,701,950 B2 | 4/2014 | Roach | |
| 8,931,819 B2 | 1/2015 | Daniel | |
| D722,009 S | 2/2015 | Roach | |
| 8,960,756 B2 | 2/2015 | Roach | |
| 9,079,548 B1 | 7/2015 | Singer | |
| 9,566,915 B1 | 2/2017 | Singer | |
| 9,573,530 B1 | 2/2017 | Singer | |
| 9,751,469 B1 | 9/2017 | Singer | |
| 9,827,916 B1 | 11/2017 | Singer | |
| 10,343,616 B2 | 7/2019 | Singer | |
| 11,007,949 B2 | 5/2021 | Singer | |
| 11,529,909 B2 | 12/2022 | Singer | |
| 2002/0179600 A1 | 12/2002 | King | |
| 2002/0190536 A1 | 12/2002 | Getzschman | |
| 2003/0098591 A1 | 5/2003 | Leitner | |
| 2006/0091689 A1 | 5/2006 | Wilding | |
| 2006/0197352 A1 | 9/2006 | Bassett | |
| 2006/0266778 A1 | 11/2006 | Allotey | |
| 2007/0102949 A1 | 5/2007 | Andrews | |
| 2009/0250962 A1 | 10/2009 | Polewarczyk | |
| 2010/0264180 A1 | 10/2010 | Allotey | |
| 2012/0181810 A1 | 7/2012 | Alvarino | |
| 2012/0248817 A1 | 10/2012 | Miller | |
| 2015/0048129 A1 | 2/2015 | Wilson | |

OTHER PUBLICATIONS

Tuck Covers USA.com—Roll Cover Features Webpage(online), Truck Covers USA, Retrieved on Feb. 8, 2016, Retrieved from the internet <URL: http://www.truckcoverusa.com/roll-cover-features/>.

* cited by examiner

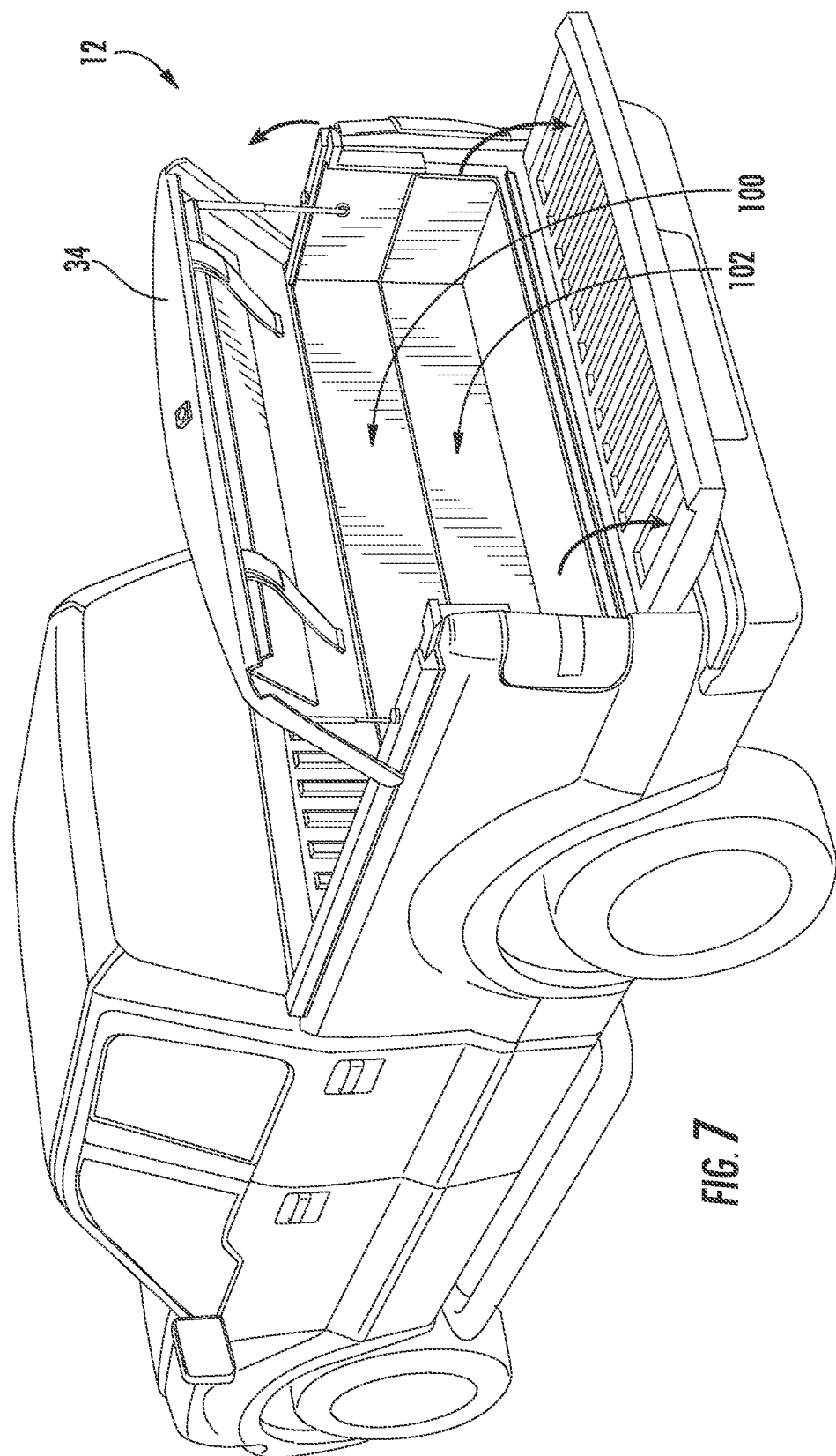

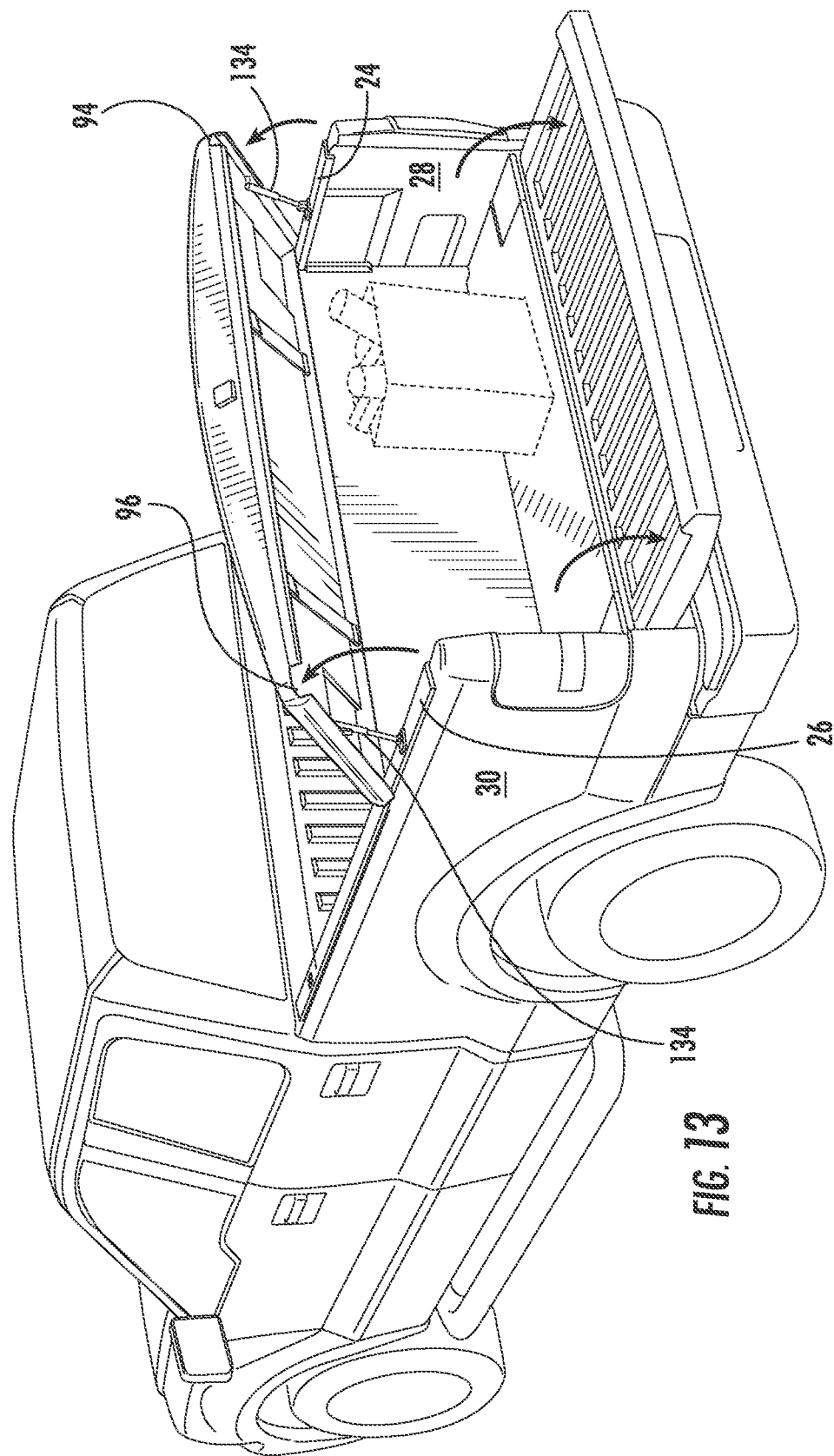

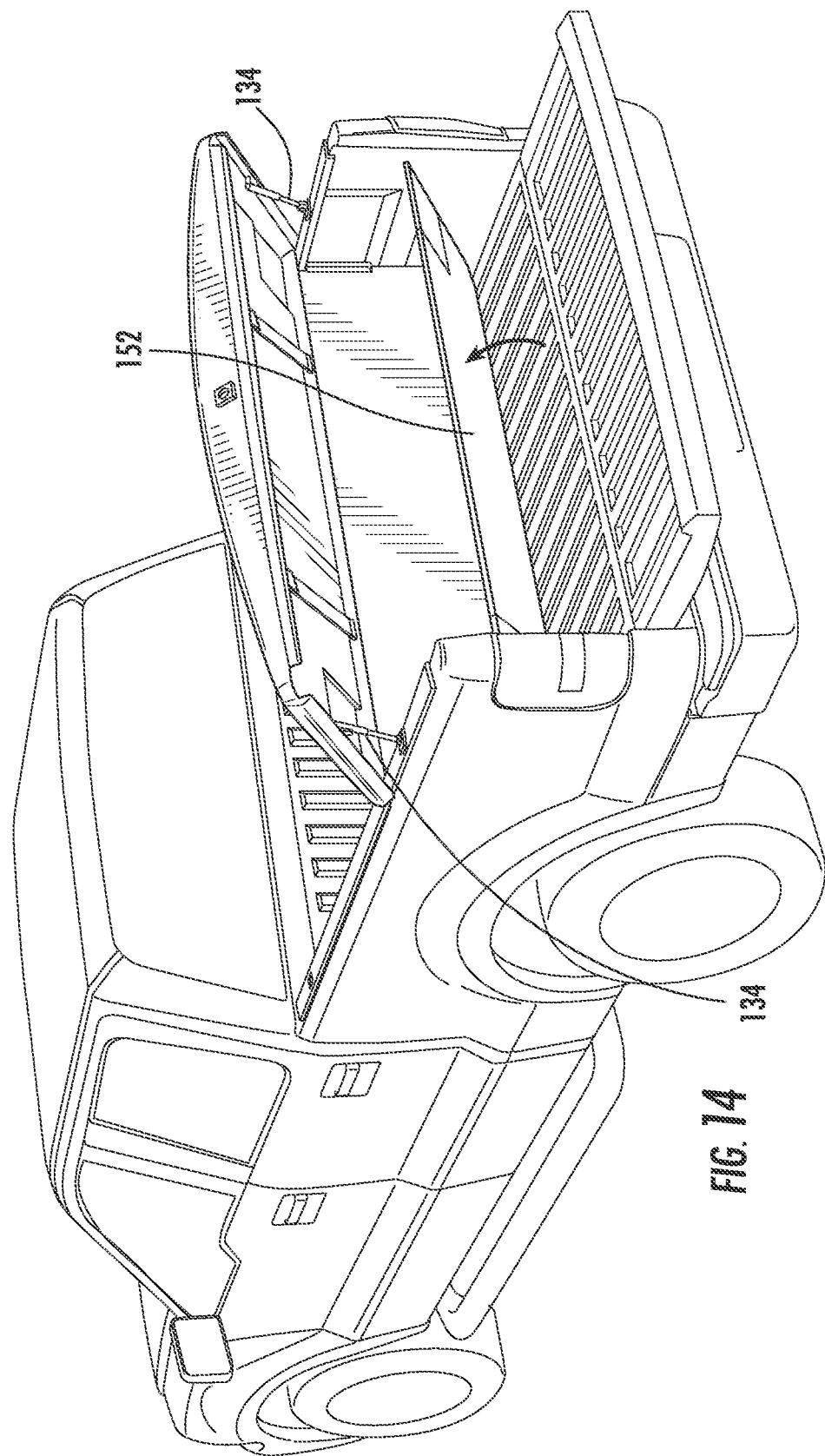

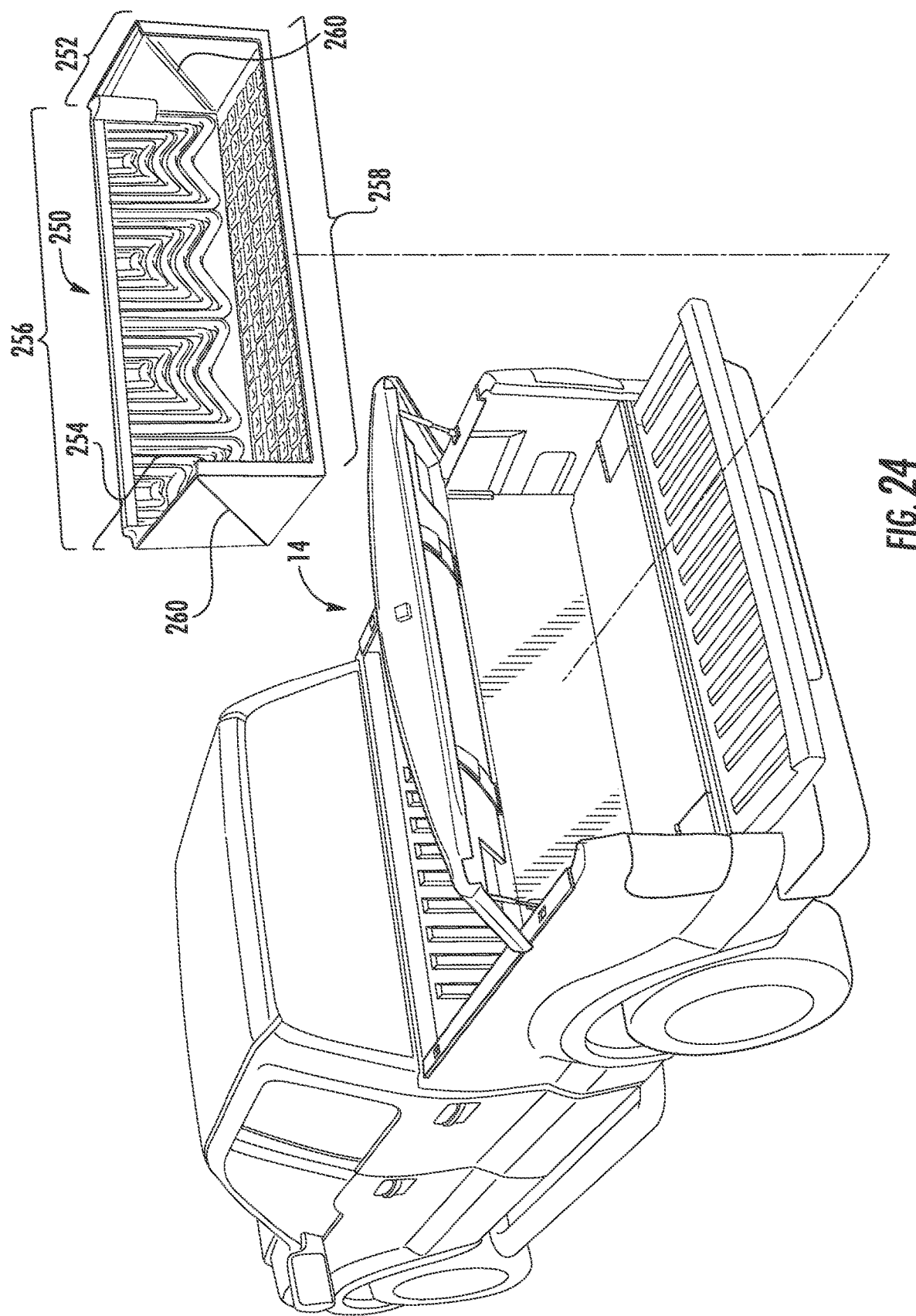

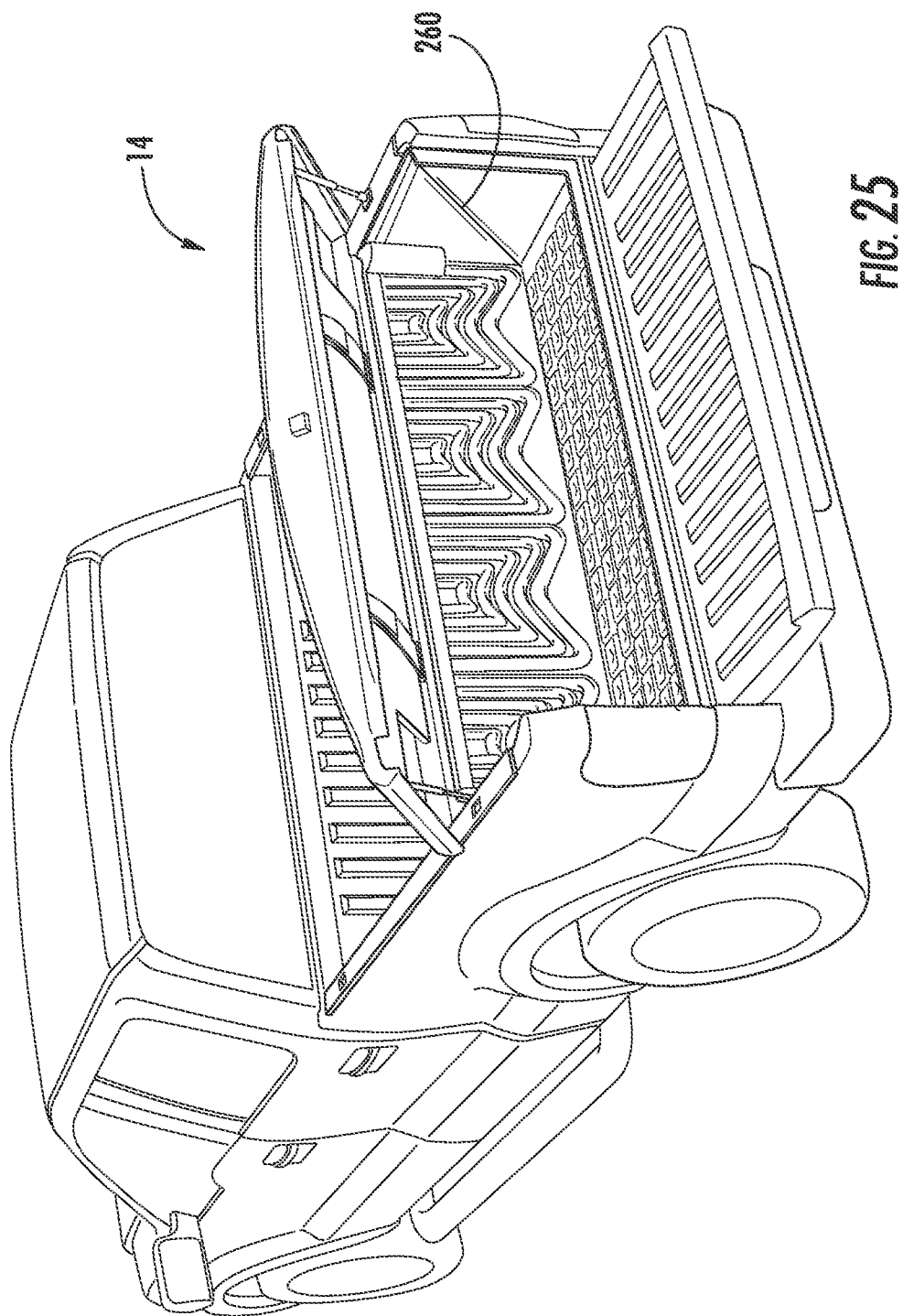

COLLAPSIBLE FOLDING TRUCK TRUNK

CROSS-REFERENCE TO RELATED APPLICATIONS

This application is a continuation application of U.S. patent application Ser. No. 17/089,391, filed on 2020 Nov. 4, which claims priority to Prov. Pat. App. Ser. No. 62/930,548, filed on 2019 Nov. 4 and is a continuation in part application of U.S. patent application Ser. No. 16/432,065, filed on 2019 Jun. 5, now U.S. patent Ser. No. 11/007,949, which is a continuation application of U.S. patent application Ser. No. 15/796,643, filed on 2017 Oct. 27, now U.S. patent Ser. No. 10/343,616, which is a continuation application of U.S. patent application Ser. No. 15/666,450, filed on 2017 Aug. 1, now U.S. Pat. No. 9,827,916, which is a continuation-in-part patent application of U.S. patent application Ser. No. 15/397,916, filed on 2017 Jan. 4, now U.S. Pat. No. 9,751,469, which is a continuation of U.S. patent application Ser. No. 15/177,270 filed on 2016 Jun. 8, now U.S. Pat. No. 9,573,530, which is a continuation of U.S. patent application Ser. No. 15/046,203 filed on 2016 Feb. 17, now U.S. Pat. No. 9,566,915 which relates to the U.S. patent application Ser. No. 14/656,476, filed on Mar. 12, 2015, and now U.S. Pat. No. 9,079,548, the entire contents of all the foregoing being expressly incorporated herein by reference.

STATEMENT RE: FEDERALLY SPONSORED RESEARCH/DEVELOPMENT

Not Applicable

BACKGROUND

The various embodiments and aspects described herein relate to a trunk for a bed of a truck.

Trucks are typically used to haul material in its bed area from one location to another. However, truck beds have become accessorized so that the truck bed can be used for a variety of uses and more than merely hauling material. By way of example and not limitation, truck beds can be retrofitted with toolboxes, tonneau covers, shells and other accessories that bring additional functionality to truck beds. Unfortunately, these solutions are fixed in that once installed, the user typically does not remove these accessories. Also, if the user needed to remove these accessories from the truck bed, an extended period of time and great strength would be required in order to reconfigure the truck bed between different accessories.

Accordingly, there is a need in the art for an improved accessory for bringing additional functionality to a truck bed.

BRIEF SUMMARY

A trunk for a bed of a truck is disclosed herein. The trunk may have various configurations including but not limited to a first embodiment wherein the trunk is traversable between front and back positions, a second embodiment wherein the trunk is telescoping in addition to being traversable between the front and back positions and a third embodiment wherein the trunk is collapsible in addition to being traversable between the front and back positions. The trunk may provide an isolated enclosed area so that a user may place objects in the trunk, isolated from soiled surfaces of the truck bed. The trunk may also be traversed between front and back positions by someone without great strength and also configured so that the user may use the full length of the bed of the truck.

A fourth embodiment involves the trunk that is used in combination with a tonneau cover. The trunk of the fourth embodiment may be traversed between front and back positions as well as have partitions that may be repositioned to enlarge or reduce the size of a trunk space of the fourth embodiment of the trunk.

More particularly, a trunk for a bed of a truck is disclosed. The trunk may comprise an enclosure, left and right rails and a back cover. The enclosure may have a top traversable between a lowered closed position and a raised opened position. The left and right rails may be attached to left and right sidewalls of the truck bed and operative to secure the enclosure at a first position wherein a tailgate of the truck bed forms a back wall of the enclosure when the tailgate is in an up position and a second position adjacent to a front wall of the truck bed. The back cover may be attached to a back side of the enclosure when the enclosure is traversed to the second position to form the back wall of the enclosure.

The trunk may further comprise support arms that may be pivotally attached to the left and right sidewalls of the enclosure and the top cover for holding the top cover in the raised open position. The support arms may be pivotally attached to the left and right rails or the left and right sidewalls of the enclosure.

The enclosure may have a front wall attached to the left and right sidewalls and a bottom wall attached to the front wall and the left and right sidewalls. The back cover may be attached to an underside of the top cover when the enclosure is traversed to the first position and attached to the left and right sidewalls and bottom wall when the enclosure is traversed to the second position.

The back cover may form the back wall. The front wall and the left and right sidewalls may have a stepped configuration to accommodate wheel wells of the truck bed so that the enclosure is traversable between the first and second positions by sliding the enclosure horizontally between the first and second positions.

The front wall may be pivoted with respect to the top cover. The bottom wall may be pivoted to the front wall. The front and bottom walls may be pivoted to a position under the top cover and parallel thereto for traversing the enclosure between the first and second positions.

The left and right sidewalls and the front wall may have upper and lower halves that telescope with respect to each other between an up position and a down position. The enclosure may slide horizontally between the first and second positions on the truck bed when the lower half is in the up position.

A vertical height of the back cover may be about equal to a vertical height of the left and right sidewalls when the left and right sidewalls are in the up position.

The left and right rails may have a first part of a male/female connection extending along a length of the rails. The left and right sidewalls of the enclosure may have a second part of the male/female connection wherein the second part slides against the first part as the enclosure is traversed between the first and second positions. The male/female connection may have a detent mechanism to maintain the enclosure in the first or second positions.

The trunk may further comprise a locking mechanism that traverses left and right bars under the left and right rails to prevent the top cover from inadvertently traversing to the raised open position.

The trunk may further comprise a protective liner. The protective liner may have a plurality of reliefs on a front wall and left and right sidewalls of the protective liner to allow a user to compress the protective liner during insertion or removal of the protective liner from within the enclosure.

In another aspect, a storage compartment for a bed of a truck configurable into two or more positions for providing a versatile storage solution is disclosed. The system may comprise a left rail, a right rail, a top cover and a plurality of panels. The left rail may be secured to a left sidewall of the truck bed. The right rail may be secured to a right sidewall of the truck bed. The top cover may be pivotally attached to the left and right rails at either a first position or a second position. The first position may be closer to a tailgate of the truck bed compared to the second position. The plurality of panels may be deployed so as to define a storage volume with either the tailgate when the top cover is in the first position or with a back wall when the top cover is in the second position and the sidewalls of the truck bed.

The top cover may have a latching mechanism traversable between a locked position and an opened position. In the locked position, locking bars extend laterally outward so that opposed distal end portions of the latching mechanism are disposed under lips of the left and right sidewalls of the truck bed or the left and right rails.

In a different aspect, a method of reconfiguring a trunk attached to a bed of a truck is disclosed. The method may comprise the steps of unlocking the trunk so that the trunk is operative to be horizontally slid to first or second positions, a tailgate of the truck bed forming a part of an enclosed space of the trunk when the trunk is in the first position, the trunk being closer to a cab of the truck when the trunk is in the second position; sliding the trunk to the second position; attaching a back wall of the trunk to form the enclosed space; locking the trunk to the second position; and pivoting a cover of the trunk to an up position so that a full length of the truck bed is available for use.

The method may further comprise a step of collapsing upper and lower telescoping sections of the trunk. The collapsing step may include the step of lifting the lower section into the upper section.

The method may further comprise a step of pivoting a bottom wall and a front wall upon each other under a cover of the trunk.

The sliding step may include a step of traversing a tongue of the trunk within elongate grooves of rails attached to left and right sidewalls of the bed of the truck.

In another aspect, a truck with a truck bed convertible into a trunk is disclosed. The truck may comprise the truck bed, a tonneau cover, a driver side rail, a passenger side rail and a trunk. The truck bed may define a front wall, a passenger side sidewall, a driver side sidewall and a tailgate pivotable between an opened position and a closed position. The tonneau cover may be pivoted and attached to a forward portion of the truck bed closer to the front wall than the tailgate. The tonneau cover may be pivoted between an opened up position and a closed down position. The driver side rail may be attached to and extend horizontally along the driver side sidewall. The passenger side rail may be attached to and extend horizontally along the passenger side sidewall. The trunk may extend across a width of the truck bed and be slidably attached to the driver side and passenger side rails so that the trunk is slidable along a length of the bed and securable in at least two different positions.

The trunk may define an upper edge that is vertically higher than a lower edge of the tonneau cover so that rain cascades down the tonneau cover and over the trunk. Alternatively, the trunk may define an upper edge below a lower edge of the tonneau cover.

The trunk may have stepped side walls to accommodate wheel wells protruding into the truck bed. The trunk may have a rear wall with an opening and a selectively positionable panel. The trunk may have first and second sets of slots. The first set of slots may be formed in between the front wall of the trunk and the rear wall. The second set of slots may be formed near the rear wall to close the opening of the rear wall. The trunk may be fabricated from a rigid or resilient material.

The tonneau cover may extend from the front wall to the tailgate to cover the entire truck bed.

The driver side rail and the passenger side rail may be attached to interior sides of the driver side sidewall and the passenger side sidewall.

Opposed sides of the trunk may be received into the driver side and passenger side rails so that the trunk may be traversed horizontally within the truck bed.

According to yet another aspect, there is provided a collapsible folding truck trunk for use with a vehicle including a storage area having a wheel well extending into the storage area is disclosed. The collapsible folding truck trunk comprises a base wall including a plurality of base panels pivotally connected to each other, and a side wall pivotally connected to the base wall. The side wall extends from the base wall and terminates at an upper edge. The side wall and base wall collectively define a storage cavity. The base wall and the side wall each have an expandable portion conformable to the wheel well in response to placement of the base wall and the side wall over the wheel well. The collapsible folding truck trunk is selectively transitional between a collapsed configuration and a deployed configuration. In the collapsed configuration, the plurality of base panels overlap each other, and in the deployed configuration, the plurality of base panels are co-planar to each other. The upper edge of the side wall moves away from the base wall as the collapsible folding truck trunk transitions from the collapsed configuration toward the deployed configuration.

The expandable portion of the base wall and the side wall may be comprised of an elastic sheet.

Each of the plurality of base panels may be of a quadrangular configuration.

The side wall may be comprised of plurality of side wall panels. The side wall may extend around the base wall. The side wall may include a cutout formed therein, with the cutout extending from the upper edge and toward the base wall.

The collapsible folding truck trunk may additionally include a divider selectively engageable with the base wall to divide the storage cavity into two discrete regions. The collapsible folding truck trunk may further comprise a hook and loop fastener coupled to the divider and the base wall for facilitating selective engagement between the divider and the base wall.

The collapsible folding truck trunk may include a cover engageable with the side wall to extend over the storage cavity. The cover may be engageable with the side wall via a zipper.

In still a further embodiment, there is provided a collapsible folding truck trunk for use in a truck bed having a wheel well and a rear end. The collapsible folding truck trunk includes a base wall comprised of a plurality of base panels pivotally connected to each other, and a side wall pivotally connected to the base wall. The side wall extends from the base wall and terminates at an upper edge, with the side wall and base wall collectively defining a storage cavity. The collapsible folding truck trunk is selectively transitional between a collapsed configuration and a deployed configuration. In the collapsed configuration, the plurality of base panels overlap each other, and in the deployed configuration, the plurality of base panels are co-planar to each other. The upper edge of the side wall moves away from the base wall as the collapsible folding truck trunk transitions from the collapsed configuration toward the deployed configuration. The collapsible folding truck trunk is sized and structured to be placeable between the wheel well and the rear end of the truck bed when the collapsible folding truck trunk is in the deployed configuration.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7 illustrates the trunk with the lid and the tailgate in the open position;

FIG. 13 illustrates the trunk with the lid and the tailgate in the open position;

FIG. 14 illustrates a bottom panel being folded upward to traverse the trunk in an undeployed state;

FIG. 24 is an exploded perspective view of the third embodiment of the trunk and the trunk liner;

FIG. 25 illustrates the trunk liner inserted into the trunk shown in FIG. 24;

DETAILED DESCRIPTION

Figure 1:
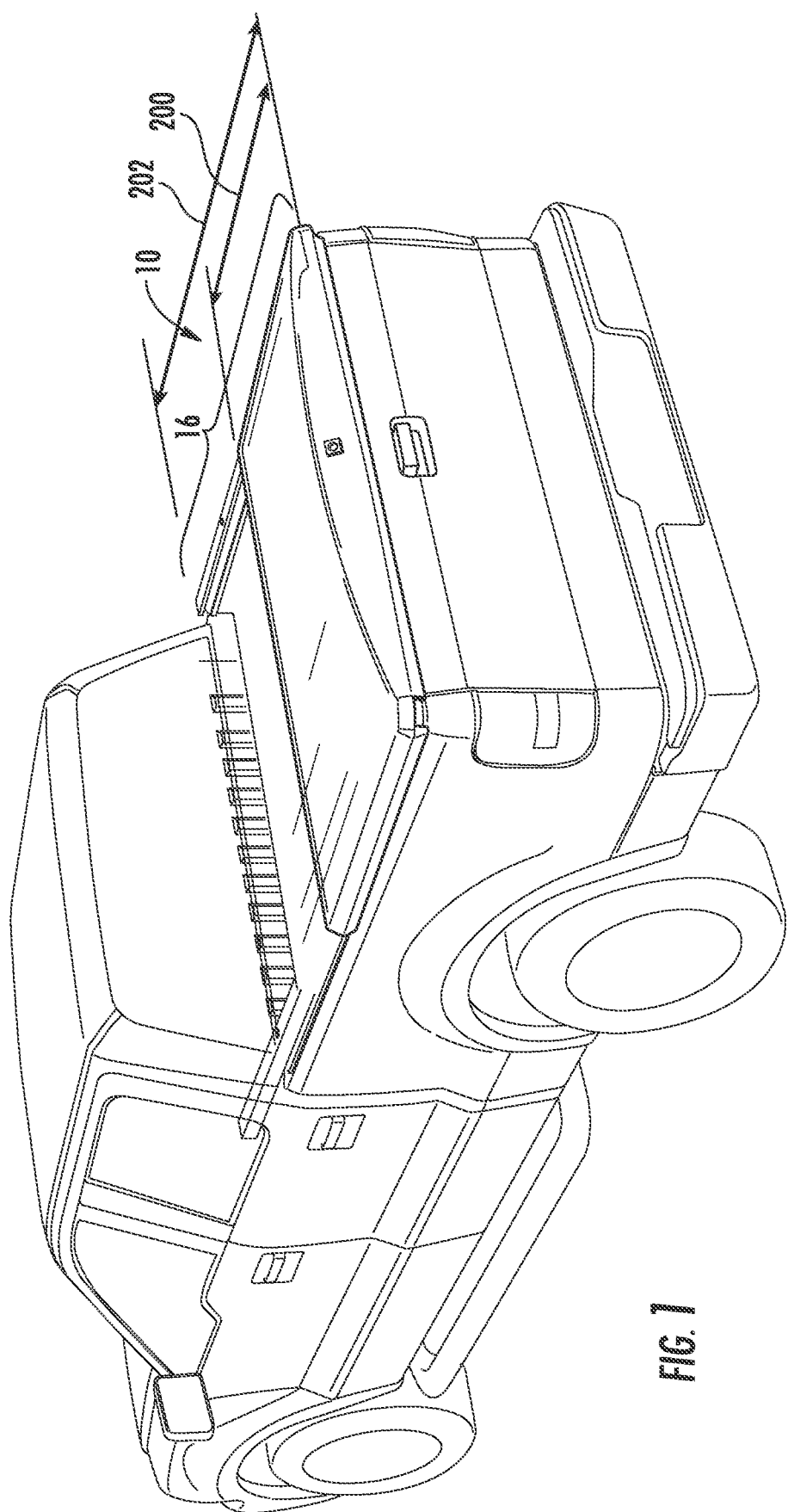
FIG. 1 illustrates a first embodiment of the trunk traversed to a back position.

Referring now to the drawings, a trunk 10, 12, 14, 300, 436, 536 for a bed 16 of the truck 18 is shown in FIGS. 2A, 7A 13A, 28, 38, and 39. The trunk 10, 12, 14, 300, 436, 536 provides an isolated space within the bed 16 of the truck 18 in that various panels of the trunk 10, 12, 14, 300, 436, 536 provide a barrier from surfaces of the bed 16 of the truck 18 so that objects (e.g., groceries) may be placed in the trunk 10, 12, 14, 300, 436, 536 and protected from dirt on the surfaces of the bed 16 of the truck 18. The trunk 10, 12, 14 may be positioned in a back position, as shown in FIGS. 1, 6, 12 and 31. Alternatively, the trunk 10, 12, 14 may also be horizontally traversed to a front position as shown in FIGS. 5, 11, 20 and 28. The trunk 10, 12, 14, 300 may be easily traversed between the front and back positions so that great strength is not required to reconfigure the position of the trunk 10, 12, 14, 300 within the truck bed 16. Weaker people may reconfigure the trunk 10, 12, 14, 300 between the front and back positions without assistance or help from another person. Additionally, in both the front and back positions, the trunk 10, 12, 14, 300 may provide an enclosed space that may be locked to provide security for items placed within the enclosed space. Additionally, in FIGS. 27-32, the trunk 300 may comprise a tonneau cover 302 and a trunk 304.

Figure 2:
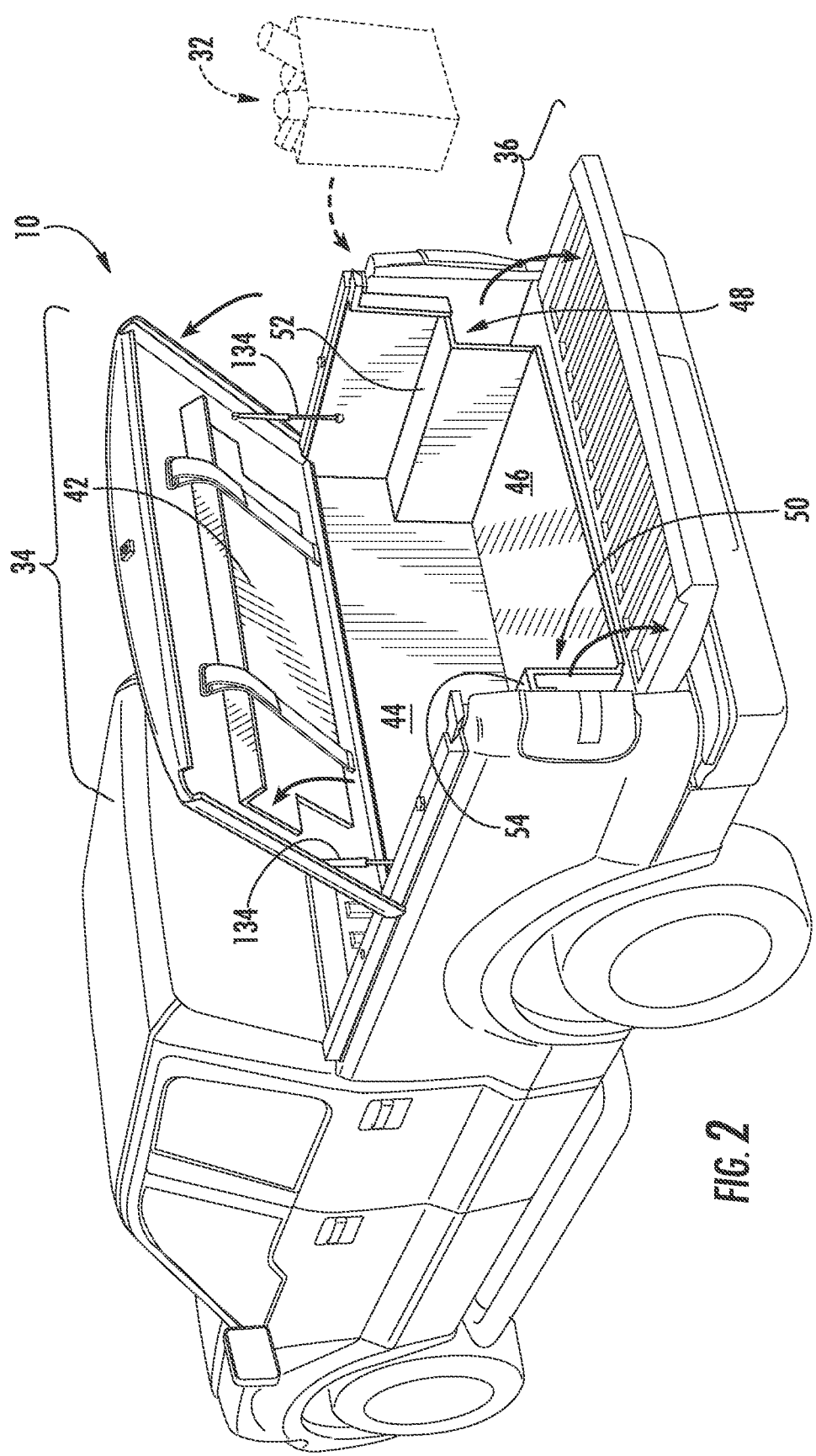
FIG. 2 illustrates the trunk with a lid and tailgate in an open position.
Figure 2A:
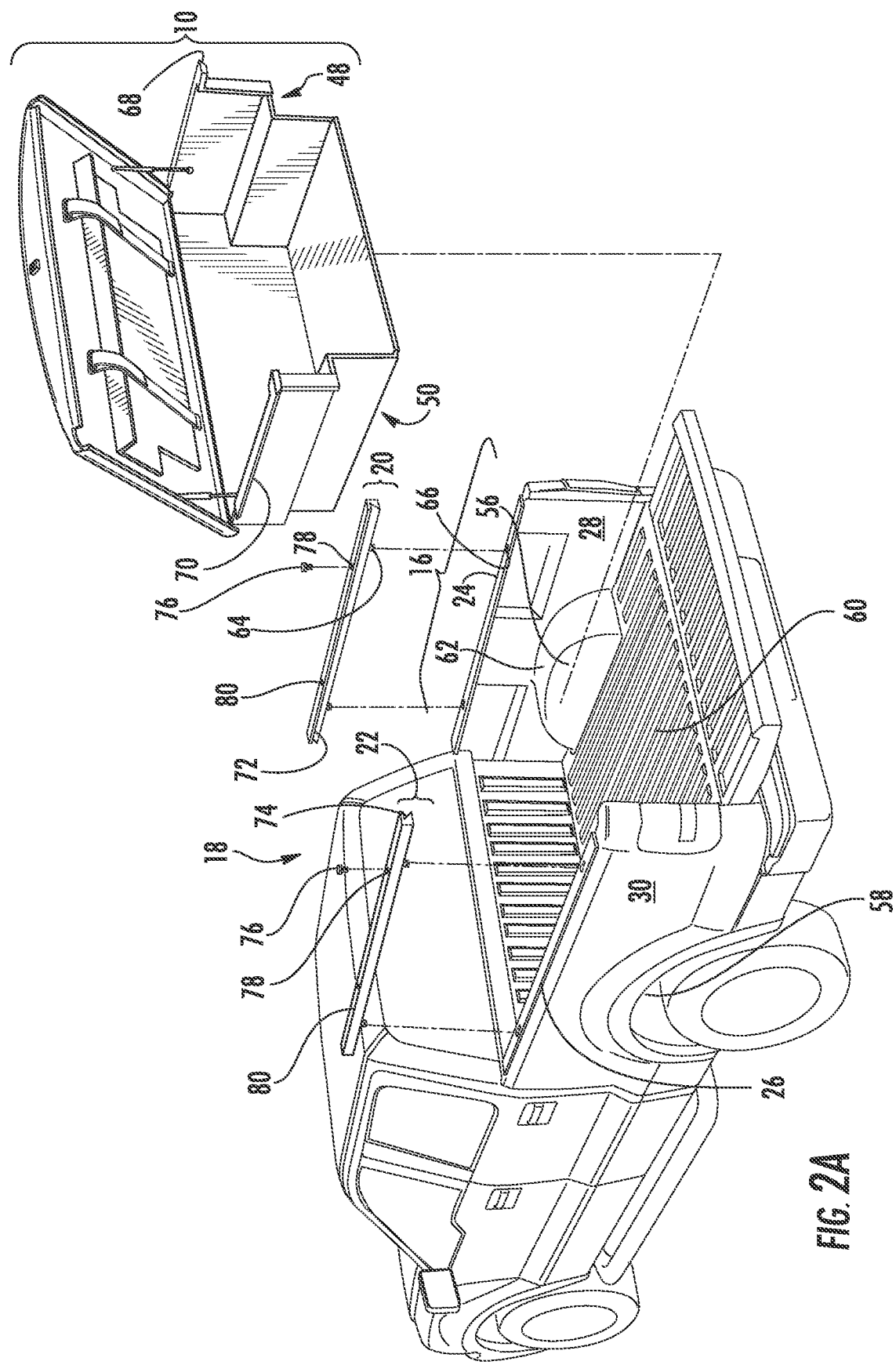
FIG. 2A illustrates an exploded view of the trunk shown in FIG. 2.
Figure 3:
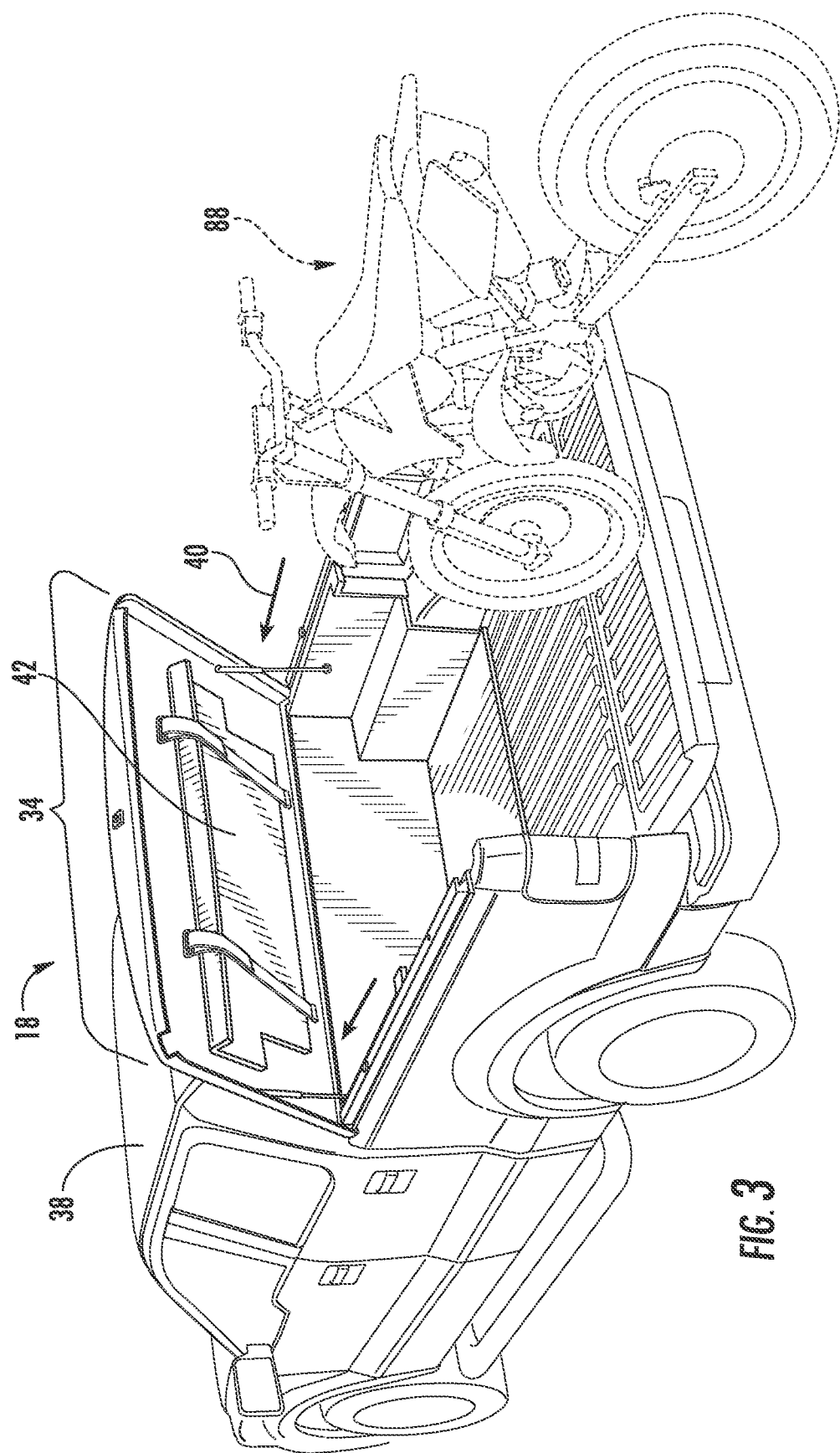
FIG. 3 illustrates the trunk traversed to a front position with the lid in the open position.
Figure 4:
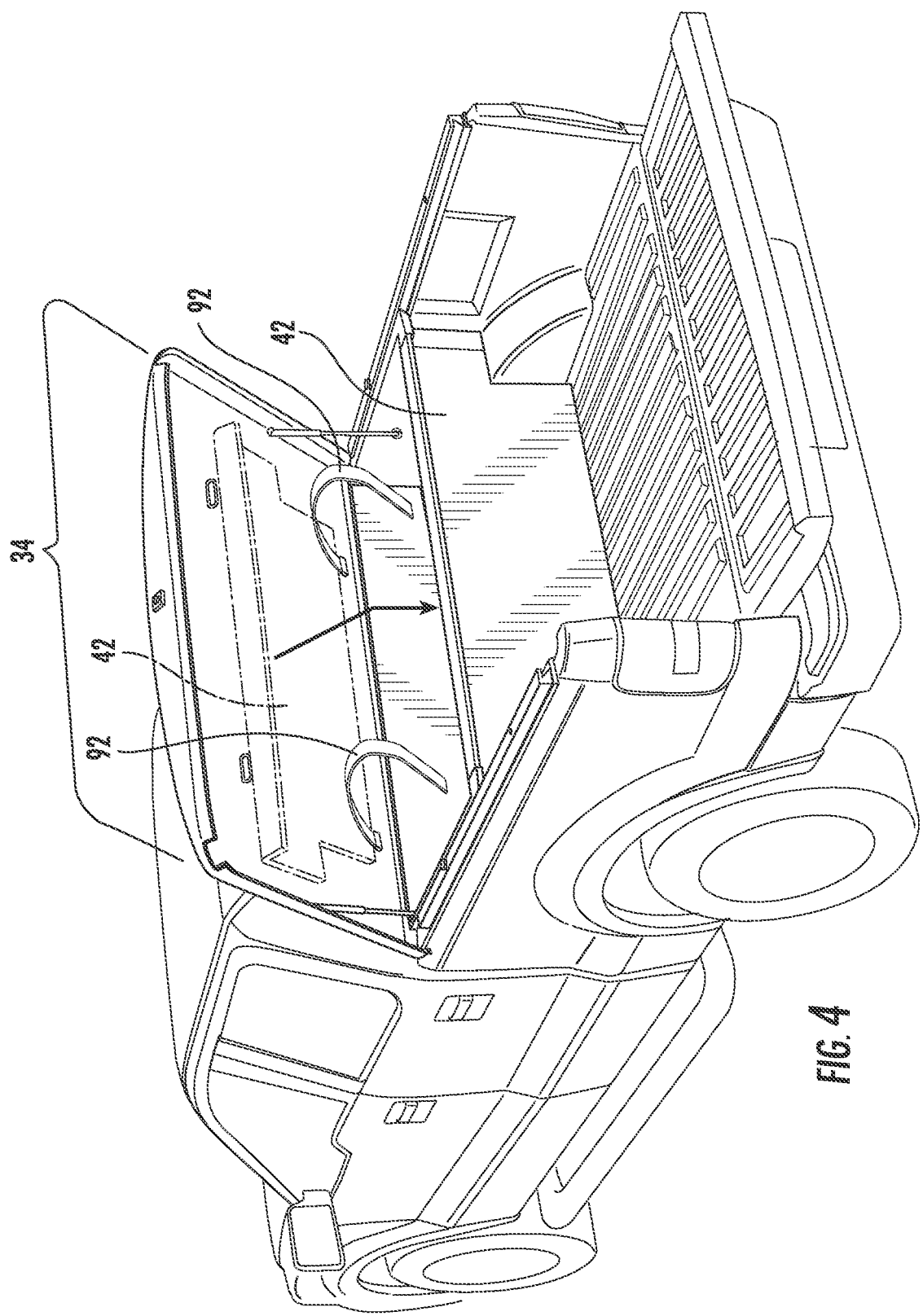
FIG. 4 illustrates the trunk shown in FIG. 3 with a back panel forming an enclosed space.
Figure 5:
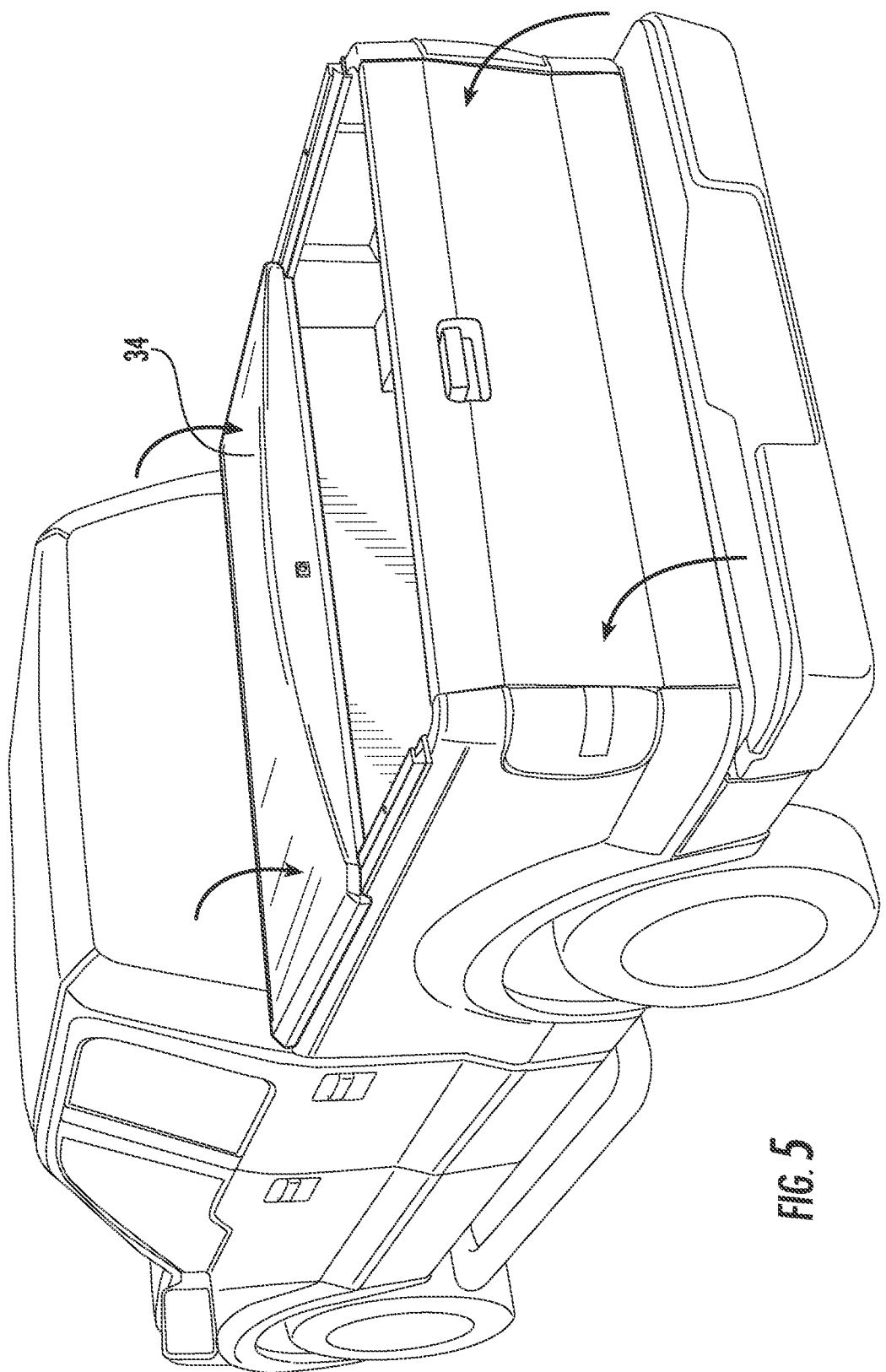
FIG. 5 illustrates the trunk shown in FIG. 4 with the lid in a closed position.

Referring now more particularly to FIGS. 1-6, the trunk 10 may be horizontally slidable and mounted to the left and right rails 20, 22 (see FIG. 2A) that are attached to upper lips 24, 26 of left and right side walls 28, 30. The trunk 10 may be traversed to the back position so that groceries 32 and other items may be easily placed in the trunk 10 (see FIG. 2) and retrieved therefrom. To open the trunk 10, the user may lift up a lid 34 of the trunk 10 and/or pull down a tailgate 36 of the truck bed 16. The trunk 10 may also be easily traversed to the front position by sliding the trunk 10 in a horizontal direction 40 (see FIG. 3) toward the cab 38 of the truck 18. When the trunk 10 is in the front position, panel 42 may be removed from an underside of the lid 34 and fixed in place in order to form the enclosed space of the trunk 10 as shown in FIG. 4. Alternatively, as shown in FIG. 3, the back panel 42 may remain secured under the lid 34 and the lid 34 flipped up so that a motorcycle 88 may be loaded onto the bed 16 of the truck 18 thereby utilizing a full length of the truck bed 16.

The trunk 10 may include a front panel 44, a bottom panel 46, left and right sections 48, 50, the lid 34 and the back panel 42 as shown in FIG. 2. The bottom panel 46 may be rigidly fixed to the front panel 44. The left and right sections 48, 50 may be identical but mirror images of each other and have a step 52, 54 that accommodates the left and right wheel wells 56, 58 of the truck bed 16 so that the trunk 10 may be easily traversed between the front and back positions without having to vertically lift the trunk 10 over the wheel wells 56, 58 of the truck bed 16. The bottom panel 46 may be disposed close to but not in contact with a floor 60 (see FIG. 2A) of the truck bed 16 so that the trunk 10 may easily slide in the horizontal direction. The left and right sections 48, 50 have steps 52, 54. The steps 52, 54 are positioned above the highest point 62 of the wheel wells 56, 58. The highest point of the wheel well 58 is not shown but is identical to the highest point 62 of the wheel well 56.

The trunk 10 may be horizontally slidable and mounted to the left and right side walls 28, 30 of the truck bed 16. In particular, left and right rails 20, 22 of the trunk 10 may be fixedly secured to the upper lips 24, 26 of the left and right side walls 28, 30 of the truck bed 16. In order to secure the left and right rails 20, 22 to the upper lips 24, 26 of the left and right side walls 28, 30 of the truck bed 16, the left and right rails 20, 22 may be bolted to the upper lips 24, 26 of the left and right side walls 28, 30. Alternatively, the left and right rails 20, 22 may have enlarged nubs 64 that fit within the keyhole shaped slot 66 formed in the upper lips 24, 26 of the left and right side walls 28, 30. The left and right sections 48, 50 may have tongues 68, 70 that fit within the grooves 72, 74 of the left and right rails 20, 22. Preferably, the tongues 68, 70 and the grooves 72, 74 may have a wedge-shaped configuration that slideably mates with each other. Moreover, the grooves 72, 74 may optionally have ball bearings that help to support the trunk 10 and to allow convenient and easy horizontal traversal of the trunk 10 between the back and front positions on the rails 20, 22.

The left and right sections 48, 50 may have a cross-sectional configuration that conforms to a cross-sectional inner profile of the left and right side walls 28, 30 including its wheel wells. In this regard, the left and right sections 48, 50 may be close to but do not contact the left and right side walls 28, 30 and the wheel wells 56, 58 of the truck bed 16 to allow for horizontal traversal of the trunk 10 between the front and back positions without vertical lifting or traversal of the trunk 10.

The trunk 10 may be secured in the front or back positions by way of a set screw 76. When the trunk 10 is in the back position, the set screws 76 are engaged in the holes 78. The set screws 76 push down and frictionally engage the tongues 68, 70 to prevent movement of the trunk 10. When the trunk 10 is in the front position, the set screws 76 are engaged in the holes 80. The set screws 76 push down and frictionally engage the tongues 68, 70 of the trunk 10 to prevent horizontal movement of the trunk 10. Alternatively or additionally, a detent may be incorporated into the trunk 10 and rails 20, 22. The detent may be operative to lock the trunk 10 in either the back position or the front position.

To install the trunk 10 to the truck bed 16, the left and right rails 20, 22 are attached to the left and right side walls 28, 30 of the truck bed 16. As discussed above, there are at least two methods of attaching or fixedly securing the left and right rails 20, 22 to the side walls 28, 30. In particular, the keyhole shaped slot 66 may be formed in the upper lips 24, 26 of the truck bed 16. These keyhole shaped slots receive nubs 64 of the left and right rails 20, 22. The nubs 64 are inserted into the keyhole shaped slot and secured thereto in order to fix the left and right rails 20, 26. Alternatively, the left and right rails 20, 22 may be bolted to the upper lips 24, 26 of the left and right side walls 28, 30. The left and right rails 20, 22 have grooves 72, 74. These grooves 72, 74 are directed inwardly toward the center of the bed 16 of the truck. These grooves 72, 74 may run the entire length or a substantial portion of the length of the truck bed 16 so that the trunk 10 may be traversed horizontally between the front and back positions without having to lift the trunk 10 vertically. As shown and described, the grooves 72, 74 formed on the left and right rails 20, 22 which receive the tongues 68, 70 of the trunk 10. However, the opposite situation is contemplated in that the grooves 72, 74 may be formed on the trunk 10 which receives tongues 68, 70 formed in the rails 20, 22 along the length of the rails 20, 22.

Before tightening the left and right rails 20, 22 to the upper lips 24, 26 of the left and right side walls 28, 30, the left and right rails 20, 22 may be slightly loose so as to be capable of rattling. In this state, the tongues 68, 70 of the trunk 10 may be inserted into the respective grooves 72, 74 of the left and right rails 20, 22. With the tongues 68, 70 disposed within the grooves 72, 74, the left and right rails 20, 22 may now be adjusted and tightened onto the upper lips 24, 26 of the left and right side walls 28, 30.

The tongues 68, 70 are linearly traversable within the grooves 72, 74 to allow the trunk 10 to be horizontally traversable between the front and back positions. By being horizontally traversable, a person that might not be that strong may easily move the trunk 10 between the front and back positions depending on the desired use or nonuse of the trunk 10. If the trunk 10 is in the back position, the user may use the trunk 10 as a normal place to carry his or her groceries. If the trunk 10 is in the front position, then the user may use the trunk 10 similar to a toolbox. Alternatively, the lid 34 of the trunk 10 may be disposed in the up position so that the user may place a motorcycle 88 in the bed 16 of the truck as shown in FIG. 3.

Figure 23A:
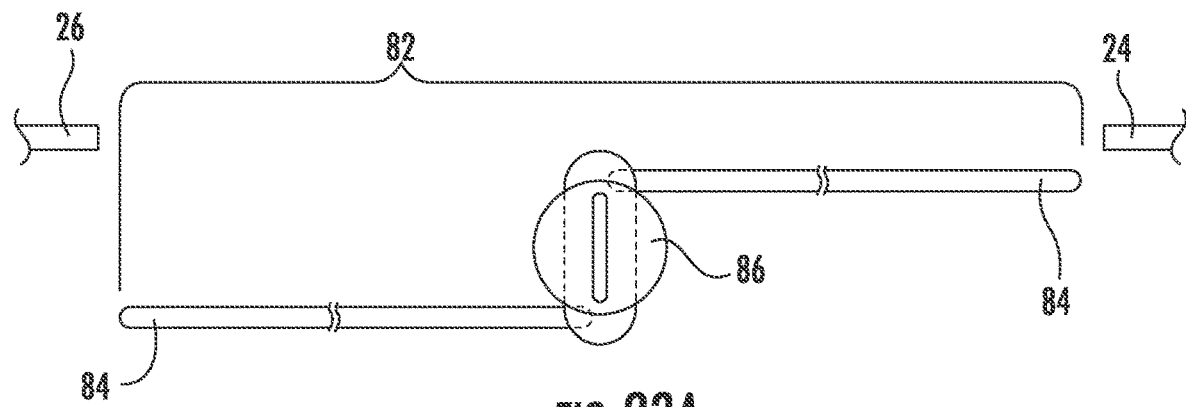
FIG. 23A illustrates a locking mechanism of the lid.
Figure 23B:
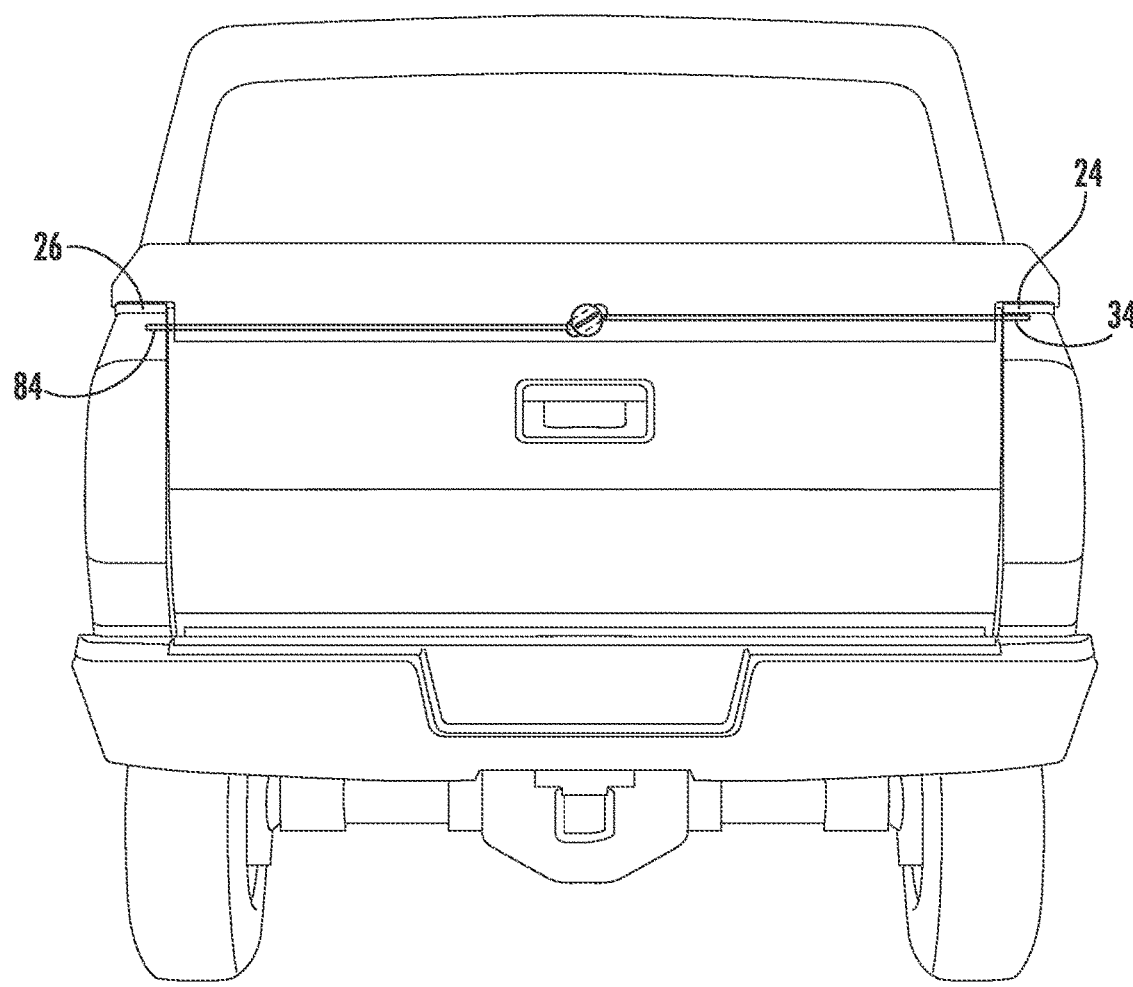
FIG. 23B illustrates the locking mechanism shown in FIG. 23A incorporated into the trunk and bed of the truck.

The lid 34 of the trunk 10, 12, 14 is lockable in the down position (see FIG. 1). Referring to FIG. 23A, B, the lid 34 may have a mechanism 82 with arms 84 that may extend under the upper lips 24, 26 of the left and right sidewalls 28, 30 to lock the lid 34 in the down position. In order to traverse the lid 34 to the up position (see FIG. 2), the user turns a lock 86 in the counterclockwise direction so that the arms 84 may clear the lips 24, 26 of the side walls 28, 30. The lid 34 may then be pivoted upward to the up position and may be locked or supported in the up position by shocks 134. The lid 34 is pivotable about an upper edge of the front panel 44.

FIG. 1 illustrates a trunk 10 installed on the truck bed 16 with the trunk 10 in the back position. The trunk 10 is used to isolate things such as grocery bags from the soiled surfaces of the truck bed 16 so that things such as grocery bags do not become soiled by the dirt on the surfaces of the truck bed. The trunk 10 may be opened in one of two ways, namely, by lifting up the lid 34 or pulling down the tailgate 36 of the truck bed 16. To move the trunk 10 from the back position to the front position, the user releases the trunk 10 either by loosening set screws 76 or releasing detents. The trunk 10 is traversed forward in the direction of arrow 40 and locked into place with set screws 76 or detent. In the front position, the trunk 10 may be moved out of the way by simply lifting the lid 34 as shown in FIG. 3. In this manner, a motorcycle 88 may be loaded and transported in the bed 16 of the truck 18. Alternatively, the trunk 10 may form an enclosed space by removing the back panel 42 and engaging the back panel 42 to the bottom panel 46 and the left and right sections 48, 50, as shown in FIG. 4. To remove the back panel 42 from the lid 34, straps 90 under the lid 34 with hooks and loops may be released. The back panel 42 may be secured to the bottom panel 46 and the left and right sections 48, 50 via means known in the art or developed in the future. The lid 34 may extend beyond upper edges of the front panel 44, back panel 42 and left and right sections 48, 50 so that rainwater does not enter the enclosed space of the trunk 10. Moreover, other water sealing or water proofing methods that are known in the art or developed in the future may be incorporated into the trunk 10.

Referring now the FIGS. 6-11, a second embodiment of the trunk 12 is shown. The trunk 12 is identical to the trunk 10 except that the trunk 12 has upper and lower telescoping sections 100, 102. Additionally, the trunk 12 does not have steps in the left and right sections as in the truck embodiment shown in FIGS. 1-6 to allow for the wheel wells of the truck bed 16.

The trunk 12 may be disposed either in front of or behind the wheel wells 56, 58 of the truck bed 16 since the left and right sections 48a, 50a are not contoured to the corresponding shape of the wheel wells 56, 58. Rather, the left and right sections 48a and 50a are vertically flat. The trunk 12 provides more room in the width direction of the enclosed space since the left and right sections 48, 50 do not have the steps 52, 54 as in trunk 10.

Figure 6:
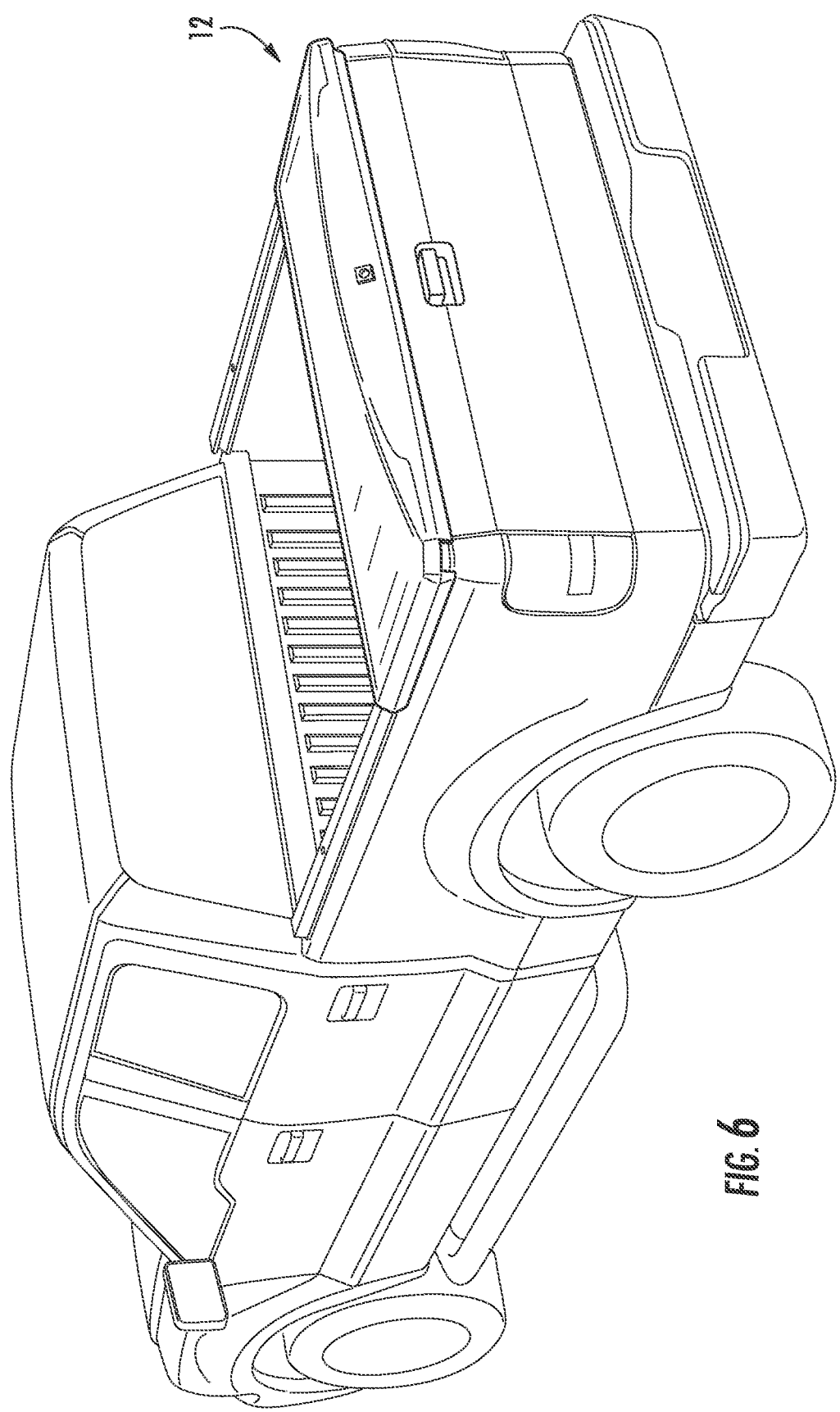
FIG. 6 illustrates a second embodiment of the trunk traversed to a back position.
Figure 7A:
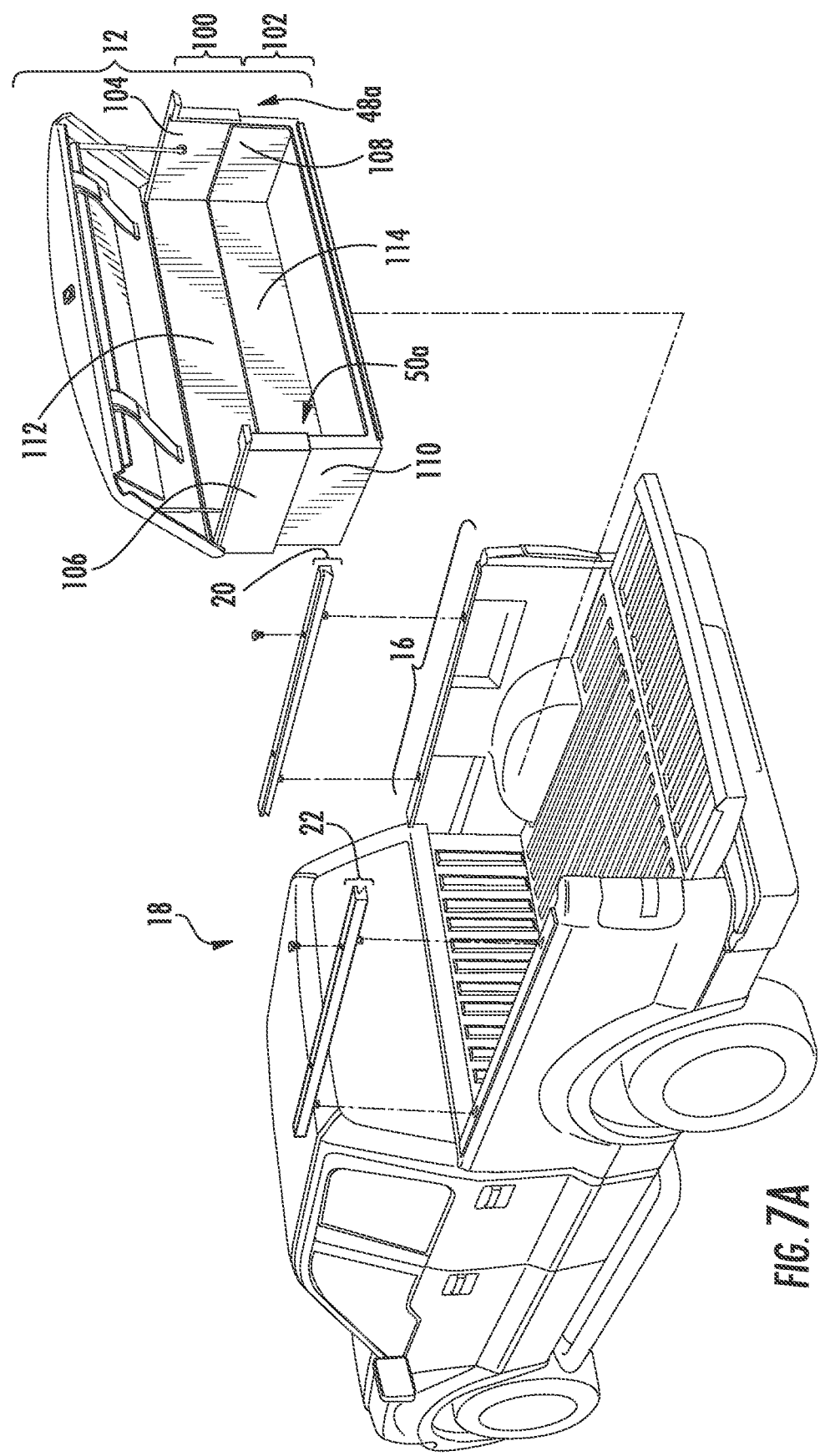
FIG. 7A illustrates an exploded view of the trunk shown in FIG. 7.
Figure 8:
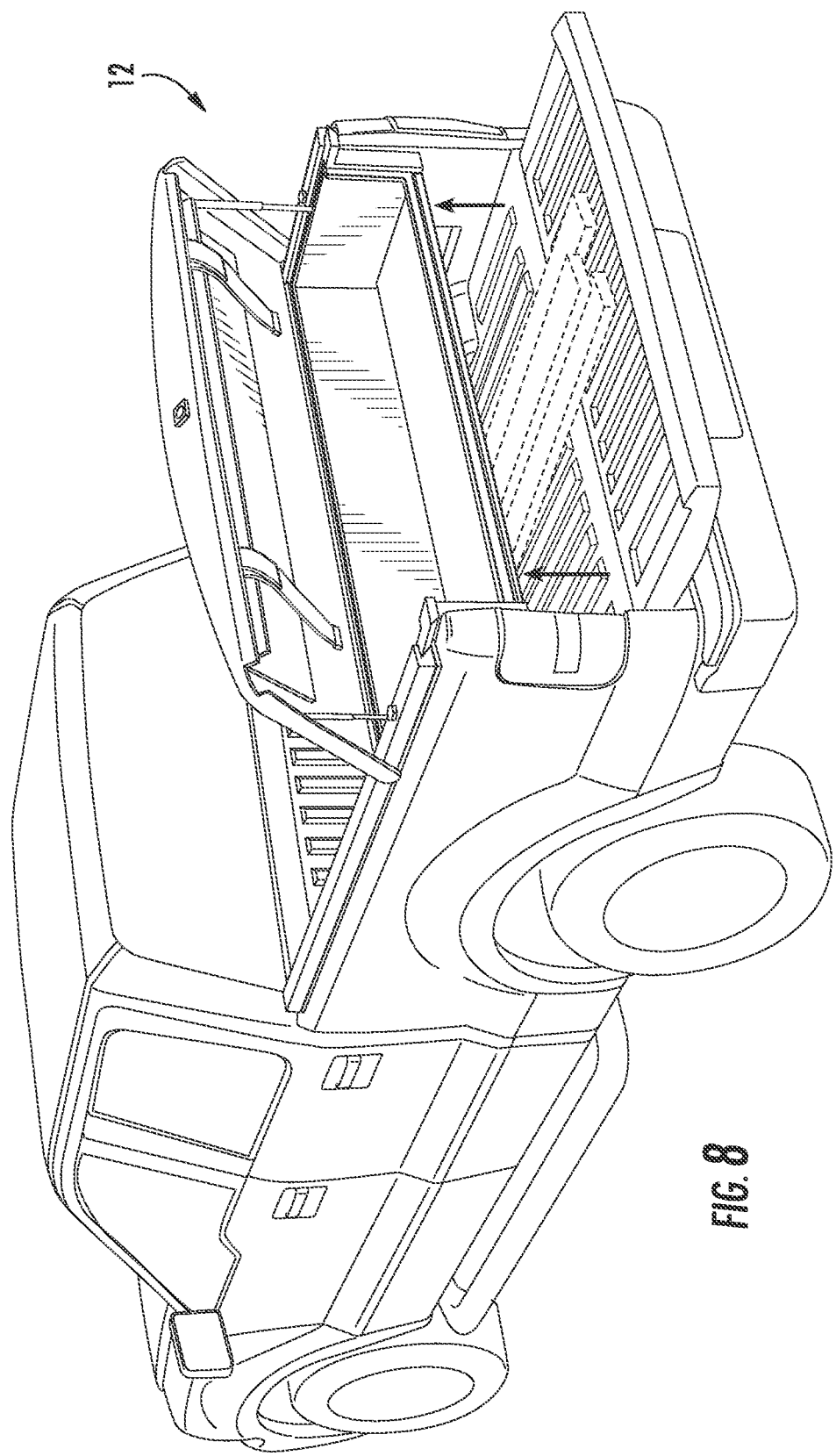
FIG. 8 illustrates the trunk in a collapsed position.
Figure 9:
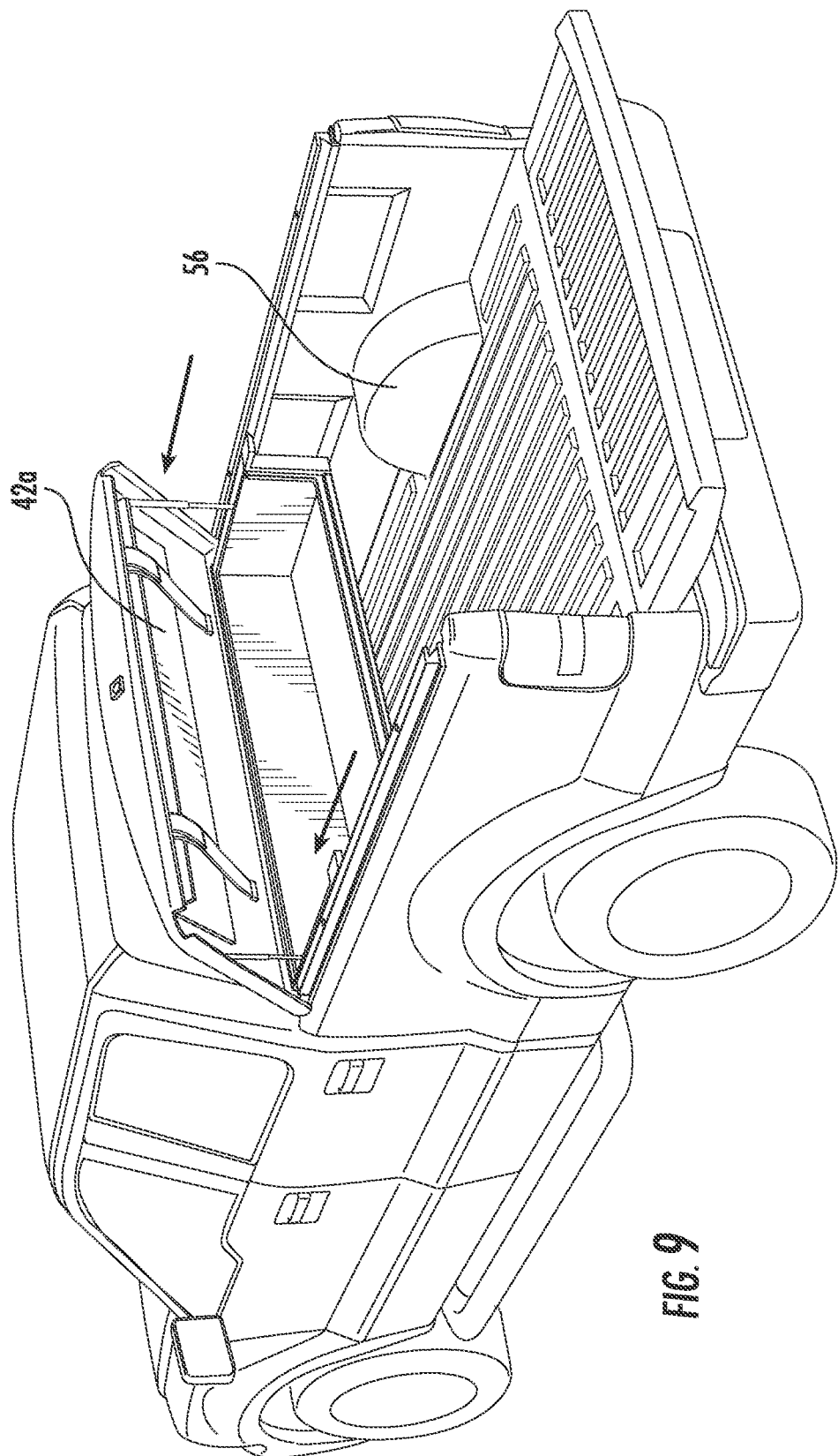
FIG. 9 illustrates the trunk shown in FIG. 8 traversed to a front position.
Figure 11:
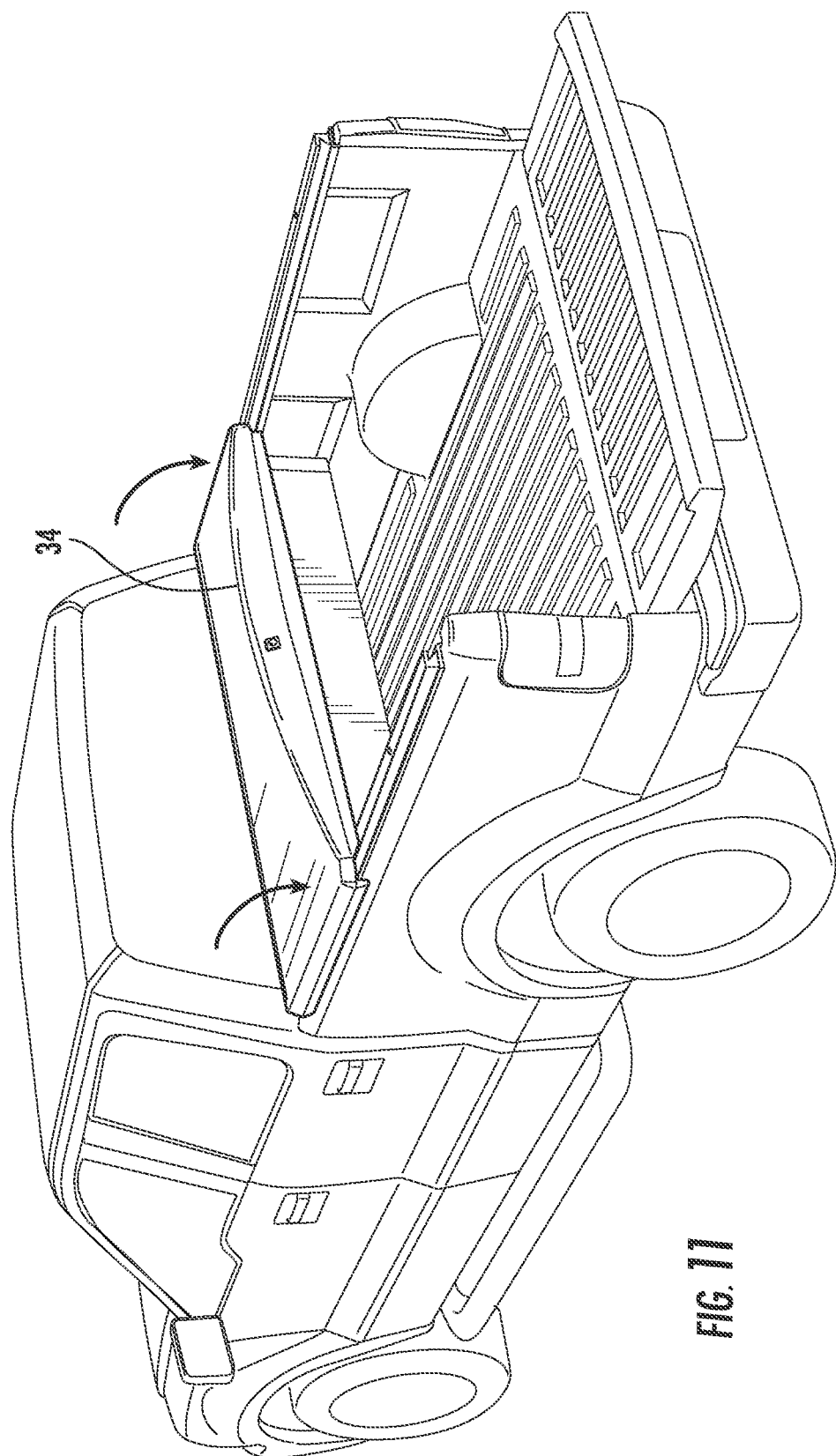
FIG. 11 illustrates the trunk with the lid in a closed position.

The trunk 12 is traversable between the front and back positions as shown in FIGS. 6 and 11. The trunk 12 is traversed in the horizontal direction when traversed between the front and back positions so that a mother or a person that does not have great strength may reconfigure the trunk 12 as needed either for storing things such as groceries or reconfiguring the trunk 12 so that a motorcycle may be loaded on the truck bed 16. In order to traverse the trunk 12 between the front and back positions, the lower section 102 must be collapsed into the upper section 100, as shown in FIG. 8. By doing so, the lower section 102 clears the wheel wells 56, 58 of the truck bed 16 so that the trunk 12 may be horizontally traversed to the front position, as shown in FIG. 9. The same is also true when the trunk 12 is traversed from the front position to the back position. The lower section 102 must be raised and collapsed into the upper section 100 so that the lower section 102 clears the wheel wells 56, 58 of the truck bed 16 when traversing the trunk 12 between the front and back positions.

The lid 34 may be larger than the upper section 100 and the lower section 102 may be slightly smaller than the upper section 100. When water that falls on the lid 34 the water cascades onto the upper section 100, and in turn cascades onto the lower section 102. In this manner, the trunk 12 does not collect water in the enclosed space. Water also cascades off of the lid 34 and onto the tailgate of the truck bed 16 since the lid 34 extends over the tailgate as shown in FIG. 6. The oversized nature of the lid 34 is also incorporated into the trunks 10, 14.

The upper and lower sections 100, 102 may be fabricated from left and right panels 104, 106, 108, 110. The left and right panels 104, 106, 108, 110 are attached to front panel's 112, 114 of the upper and lower section 100, 102. As discussed above, the lower section 102 slides up and down within the upper section 100. The lower section 102 may slide within the upper section 100 via various means such as but not limited to rails, tongue and groove connections, gear and pinion, etc. Moreover, the lower section 102 may be traversable between an up position wherein the lower section 102 is collapsed into the upper section 100 or down position wherein the lower section 102 is extended away from the upper section 100 to form an enlarged enclosed space.

The lower section 102 may be retained in the up or down positions with a clamp or detent mechanism known in the art or developed in the future.

Figure 10:
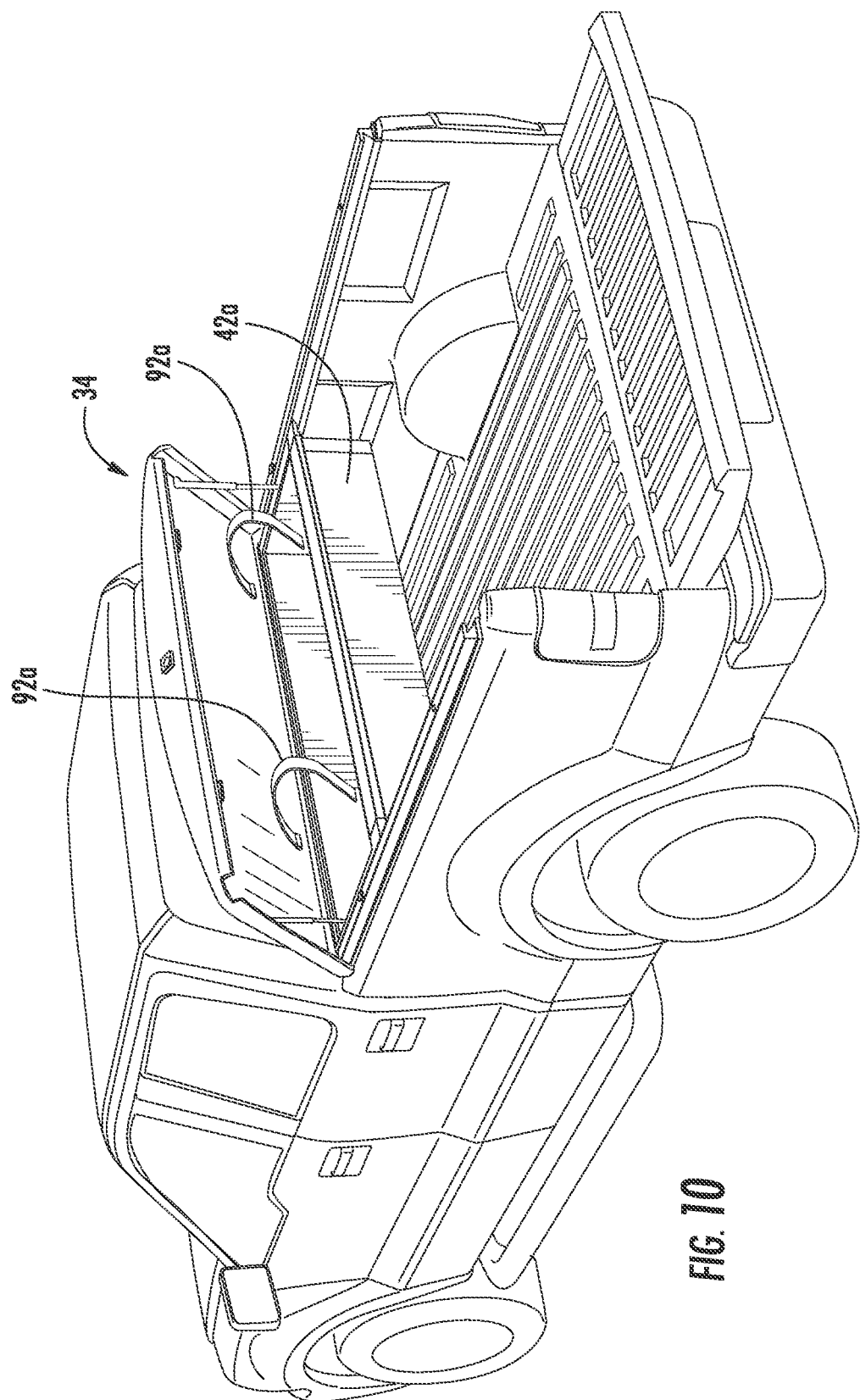
FIG. 10 illustrates the trunk shown in FIG. 9 with a back panel mounted thereto to form the enclosed space.

Additionally, when the trunk 12 is disposed in the front position as shown in FIG. 10, a back panel 42*a* may be removed from the underside of the lid 34 by undoing straps 92*a*. The straps 92*a* may be lined with hook and loop fasteners which are removed in order to release the back panel 42*a* from the lid 34. The back panel 42*a* mounts onto the upper section 100 and/or the lower section 100 in order to form the enclosed space of the trunk 12. The back panel 42*a* is shown as being short in order to fit on the trunk 12 when the lower section 102 is collapsed into the upper section 100. However, it is also contemplated that the back panel 42*a* may be taller so that the back panel 42*a* may fit onto the trunk 12 when the lower section 102 is in the down position and the trunk 12 is in the front position. When the back panel 42*a* is mounted to the trunk 12, the back panel 42*a* may form the enclosed space within the trunk 12. The back panel 42*a* may extend from the bottom panel to the lid 34 when closed. The lower section 102 is shown as being in the up position when the trunk 12 is in the front position. However, it is also contemplated that the lower section 102 may be in either the up or down positions when the trunk 12 is in the front position.

When the trunk is in the back position as shown in FIGS. 7 and 8, the user has an option of either creating a larger enclosed space by positioning the lower section 102 in the down position or creating a smaller enclosed space by traversing the lower section 102 to the up position, as shown in FIG. 8. Likewise, when the trunk 12 is in the front position as shown in FIG. 10, the user may create a smaller enclosed space by traversing the lower section 102 to the up position and fitting the back panel 42*a* as shown in FIG. 10. Alternatively, the user may remove the back panel 42*a* and secure it 42*a* to the underside of the lid 34 and draw the lower section 102 to the down position. With the lid 34 pivoted upward as shown in FIG. 10, the user may load a motorcycle onto the bed 16 of the truck 18. Alternatively, the trunk 12 may be provided with two different back panels 42*a*. These two different back panels 42*a* may be a short back panel 42*a* wherein the short back panel 42*a* mounts to the trunk 12 when the lower section 102 is disposed in the up position. The larger of the two back panels 42*a* may be mounted to the trunk 12 when the lower section 102 is disposed in the down position. In this regard, the trunk 12 is capable of providing a larger or smaller enclosed space.

Figure 12:
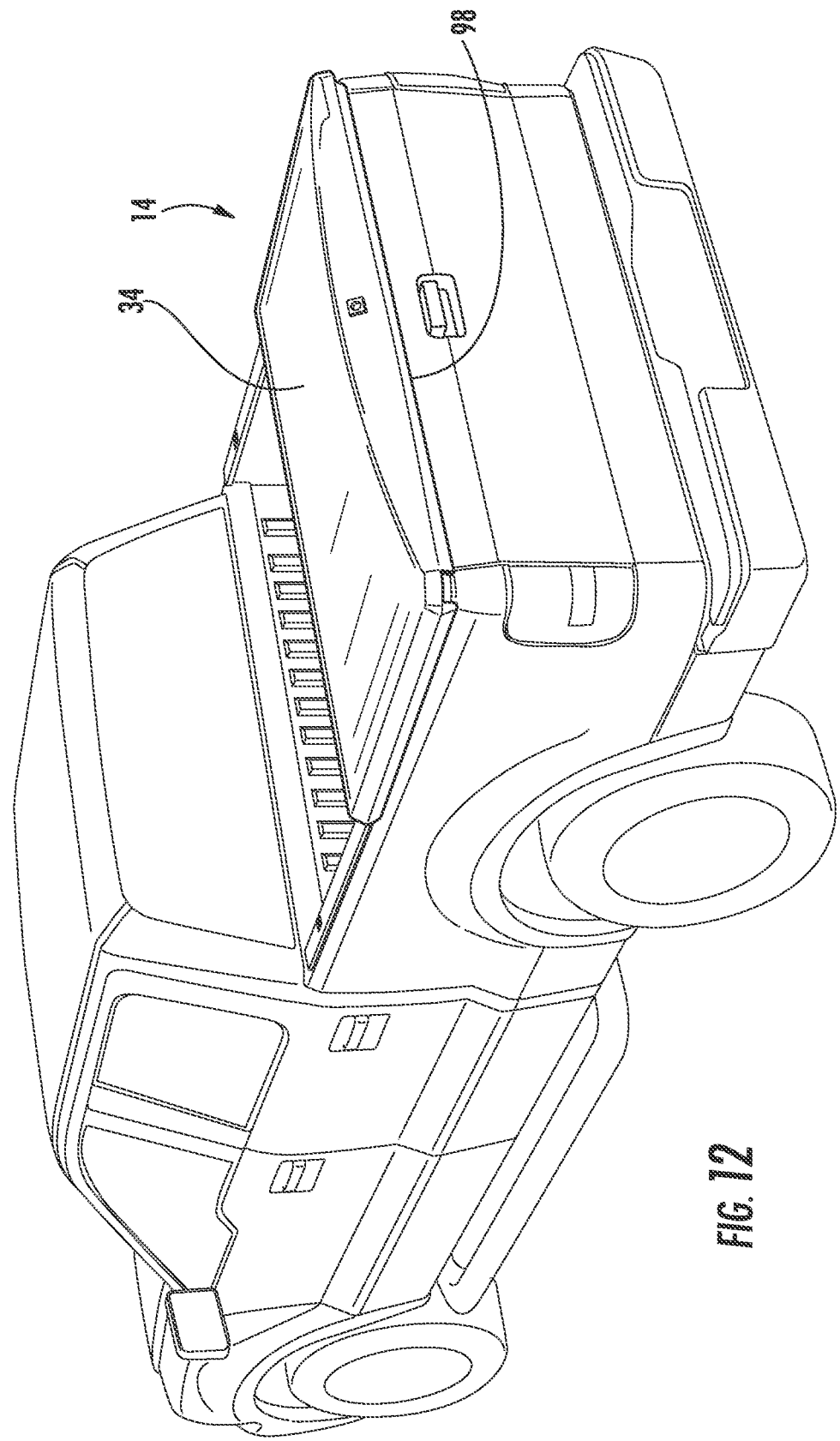
FIG. 12 is a third embodiment of the trunk traversed to a back position.
Figure 13A:
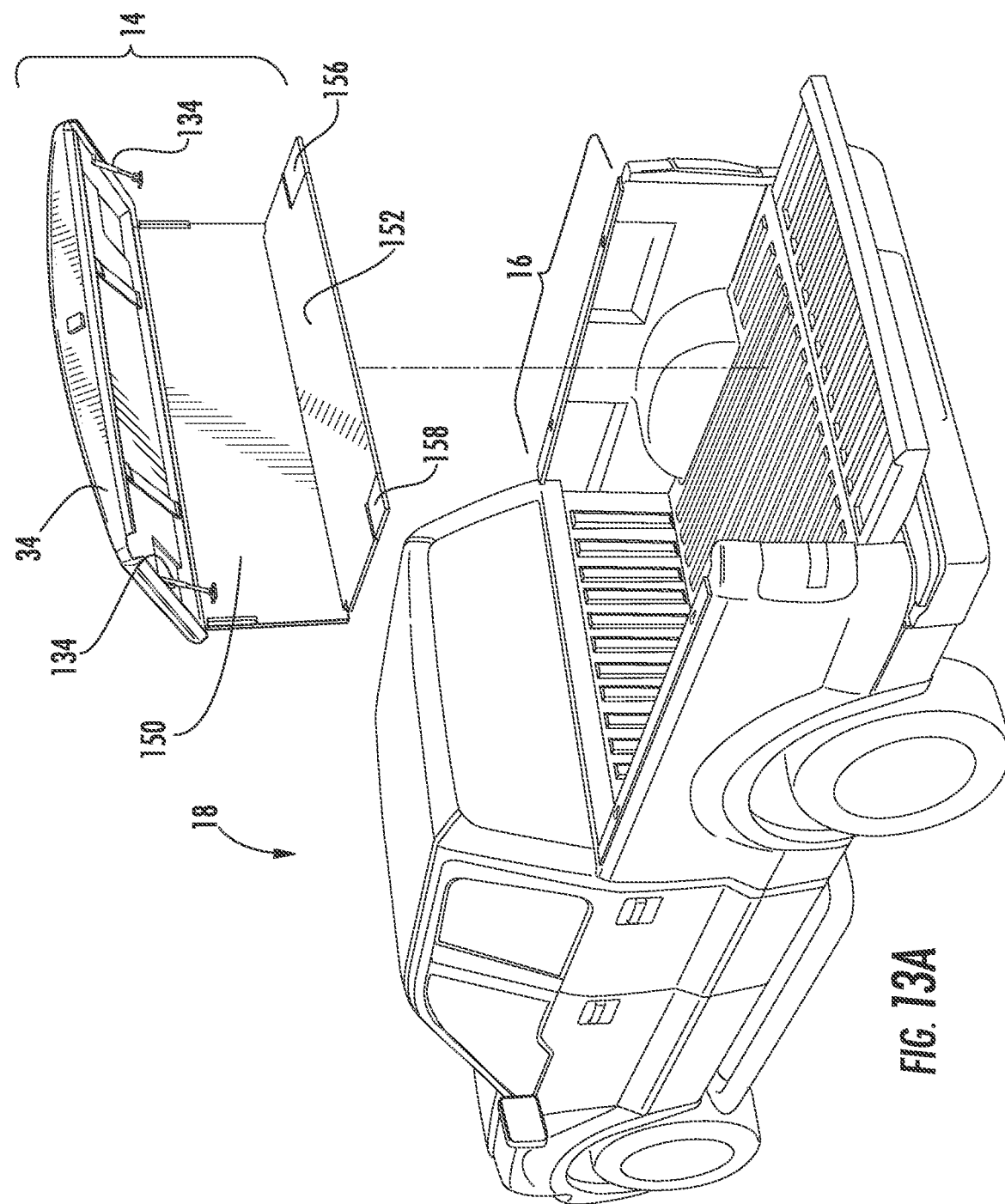
FIG. 13A illustrates an exploded view of the trunk shown in FIG. 13.
Figure 15:
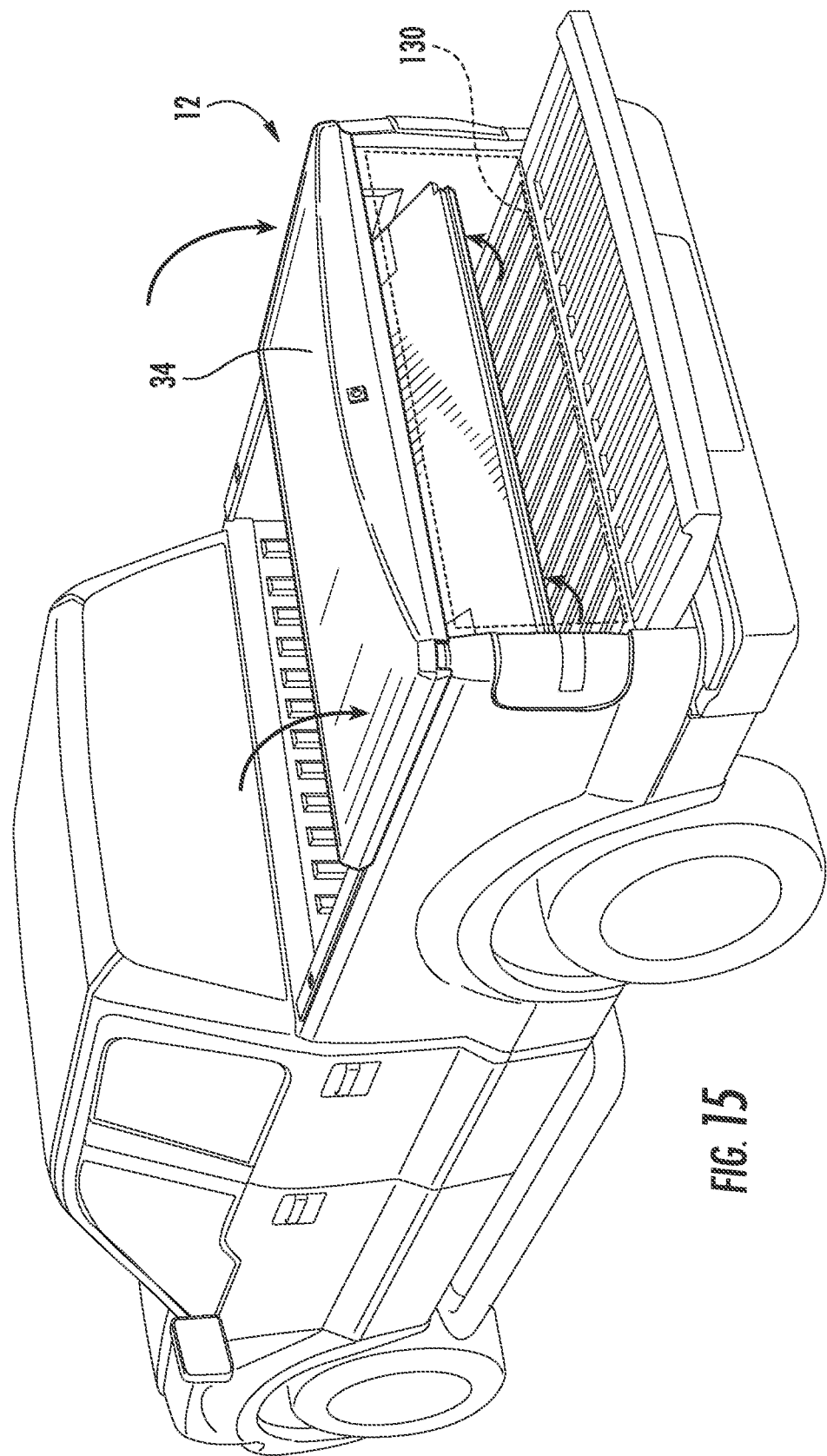
FIG. 15 illustrates the trunk with a front panel being folded upward to traverse the trunk in the undeployed state.
Figure 20:
FIG. 20 illustrates the trunk with the lid in the closed position.

Referring now to FIGS. 12-22, the trunk 14 is illustrated. The trunk 14 is identical to trunk 10 except in the following manner. The trunk 14 is traversable between front and back positions as shown in FIGS. 12 and 20 when deployed. The trunk 14 also has various stowaway configurations shown in FIGS. 15, 16 and 20. In FIG. 15, the trunk 14 is being transitioned to an undeployed state wherein the lid 34 is secured to the upper lips 24, 26 of the left and right side walls 28, 30 of the truck bed 16. Objects may be slid under the undeployed trunk 12 that can fit through opening 130.

Figure 16:
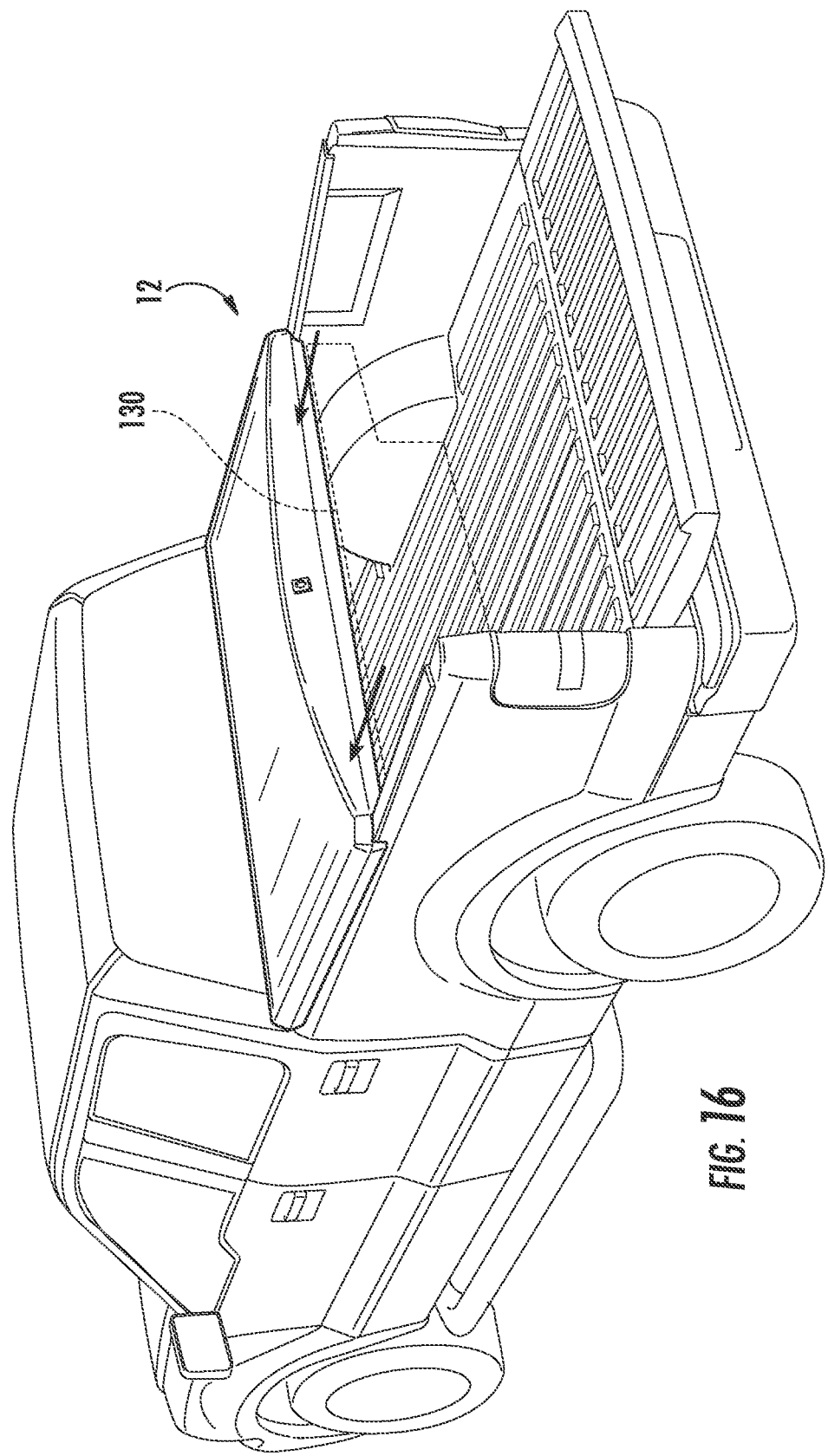
FIG. 16 illustrates the trunk being traversed to the front position.
Figure 17:
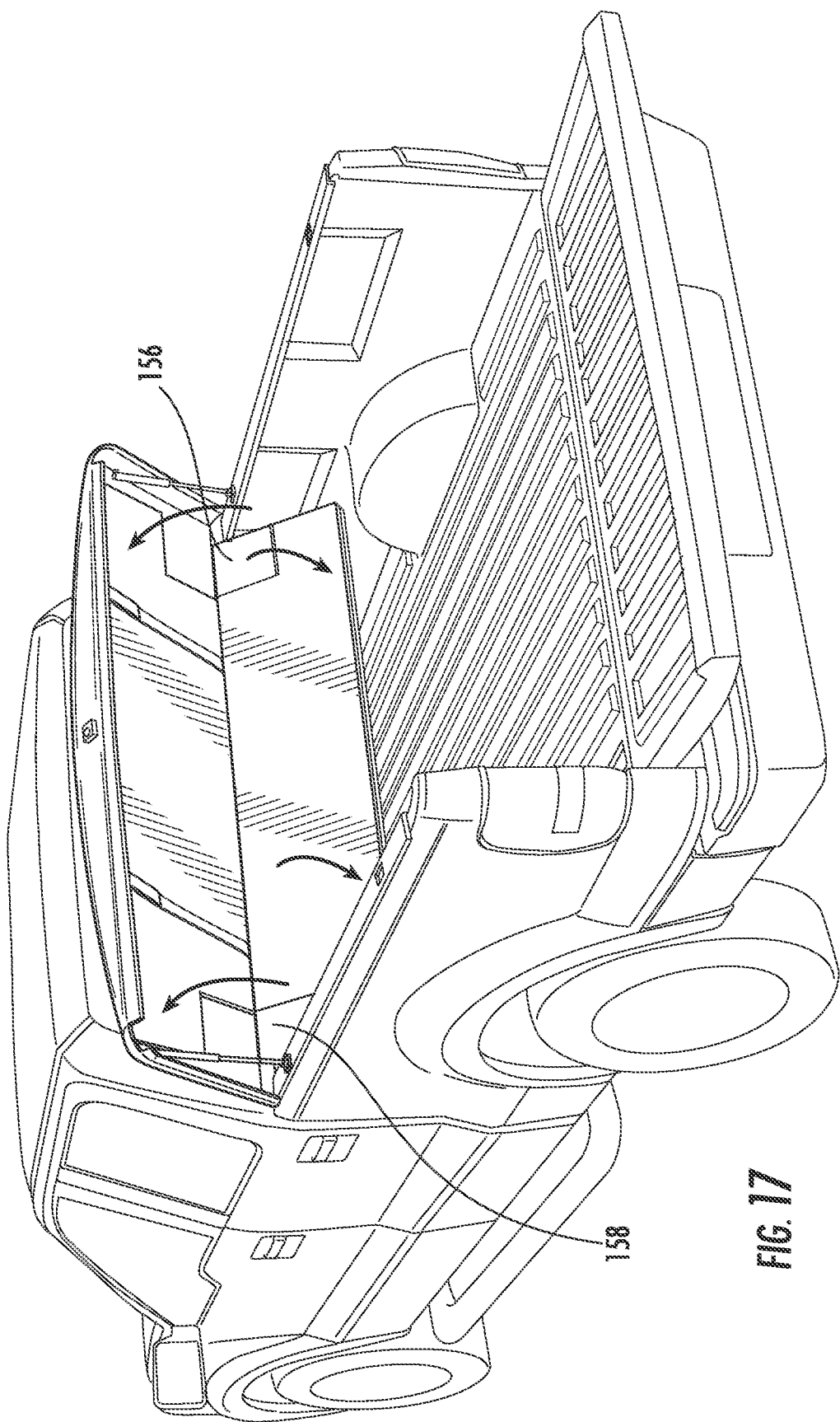
FIG. 17 illustrates the trunk with the front panel being unfolded to traverse the trunk in the deployed state.

FIG. 16 illustrates the undeployed trunk 12 being traversed to the front position. The trunk 12 may be locked to the front position in the undeployed position so that objects may be placed at the rear of the truck bed 16, if desired. Similarly, objects can be slid under the undeployed trunk 12. Moreover, if desired, the trunk 12 in its undeployed state may be mountable to a rooftop 132 of the cab 38 of the truck 18 so that the user may have full access to the entire area of the truck bed 16.

Figure 18:
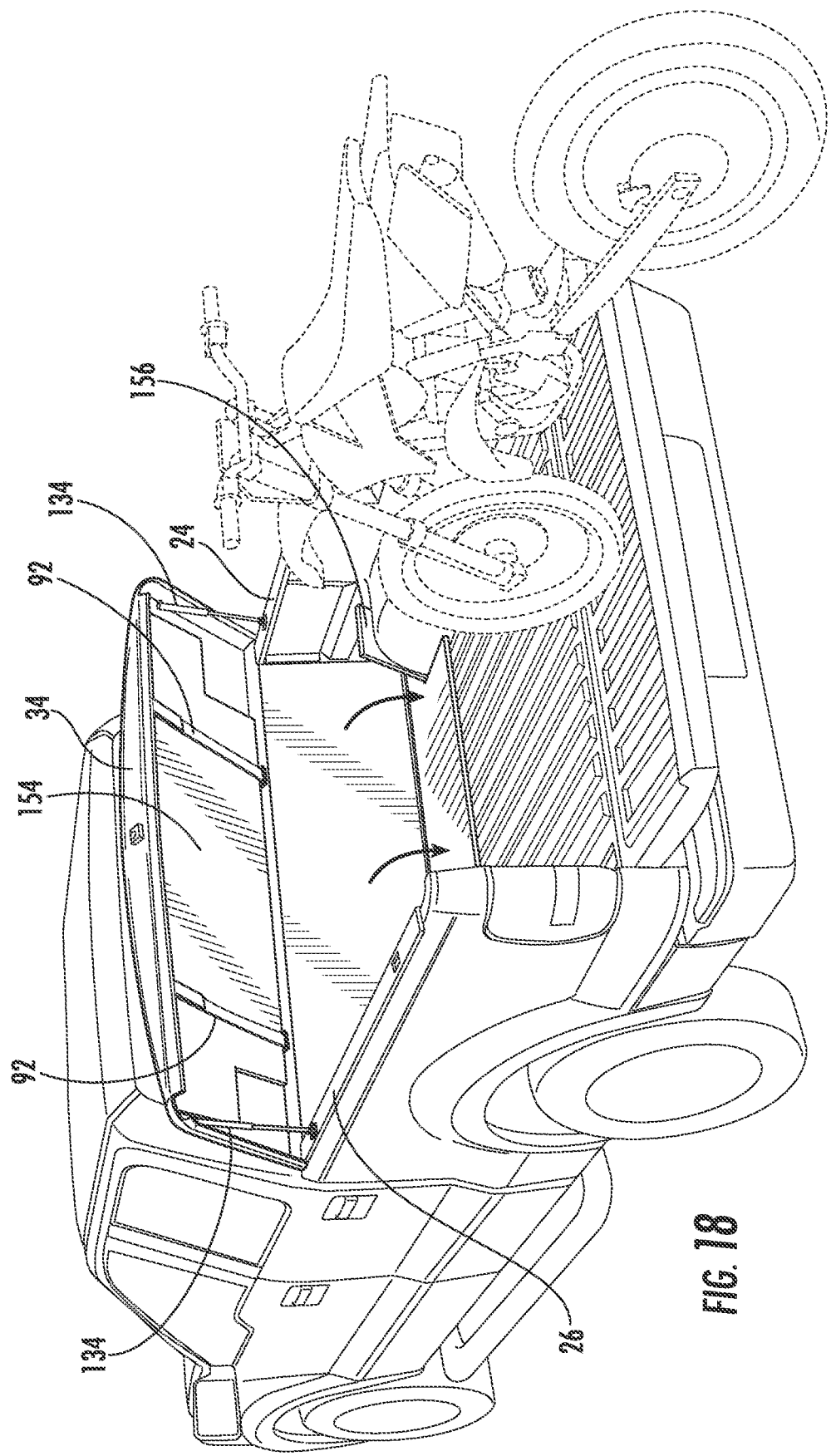
FIG. 18 illustrates the trunk with the bottom panel being unfolded to traverse the trunk in the deployed state.
Figure 19:
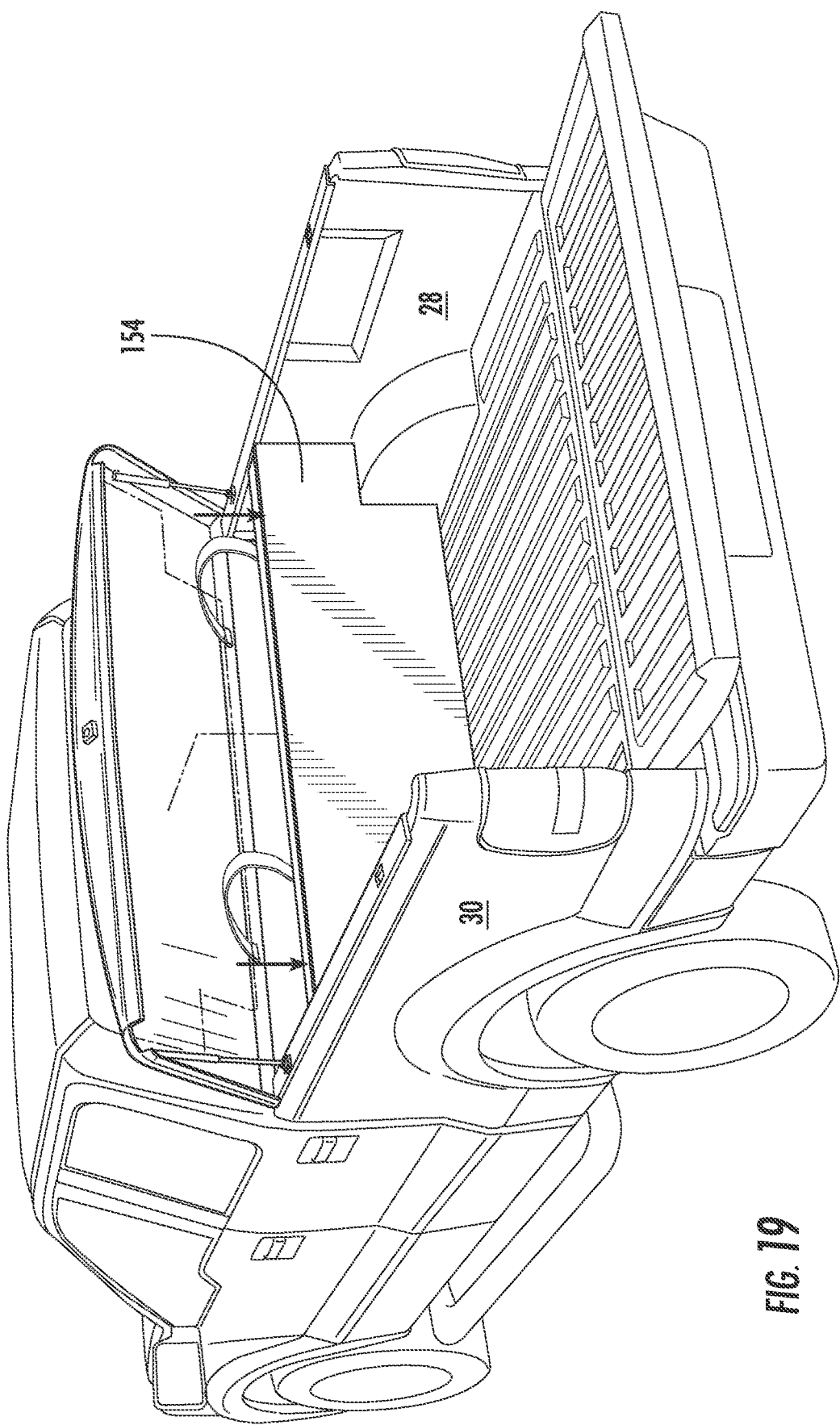
FIG. 19 illustrates a back panel being mounted to the trunk to form the enclosed space.
Figure 22:
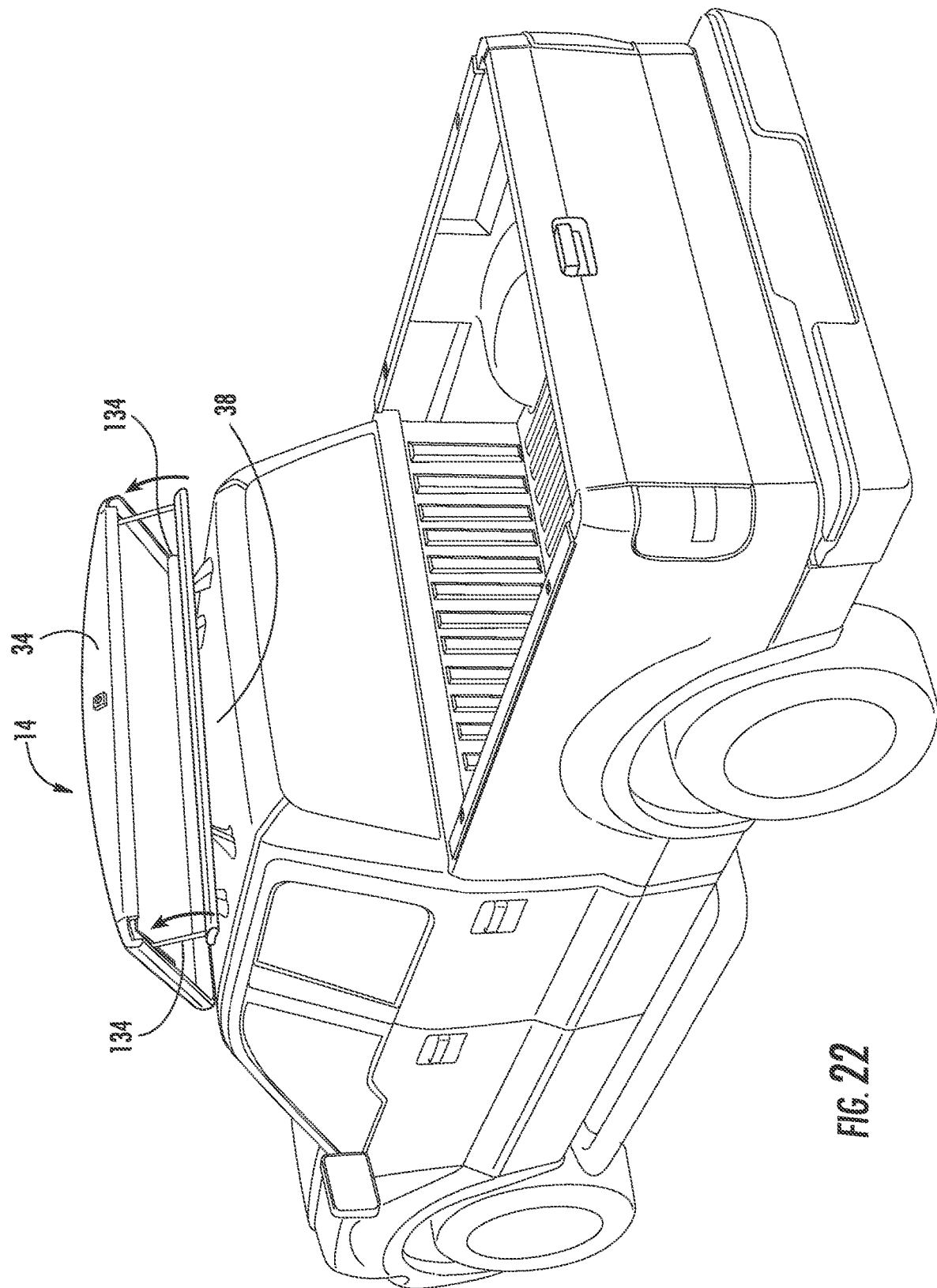
FIG. 22 illustrates the trunk shown in FIG. 21 with the lid in an up position.

More particularly, the trunk 14 may be pivotally secured to the bed 16 in either the front or back positions, as shown in FIGS. 13 and 18 as well as on the roof 132 of the cab 38 shown in FIG. 22. The lid 34 may be held in the up position by way of shocks 134. The shocks 134 have an extended position shown in FIGS. 13 and 18. In the extended position, the shocks 134 lift the lid 34 upward a sufficient distance so that a motorcycle may be disposed in the trunk 14 or the truck bed 16. In a half extended position, as shown in FIG. 22, the lid 34 functions as a spoiler. As such, the shocks 134 pivot the lid 34 upwards a bit along its front edge in order to create downward pressure as the truck 18 moves forward. When the trunk 14 is disposed at either the front or back positions, the shocks 134 are pivotally secured to both the lid 34 and the upper lips 24, 26 of the left and right side walls 28, 30 of the truck bed 16. When the lid 34 is pivoted downward, the shocks 134 collapse to allow for the pivoting motion of the lid 34.

The trunk 14 may have a front panel 150, bottom panel 152 and a back panel 154. The front panel 115 is pivotally attached to a front of the lid 134 so that the front panel 150 may be folded under the lid 34. Additionally, the bottom panel 152 is pivotally attached to a lower edge of the front panel 150. Moreover, the bottom panel 152 and the back front panel 150 may be folded under the lid 34 and locked in position in order to have full access to the truck bed 16 as described above. Additionally, the bottom panel 152 may additionally have left and right relief panels 156, 158 that accommodate the wheel wells 56, 58. When the trunk 14 is in the back position, the relief panels 156, 158 are co-planer with a bottom panel 152. However, when the trunk 14 is in the front position, the relief panels 156, 158 may be pitched upward against the wheel wells 56, 58, as shown in FIG. 18. In the back position, the tailgate forms an enclosed space of the trunk 14. In the front position, the back panel 154 may be removed from the underside of the lid 34 by undoing the straps 92 and securing the back panel 154 to the bottom panel 152 in the left and right side walls 28, 30.

In all of the trunks 10, 12, 14 described herein, the lid 34 may have left and right grooves 94, 96. These grooves 94, 96 receive the upper lips 24, 26 of the left and right side walls 28, 30 so that water that drips on the lid 34 cascades off of the trunk 10, 12, 14 and onto the side walls 28, 30 of the truck bed 16. Moreover, the back side of the trunk 10, 12, 14 may have a skirt 98 that overhangs the tailgate of the truck bed 16 so that water that drips on the trunk 14 cascades over the lid 34 and onto the tailgate in order to create a water resistant enclosed space within the trunk 10, 12, 14.

The trunks 10, 12, 14 may all define a length 200 which is less than a length 202 of the truck bed 16. The length 202 of the truck bed 16 may be between about 70 inches to about 105 inches. The length 200 of the trunk 10, 12, 14 may be about one half or less of the length 202 of the truck bed 16.

Preferably, the length 200 of the trunk 10, 12, 14 may be about 20 inches to about 35 inches.

The trunks 10, 12, 14 may be fabricated from various materials including but not limited to carbon fiber, injection molded plastic, metal, aluminum, steel and other materials known in the art or developed in the future that is resistant to degradation from UV rays and environmental pressures such as rain, wind and dust.

The trunks 10, 12, 14 all define an enclosed space within the various panels and the lid 34. It is also contemplated that the enclosed space may be sealed from the environment with weatherstripping, gasket and other sealants to prevent water from entering the enclosed space when raining.

Figure 21:
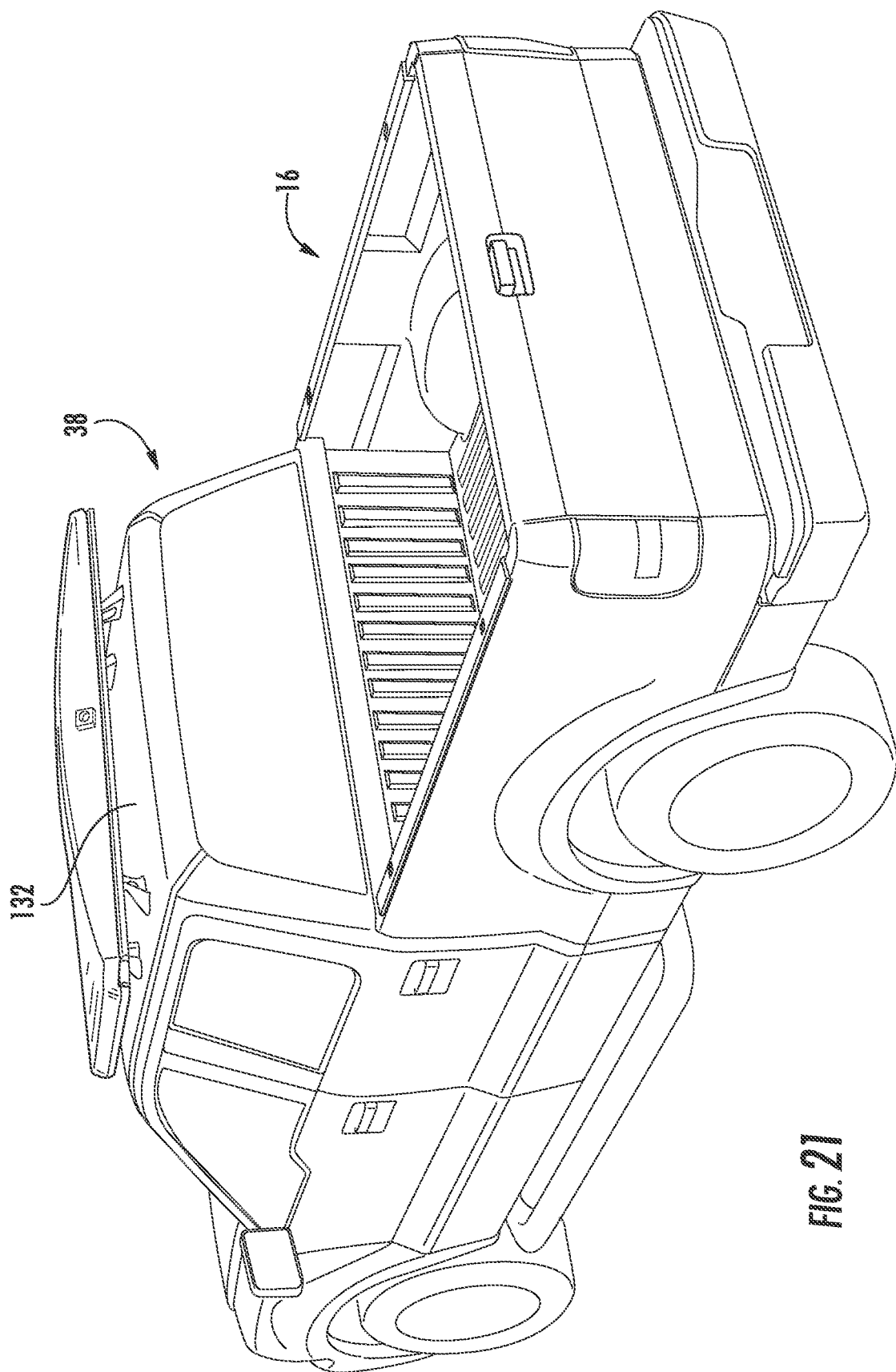
FIG. 21 illustrates the trunk in the undeployed state mounted to a roof of a cab of a truck.
Figure 26:
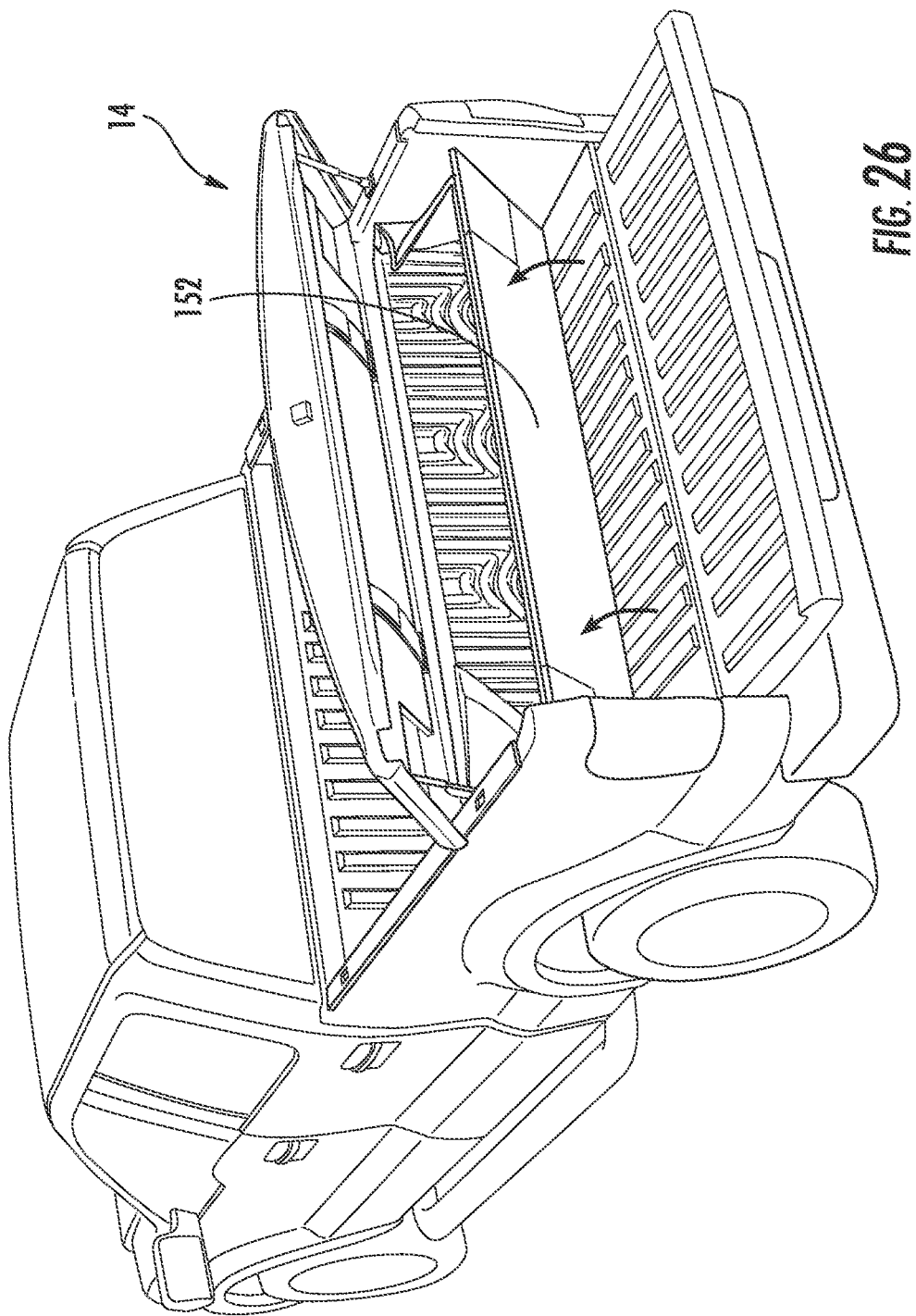
FIG. 26 illustrates the trunk liner being folded along with the trunk.

Referring now to FIGS. 24-26, a barrier 250 is shown. The barrier 250 is shown as being used in conjunction with trunk 14. However, the barrier 250 may also be used in conjunction with trunks 10, 12. As shown in FIG. 25, the barrier 250 may be inserted into the enclosed space defined by the trunk 14. The barrier 250 may have left and right side walls 252, 254 and front wall 256 as well as bottom floor 258. The barrier 250 may be fabricated from an elastomeric material to allow the barrier 250 to collapse or be folded as shown in FIG. 26 which illustrates the trunk 14 being traversed to the undeployed state. As shown in FIGS. 24 and 25, the left and right side walls 252, 254 may have a diagonal crease 260. When the bottom panel 152 is pivoted upward as shown in FIG. 26, the left and right side walls 252, 254 bend at the diagonal crease 260 to allow the barrier 250 to fold into a flat configuration so that the trunk 14 may be traversed to the undeployed state as shown in FIGS. 16 and 21.

Figure 27:
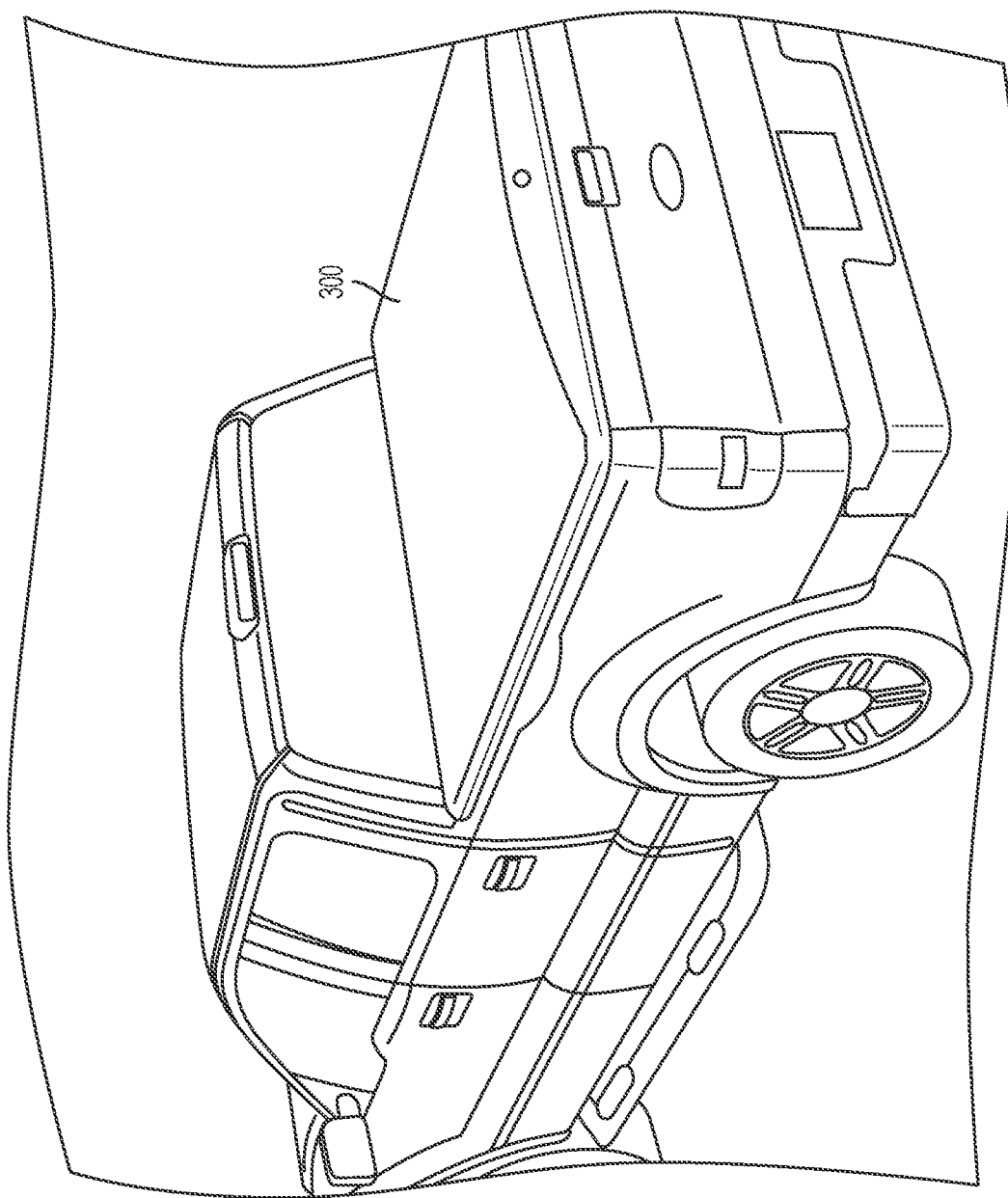
FIG. 27 illustrates a fourth embodiment of the trunk in combination with a tonneau cover.
Figure 28:
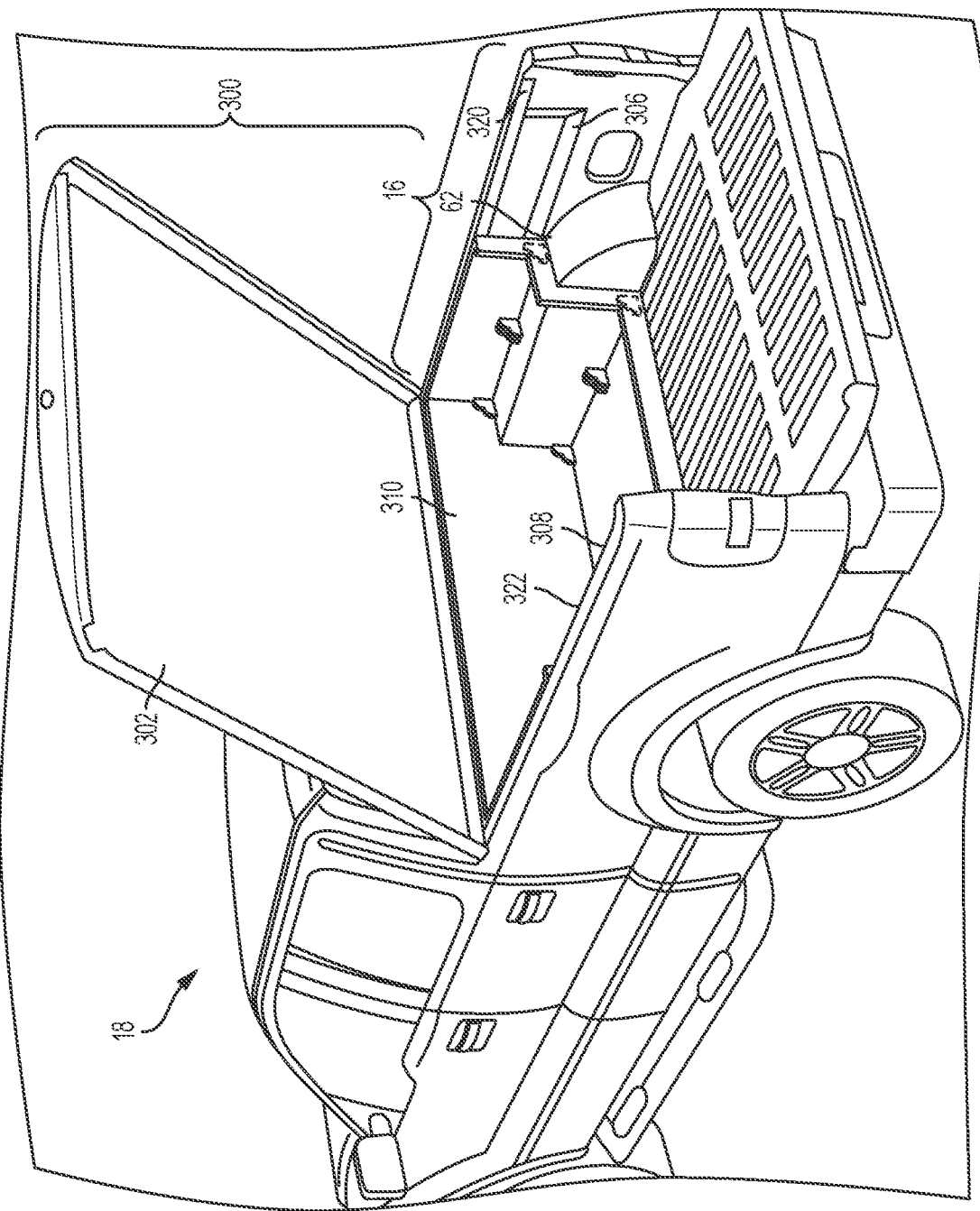
FIG. 28 illustrates the trunk shown in FIG. 27 with the tonneau cover in a raised position and a partition disposed against the front wall of a trunk.
Figure 29:
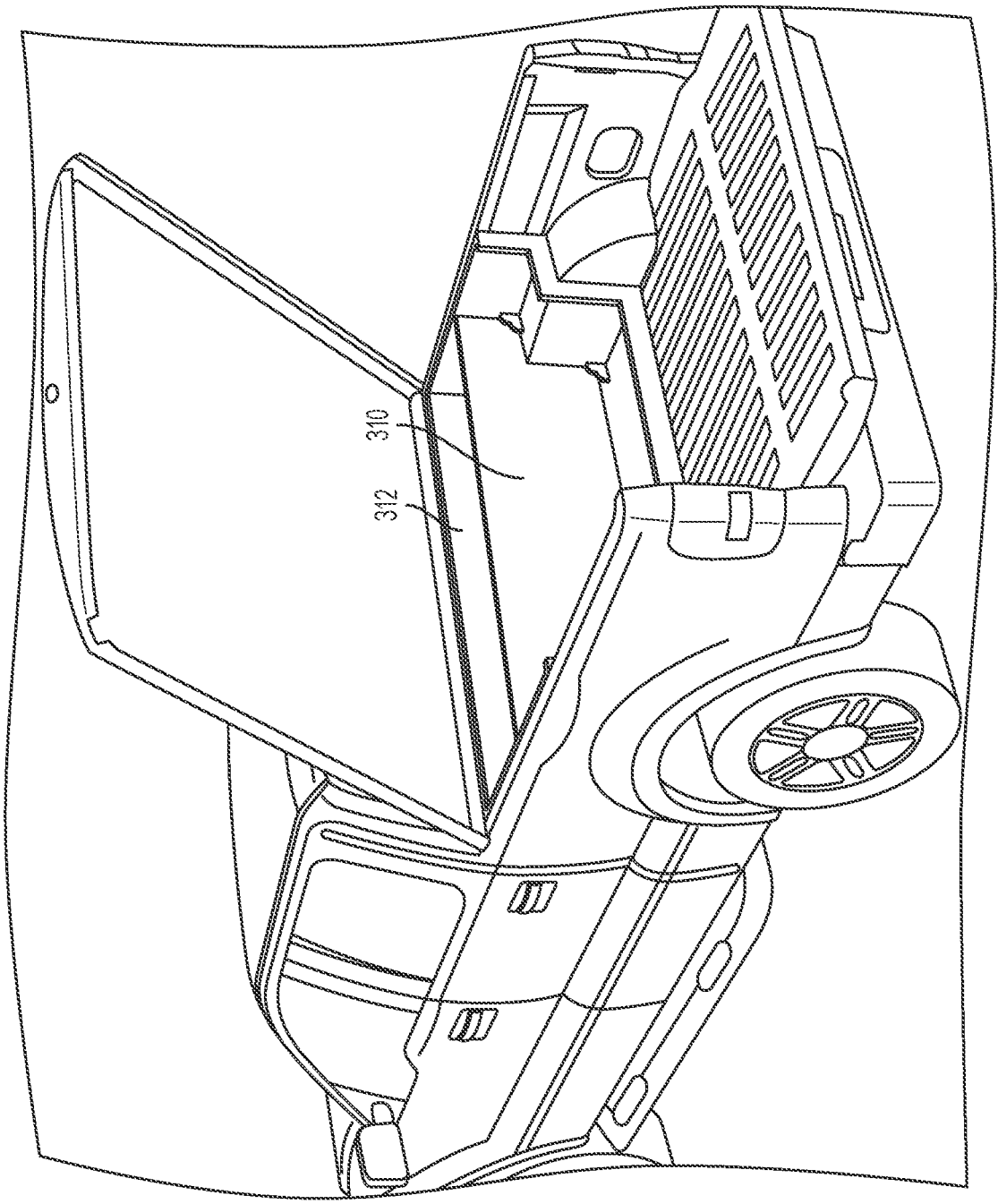
FIG. 29 illustrates the trunk shown in FIG. 28 with the partition disposed in a middle of the trunk.
Figure 30:
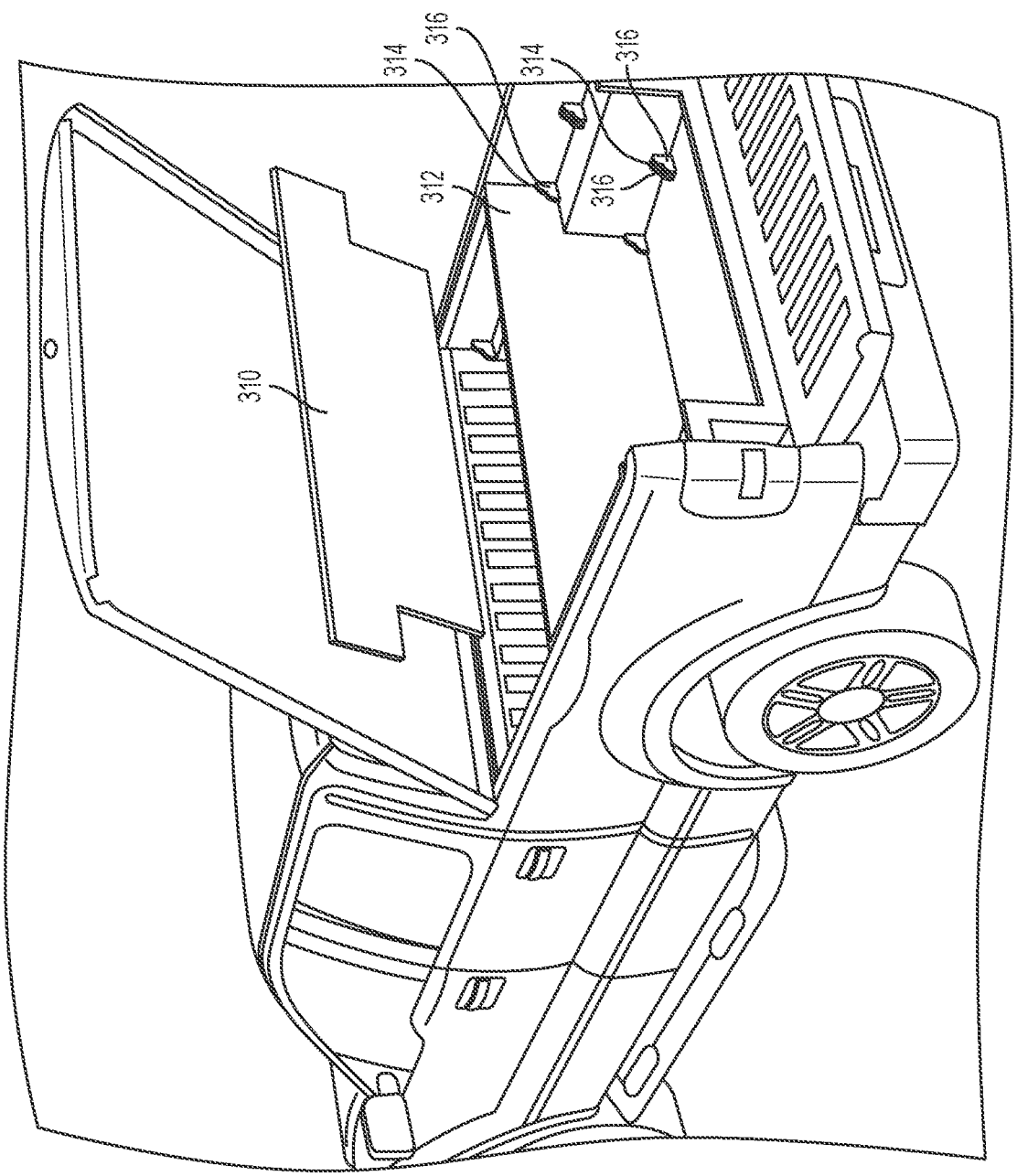
FIG. 30 illustrates the trunk traversed to a back position with the partition removed from the trunk.
Figure 31:
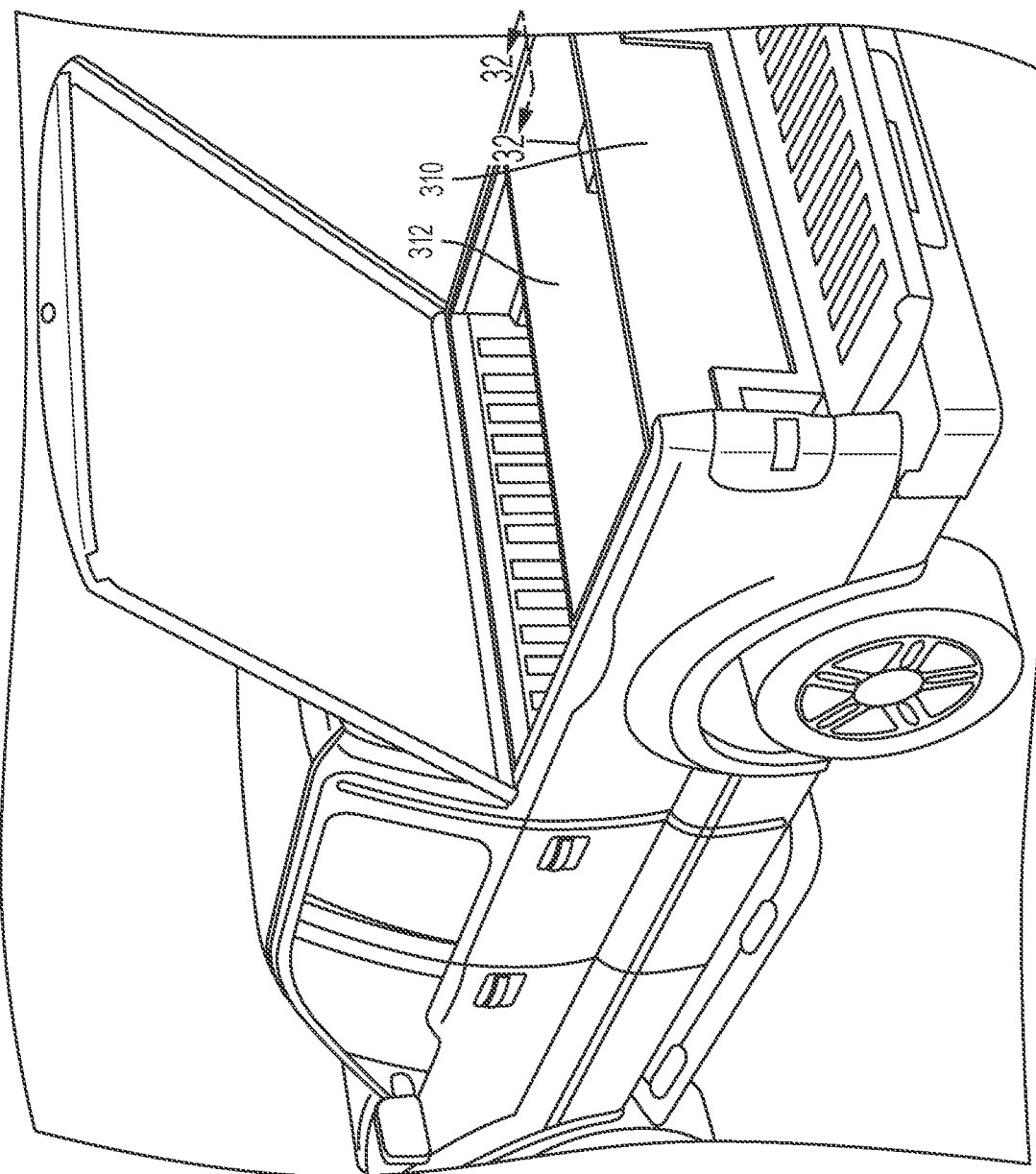
FIG. 31 illustrates the trunk in the back position with the partition installed at a rear position of the trunk.
Figure 32:
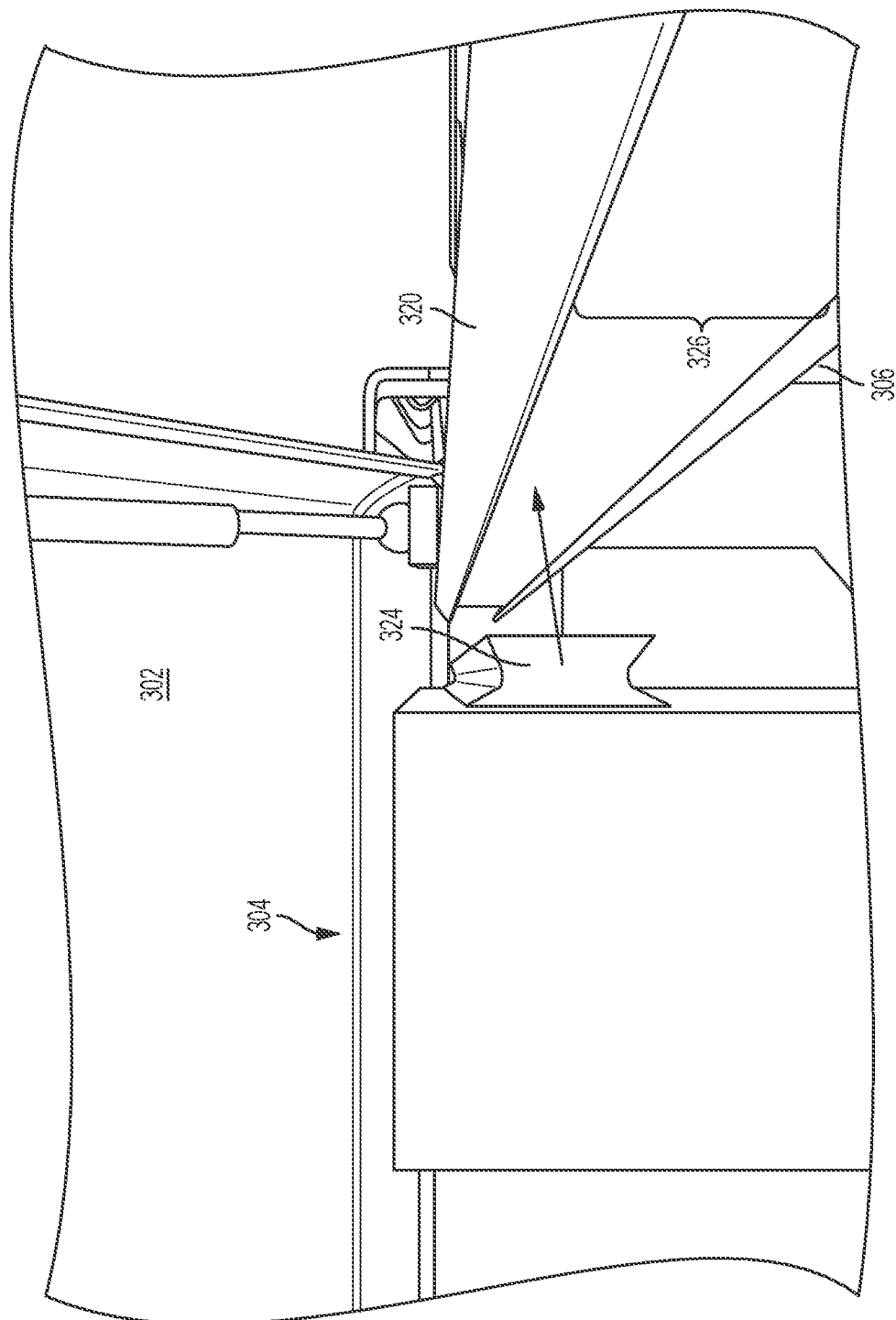
FIG. 32 is an enlarged view of the trunk and the tonneau cover.

Referring now to FIGS. 27-32, the trunk 300 is shown as being horizontally traversable and mountable to left and right rails 320, 322 (see FIG. 28) that are attached to interior surfaces 306, 308 of the left and right side walls 28, 30 of the truck bed. The trunk 300 comprises the tonneau cover 302 and the trunk 304. To reconfigure the trunk 300, the user may traverse the trunk 304 to the front position shown in FIG. 28 or to the back position shown in FIGS. 30 and 31. To do so, the trunk 304 rides on the left and right rails 320, 322. The trunk 304 may have left and right male members that engage the left and right rails 320, 322. In FIG. 32, only the passenger side male member 324 is shown to mates with the left rail 320. However, the driver side also has a driver side male member that slideably mates with the right rail 322. To access the trunk 304, the user may lift the tonneau cover 302 to the up position shown in FIG. 28. To close the trunk, the user closes the tonneau cover 302 as shown in FIG. 27. In either of the front and back positions, a partition 310 may be placed against a front wall 312 of the trunk 304 as shown in FIG. 28. The front wall 312 is covered by the partition 310 and cannot be seen in FIG. 28 but is visible in FIGS. 29, 30 and 31. The partition 310 may also be placed in the middle of the trunk 304 (see FIG. 29) as well as at a back side of the trunk 304 as shown in FIG. 31.

The partition 310 may be secured to the front middle or back side of the trunk 304 by way of grooves 314 formed by feet 316 wherein the groove 314 is defined by the feet 316. The feet 316 may be placed at various positions along the panels of the trunk 304. The feet 316 may be placed on both the left and right sides of the trunk 304 so that the grooves 314 formed by the feet 316 can support the left and right sides of the partition 312. The partition 312 may be inserted into the grooves 314 from the top side of the feet. To reposition the partition 310, the user lifts the partition 310 out of one set of grooves/feet 316 and drops the partition 310 into another set of grooves/feet 316. By doing so, the size of the enclosure defined by the trunk 304, partition 310 and the tonneau cover 302 is enlarged or reduced as desired by the user. The partition 310 is held vertically in place at the front and back of the trunk 304 with the aid of the feet 316 and the front wall 312 or the back lip.

The left and right sections 348, 350 may be identical but mirror images of each other and have a step 352, 354 that accommodates the left and right wheel wells 56, 58 of the truck bed so that the trunk 304 may be easily traversed between the front and back positions without having to vertically lift the trunk 10 over the wheel wells 56, 58 of the truck bed 16. The bottom panel 346 may be disposed close to but not in contact with a floor 60 of the truck bed 16 so that the trunk may easily slide in the horizontal direction. The steps 352, 354 may be positioned above the highest point 62 of the wheel wells 56, 58. The highest point of the wheel wells 58 is not shown but is identical to the highest point 62 (see FIG. 2A) of the wheel well 56.

The trunk 304 may be horizontally slidable and mounted to the left and right side walls 28, 30 of the truck bed. In particular left and right rails 320, 322 may be fixedly secured to interior surfaces 306, 308 of the left and right side walls 28, 30 of the truck bed 16. Preferably, the left and right side rails 320, 322 are positioned parallel and level with the floor 60 of the truck bed. In order to secure the left and right rails 320, 322 to the interior surfaces 304, 306 of the left and right side walls 28, 30 of the truck bed 16, the left and right rails 320, 322 may be bolted to the interior surfaces 306, 308 of the left and right side walls 28, 30. Alternatively, the left and right rails 320, 322 may have enlarged nubs that fit within keyhole shaped slots formed in the interior surfaces 306, 308 of the left and right side walls 28, 30. The left and right sections may have tongues 324 that fit within the grooves 326 of the left and right rails 320, 322. Preferably the tongues 324 and the grooves of the rails 320, 322 may have a wedge shaped configuration (see FIG. 32) that slidably mates with each other. In order to dispose the tongues 324 into the grooves 326 of the left and right rails 320, 322, the rails 320, 322 may be mounted to the left and right side walls of the truck bed. With the tailgate open, the trunk 304 is inserted into the truck bed from the rear of the truck bed so that tongues 324 can slide into the grooves 326 of the left and right rails 320, 322.

Moreover, the grooves 326 may optionally have ball bearings that help to support the trunk 304 and to allow convenient and easy horizontal traversal of the trunk 304 between the back and front positions on the rails 320, 322.

The left and right sections 348, 350 may have cross-sectional configuration that conforms to a cross-sectional inner profile of the left and right side walls 28, 30 including its wheel wells 56, 58. In this regard, the left and right sections 348, 350 may be close to but not in contact with the left and right side walls 28, 30 and the wheel wells 56, 58 of the truck bed to allow for horizontal traversal of the trunk 304 between the front and back positions without vertically lifting or traversal of the trunk.

The trunk may be secured in the front and back positions by way of a set screw. When the trunk is in the back position the set screws are engaged in the holes. The set screw is pushed down and frictionally engages the tongues to prevent movement of the truck. When the trunk is in the front position, the set screws are engaged in the holes. The set screws push down and frictionally engage tongues of the trunk 304 to prevent horizontal movement of the trunk 304. Alternatively or additionally, a detent may be incorporated into the trunk 304 and the rails 320, 322. The detent may be operative to lock the trunk 304 in either the back position or the front position.

The trunk 300 was described as having the tongues 324 mounted to the trunk 304 and mating left and right rails 320, 322 having grooves 326. However, it is also contemplated that the reverse configuration may be implemented. In particular, the grooves 326 may be formed in the members 324 that are attached to the trunk 304 and the left and right rails 320, 322 may have tongues that are received into the grooves formed in the members 324.

To install the trunk 304 to the truck bed 16, the left and right rails 320, 322 may be attached to the left and right side walls 28, 30 of the truck bed 16. As discussed above, there are at least two methods of attaching or fixedly securing the left and right rails 320, 322 to the side walls 28, 30. In particular, the keyhole shaped slots may be formed in the interior surfaces 306, 308 of the truck bed 16. These keyhole shaped slots receive nubs of the left and right rails 320, 322. The nubs are inserted into keyhole shaped slot and secured thereto in order to fix the left and right rails 320, 322. Alternatively, the left and right rails 320, 322 may be bolted to the interior surfaces 306, 308 of the left and right side walls 28, 30. The left and right rails 320, 322 may have grooves 326. These grooves 326 may be directed inwardly toward the center of the bed of the truck. These grooves may run the entire length or a substantial portion of the length of the truck bed so that the truck trunk 304 may be traversed horizontally between front and back positions without having to lift the trunk 304 vertically. As shown and described, the groove formed on the left and right rails 320, 322 receive the tongues of the trunk 304.

Before tightening the left and right rails 320, 322 to the interior surfaces 306, 308 of the left and right side walls 28, 30, the left and right rails 320, 322 may be slightly loose so as to be capable of rattling. In this state, the tongues 324 of the trunk 304 may be inserted into respective grooves of the left and right rails 320, 322. With the tongues disposed within the grooves, the left and right rails 320, 322 may now be adjusted and tightened onto the interior surfaces 306, 308 of the left and right side walls 28, 30.

The tongues may be linearly traversable within the grooves to allow the trunk 304 to be horizontally traversable between front and back positions. By being horizontally traversable, a person that may not be that strong may easily move the trunk between the front and back positions depending on the desired use of the trunk 304. If the trunk is in the back position, then the user may use the trunk 304 as a normal place to carry groceries. If the trunk 304 is in the front position, then the user may use the trunk 304 similar to a toolbox. In this fourth embodiment, the top of the trunk 304 is covered by way of the tonneau cover 302. The tonneau cover 302 extends the full length of the truck bed so that regardless of the position of the trunk 304, the top of the trunk 304 covers the trunk 304 when the tonneau cover 302 is in the down position.

In operation, the trunk 304 is locked either to the back position or the front position. If the user wants to segregate a portion of the truck bed into a smaller area to form a trunk 300, the user lifts the partition 310 and either disposes the partition in the middle or in the back side of the trunk 304 by engaging the partition 310 into the respective grooves. To close the trunk 300, the user traverses the tonneau cover 302 to the down position. To access the trunk 300, the user traverses the tonneau cover 302 to the up position. In this regard, the trunk 300 is versatile in that it utilizes existing tonneau covers 302.

The tonneau cover 302 may be a tonneau cover sold in the market currently or developed in the future. The trunk 304 is disposed below the tonneau cover 302 so that the trunk 304 operates in conjunction with tonneau covers 302 sold in the marketplace currently. The tonneau cover 302 shown in the drawings is one where the cover 302 is pivoted up and down at a hinge located adjacent to the cab of the truck. In the down position, the cover 302 closes the bed area of the truck and also closes off access to the truck trunk except through the tailgate when the partition 310 is in place. In the up position, the truck trunk is accessible through the top of the bed area. The tonneau cover 302 shown in the drawings are shown as being disposed above the left and right sidewalls of the truck bed. However, other types of tonneau covers 302 are also contemplated and may be used in conjunction with the trunk 304. By way of example and not limitation, the trunk 304 may be used in conjunction with ROLL COVERS sold by TRUCK COVERS USA of San Diego, California or a BAKFLIP sold by AMAZING TRUCK ACCESSORIES LP of Conroe, Texas. In these alternative types of tonneau covers, the covers are flush or below the upper surfaces of the left and right sidewalls of the truck bed.

The tonneau cover 302, partition 310 and the trunk 304 may be fabricated from a generally rigid material. By way of example and not limitation, any one of the tonneau cover 302, partition 310 and the trunk 304 may be fabricated from steel, aluminum, plastic, fiberglass, rubber, carbon fiber, canvas, carpet or combinations thereof. This means that the tonneau cover 302, partition 310 and the trunk 304 may be fabricated from the same material (e.g., 302, 304, 310 may all be fabricated from carbon fiber) or different materials (e.g., 302 may be fabricated from steel, 304 may be fabricated from carbon fiber, 310 may be fabricated from aluminum).

Referring now to FIGS. 33-40, various embodiments of a collapsible folding truck trunk are depicted, which may be specifically sized and structured to facilitate use of the collapsible folding truck trunk within an area of the vehicle including the wheel well, such as the bed of a pickup truck. The collapsible folding truck trunk may be designed to stretch over the wheel well or reside between the wheel well and the rear end of the vehicle. As such, whereas the wheel well has interfered with the deployment and use of conventional truck trunks, the collapsible folding truck trunk disclosed herein may be capable of being used in the area adjacent the wheel well so as to maximize storage on the vehicle. Furthermore, the collapsible folding truck trunk may also allow a user to store smaller items, such as groceries, and other personal items, therein to prevent such items from being tossed about the bed of the pickup truck during movement of the pickup truck. In addition, the ability of the trunk to be placed near the wheel well may allow the user to easily access the collapsible folding trunk from the rear end of the pickup truck.

Figure 33:
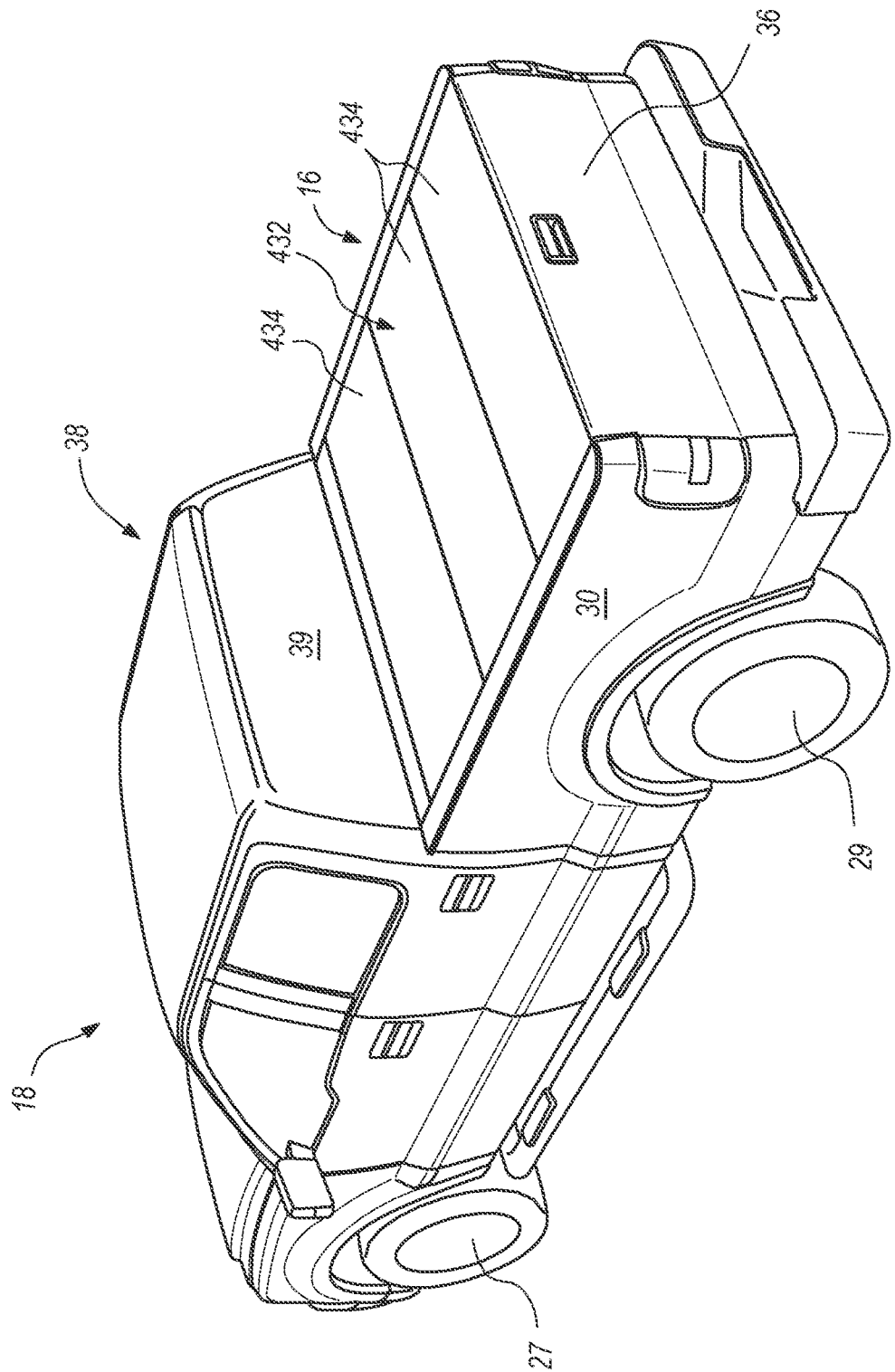
FIG. 33 is an upper perspective view of a pickup truck having a truck bed, with a cover extending over the truck bed.

Referring now to FIG. 33, the pickup truck 18 depicted therein includes passenger cabin 38, i.e., "cab," and truck bed 16. The exemplary cab 38 includes a pair of driver's side doors and a pair of passenger's side doors opposite the driver's side doors. It is understood that while the exemplary cab 38 includes two rows of seating, and thus, two doors on each side of the cab 38, it is contemplated that the pickup truck 18 may include a single row of seating, and thus, may include only one door on each side of the cab 38. The cab 38 may include a rear wall 39 positioned behind the seating in the cab 38 and defining a rear end of the cab 38. Many pickup trucks 18 include a window in the rear wall 39, but it is also contemplated that the rear wall 39 may be formed without a window.

Figure 34:
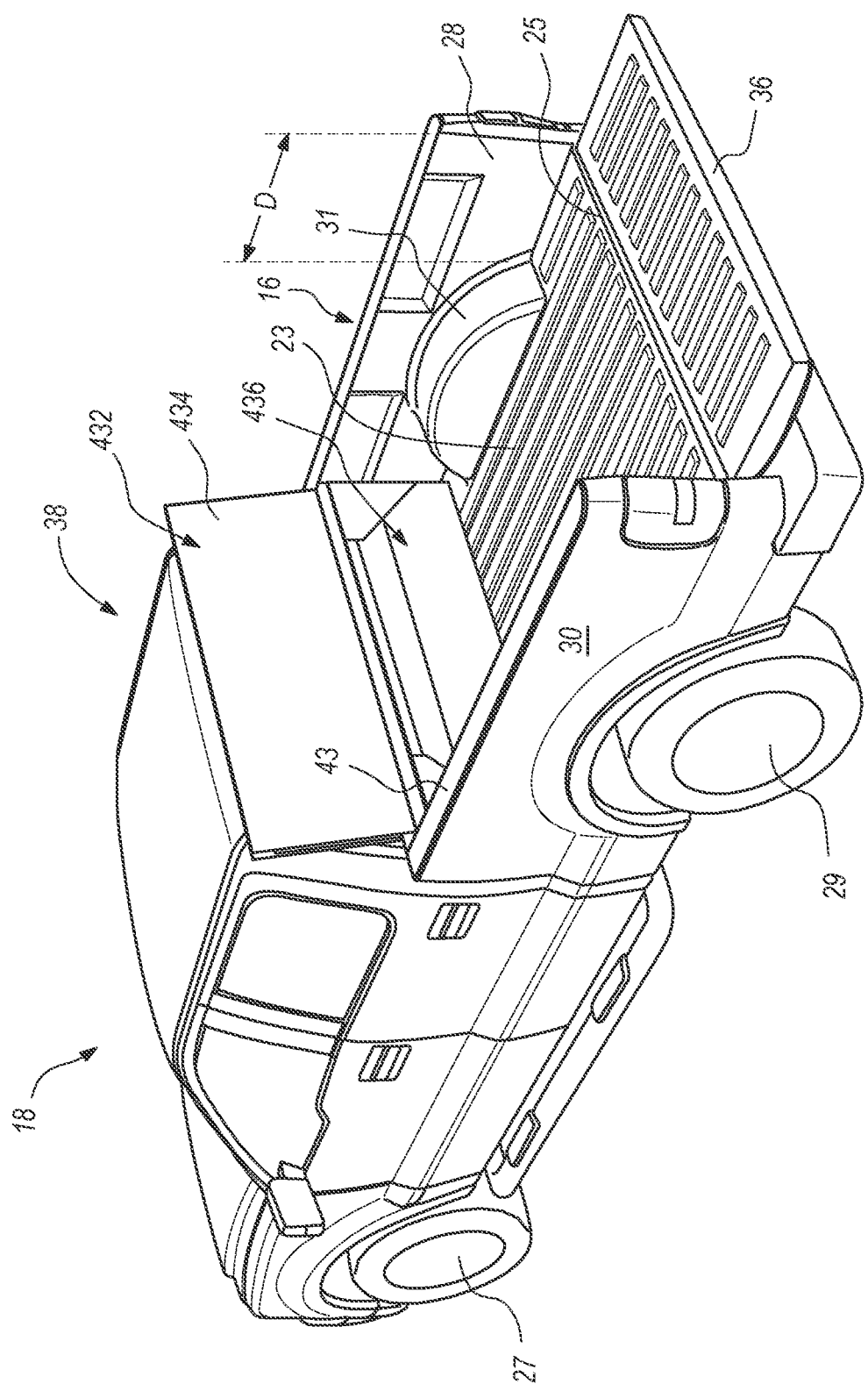
FIG. 34 is an upper perspective view of the pickup truck of FIG. 33, with the cover being removed from the truck bed to expose a collapsible folding truck trunk stored in the truck bed adjacent a cab of the pickup truck.

The truck bed 16 may be positioned to the rear of the cab 38 and may include a forward wall 41 (see FIG. 35), the pair of side walls 28, 30 and tailgate 36 extending between the pair of side walls 28, 30 and pivotally coupled to a truck bed floor 23 (see FIG. 34). The truck bed 16 defines a storage area of the pickup truck 18, wherein the driver may place items for transport. The truck bed floor 23 may be formed with ribs to enhance the strength thereof. The truck bed floor 23 includes a rear end 25 opposite the cab 38 and adjacent the tailgate 36. The tailgate 36 may be transitional between a raised position (see FIG. 33), wherein the tailgate 36 may be generally perpendicular to the truck bed floor 23 to retain items in the truck bed 16, and a lowered position (see FIGS. 34-40), wherein the tailgate 36 may generally form a continuation of the truck bed floor 23 to facilitate removal of items from the truck bed 16. It is understood that instead of a tailgate 36, some pickup trucks 10 may include a net or other element extending between the pair of side walls 28, 30 adjacent the rear of the truck bed 16 to prevent items from sliding off the truck bed 16 as the pickup truck 18 moves.

The pickup truck 18 additionally includes a pair of front wheels 27, a pair of rear wheels 29, and a pair of wheel wells 31 (see FIG. 34) formed therein to accommodate the pair of rear wheels 29. In this regard, the wheel wells 31 include the portion of the truck bed 16 that extends over the rear wheels 29. The wheel wells 31 may be spaced from the rear end 25 of the truck bed floor 23 by a distance D. In many instances, each wheel well 31 may include a protruding portion that extends above the truck bed floor 23 between the side walls 28, 30 of the truck bed 16. The protruding portion in the exemplary embodiment includes an arcuate body.

As shown in FIG. 32, a tonneau cover 432 may extend over the truck bed 16 to enclose the storage area defined by the truck bed 16. The tonneau cover 432 may be selectively transitional between an extended configuration (see FIG. 33) and a collapsed configuration (see FIGS. 34-40). In the extended configuration, the tonneau cover 432 may extend over the truck bed 16 in one direction from the tailgate 36 to the forward wall 41, and in another direction between the pair of side walls 28, 30. As the tonneau cover 432 moves from the extended configuration toward the collapsed configuration, the degree by which the tonneau cover 432 extends over the truck bed 16 may decrease, and vice versa. The tonneau cover 432 may be folded or rolled onto itself to assume the collapsed configuration. In the exemplary embodiment, the tonneau cover 432 is formed of three panels 434 or regions pivotally coupled to each other to facilitate selective transition of the tonneau cover 432 between the extended configuration and the collapsed configuration. The three panels 434 may be folded onto each other, and moved toward the cab 38 to assume the collapsed configuration and to uncover the truck bed 16.

Referring now specifically to FIG. 34, one embodiment of a collapsible folding truck trunk 436 is shown in a collapsed configuration and is stored against the forward wall 41 of the truck bed 16. In the collapsed configuration, the collapsible folding truck trunk 436 may be folded so as to be sized to fit within the truck bed 16 and may be capable of having a form factor which does not protrude above an upper surface 43 the truck bed 16 so as not to interfere with the tonneau cover 432 when the tonneau cover 432 is in the extended configuration. In one implementation, when the collapsible folding truck trunk 436 is in the collapsed configuration, the periphery of the collapsible folding truck trunk 436 may be slightly smaller than the forward wall 41 of the truck bed 16. As will be described in more detail below, the collapsible folding truck trunk 436 may be transitional from the collapsed configured to a deployed configuration for use in storing items within the truck bed 16. As used herein, the term "collapse" may refer broadly to the ability to transition from a deployed, enlarged configuration, to a stowed, smaller configuration. Thus, with regard to the collapsible folding truck trunk 436, it is contemplated that the trunk 436 may be "collapsed" via folding, bunching, rolling, deflating, bending, or other techniques known in the art which allow the trunk to occupy a smaller volume.

Figure 35:
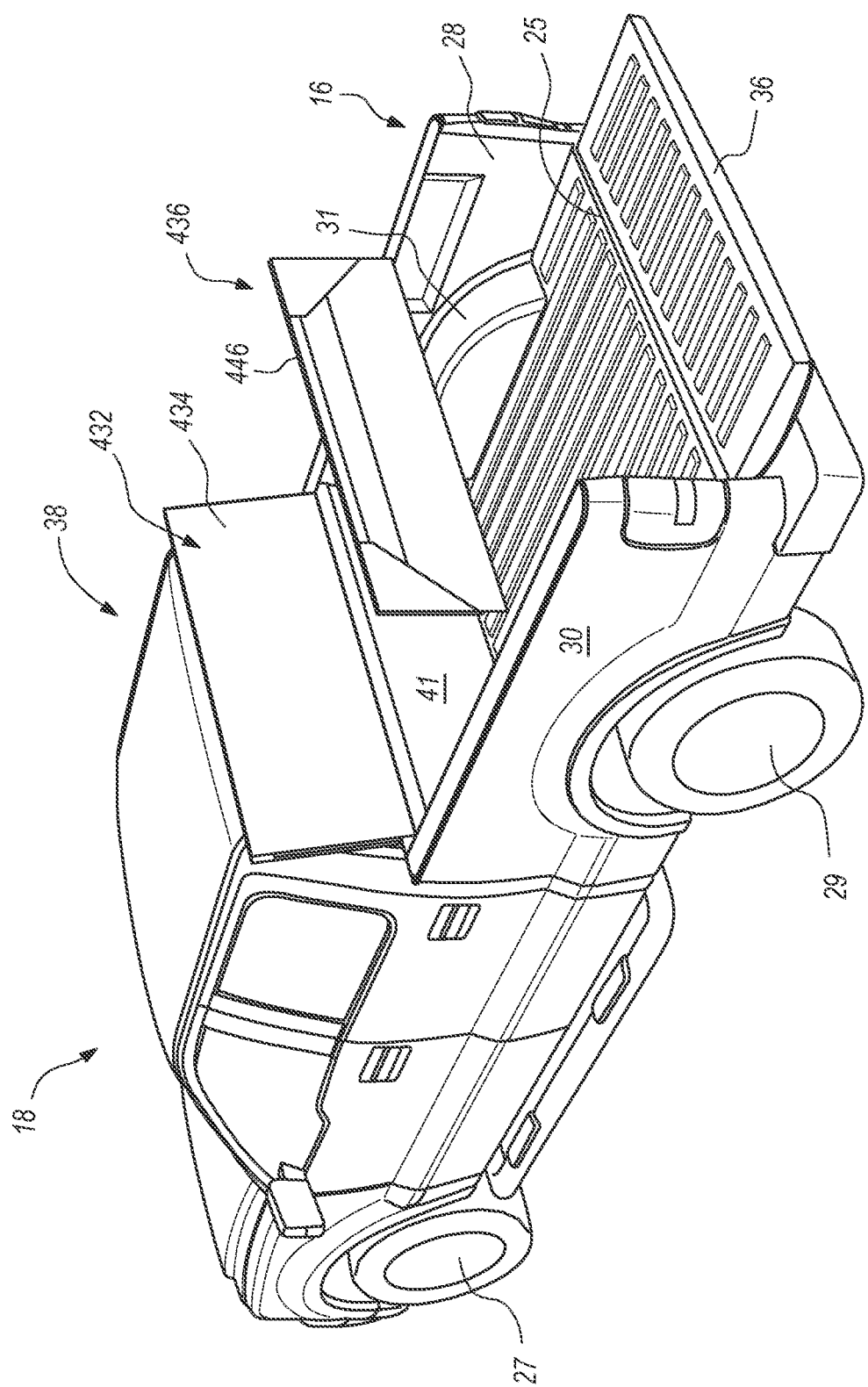
FIG. 35 is an upper perspective view of the pickup truck and collapsible folding truck trunk of FIG. 34, with the collapsible folding truck trunk being moved away from the cab to facilitate unfolding of the collapsible folding truck trunk.
Figure 36:
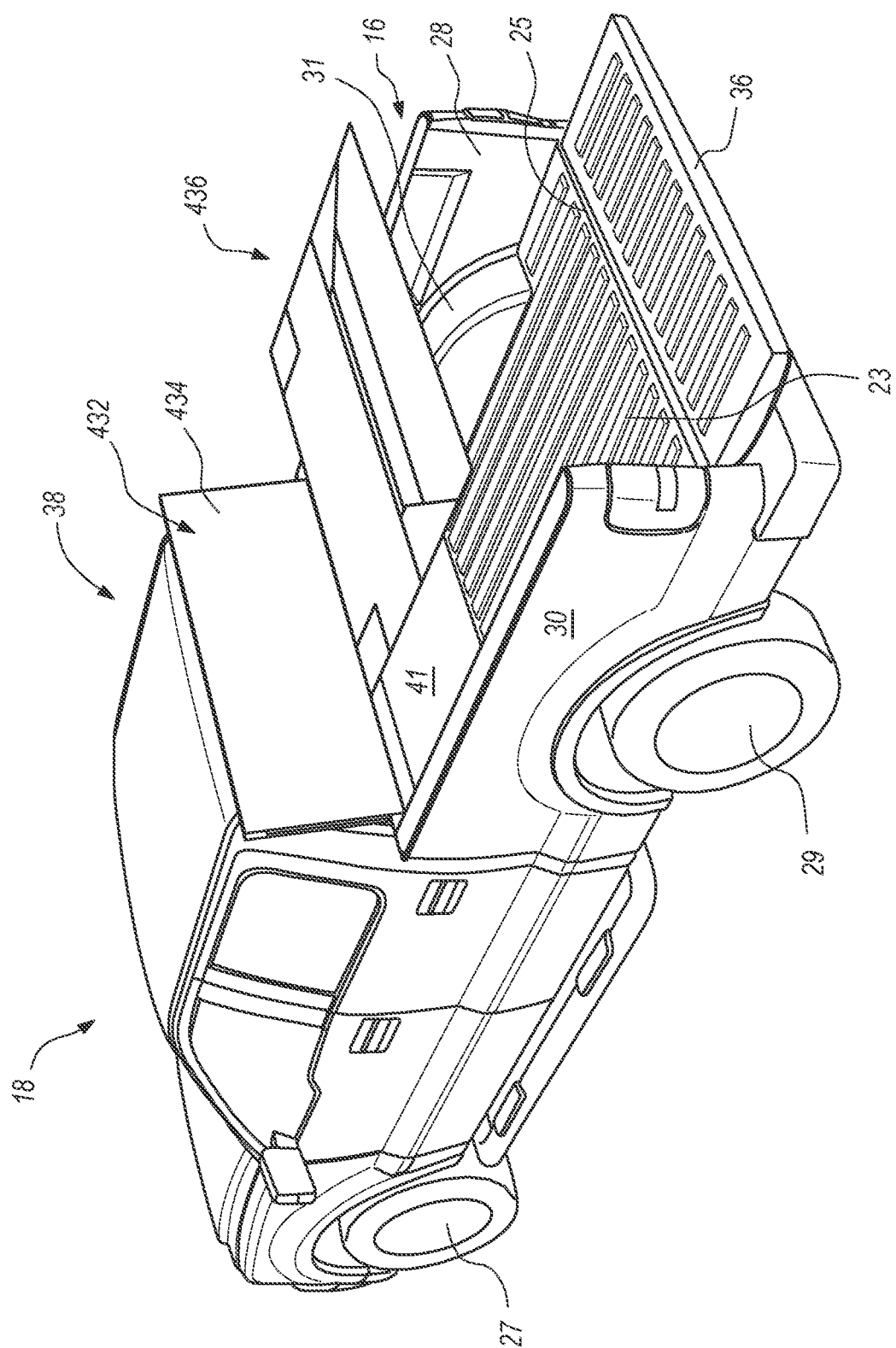
FIG. 36 is an upper perspective view of the pickup truck and collapsible folding truck trunk, with the collapsible folding truck trunk being an a partially deployed configuration.
Figure 37:
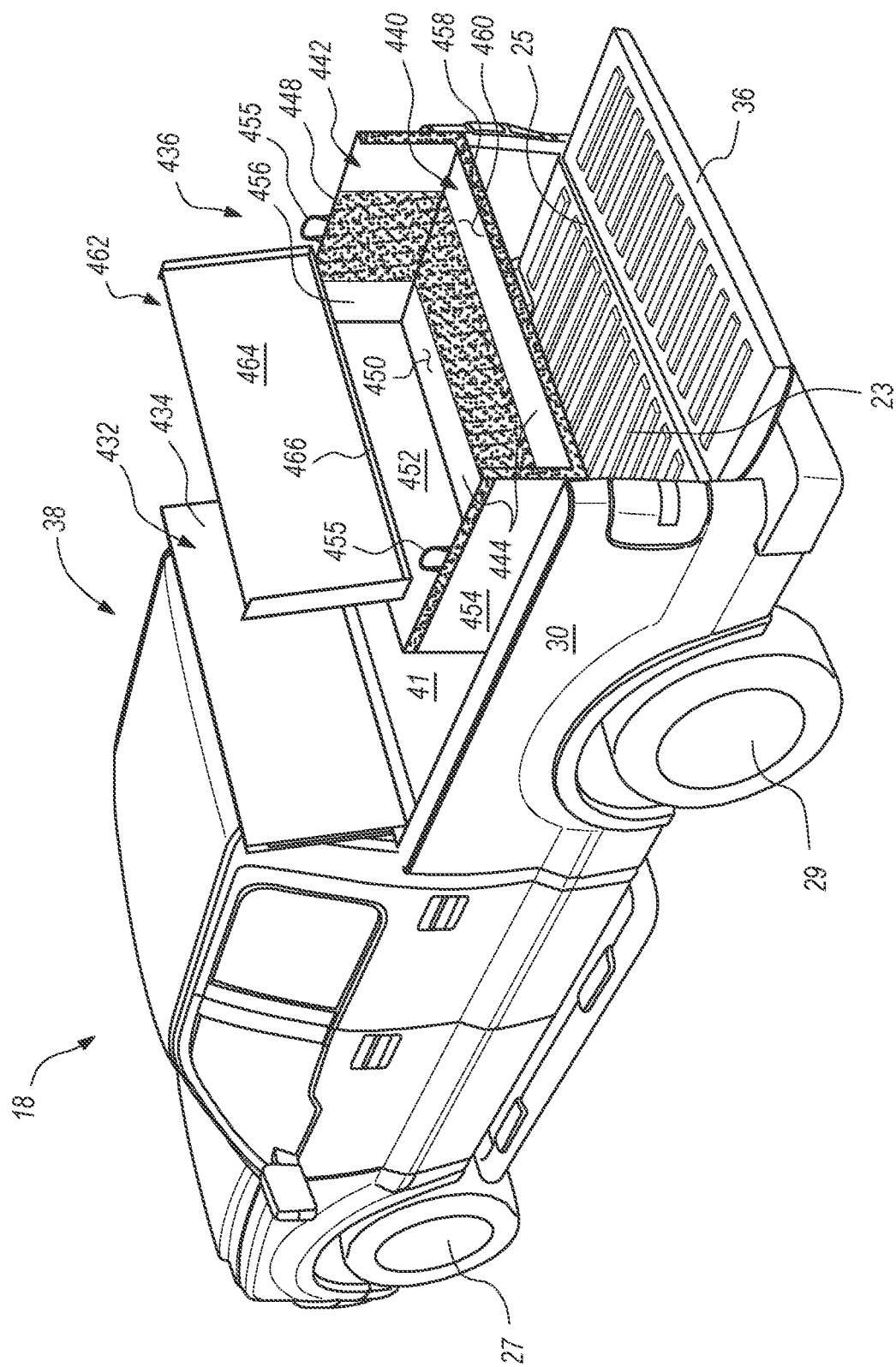
FIG. 37 is an upper perspective view of the pickup truck and collapsible folding truck trunk, with the collapsible folding truck trunk including a primary unit completely unfolded, and a dividing wall exploded from the primary unit.
Figure 38:
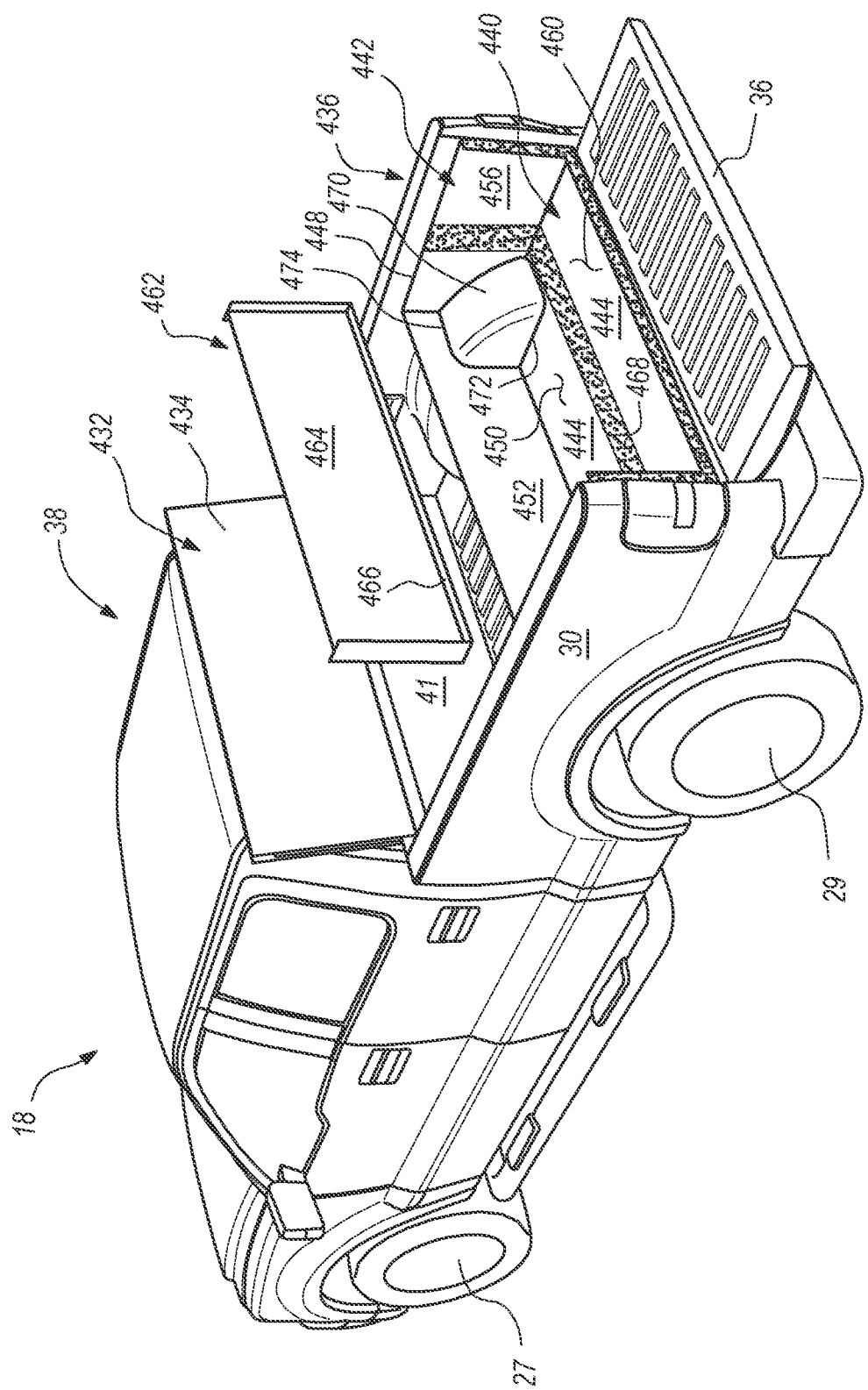
FIG. 38 is an upper perspective view of the pickup truck and collapsible folding truck trunk, with the primary unit being placed over a wheel well.

FIGS. 34 and 35 show the collapsible folding truck trunk 436 in the collapsed configuration, while FIG. 36 shows the collapsible folding truck trunk 436 in an intermediate configuration between the collapsed configuration and the deployed configuration, and FIGS. 37 and 38 show the collapsible folding truck trunk 436 in the deployed configuration.

The collapsible folding truck trunk 436 may include a base wall 440 (see FIGS. 37 and 38) and a side wall 442 (see FIGS. 37 and 38) pivotally connected to the base wall 440. The base wall 440 may be sized and structured so as to extend over the floor 23 of the truck bed 16 when the collapsible folding truck trunk 436 is in the deployed configuration. The base wall 440 may be comprised of a plurality of base panels 444 pivotally connected to each other. In the exemplary embodiment, the base wall 440 includes a pair of base panels 444 separated by a pivot fold 446, wherein each of the base panels 444 is of a quadrangular configuration. However, it is contemplated that the shape and number of base panels 444 may vary without departing from the spirit and scope of the present disclosure. For instance, the base wall 440 may be circular, and include semi-circular base panels. Each base panel 444 may be comprised of a rigid insert surrounded by a fabric cover, such as a cardboard, plastic, or rubber insert surrounded by a nylon fabric cover, plastic sheet or rubber sheet. Other materials may be used for the insert and/or the cover without departing from the spirit and scope of the present disclosure.

The base wall 440 may interface with the floor 23 of the truck bed 16 when the trunk 436 is in the deployed configuration, and thus, at least one surface of the base wall 440 may include a gripping material, such as rubber, along an external surface thereof. The gripping material may inhibit sliding of the trunk 436 during movement of the truck 18.

The side wall 442 may extend from the base wall 440 and terminates at an upper edge 448. The side wall 442 and base wall 440 may collectively define a storage cavity 450. The side wall 442 may be comprised of plurality of side wall panels. The exemplary truck trunk 436 includes a first side wall panel 452 extending along a longitudinal edge of the base wall 440, second and third side wall panels 454, 456 extending in opposed relation to each other and from opposed ends of the first side wall panel 452, and a fourth side wall panel 458 in opposed relation to the first side wall panel 452. The side wall panels 452, 454, 456, 458 may collectively define the side wall 442, which extends around at least a portion of the base wall 440. Although the exemplary embodiment includes four side wall panels, it is contemplated that the side wall 442 may be comprised of a single, continuous side wall panel. One or more of the side wall panels 452, 454, 456, 458 may have a pocket panel coupled thereto to form a pocket for storage of smaller items, such as keys, or other small, personal items.

As shown in FIGS. 37 and 38, the fourth side wall panel 458 may include a cutout 460 extending from the upper edge 448 and toward the base wall 440. The cutout 460 may be sized and structured to facilitate insertion of items into the storage cavity 450, and removal of items from the storage cavity 450, particularly when the tailgate 36 is lowered. Although the exemplary embodiment includes a trunk 436 having a fourth side wall panel 458 having a cutout 460 formed therein, it is contemplated that the fourth side wall panel 458 may be absent in other embodiments of the trunk 436, in which case the trunk 436 includes an opening opposite the first side wall panel 452 which is effectively the same size as the first side wall panel 452.

Figure 40:
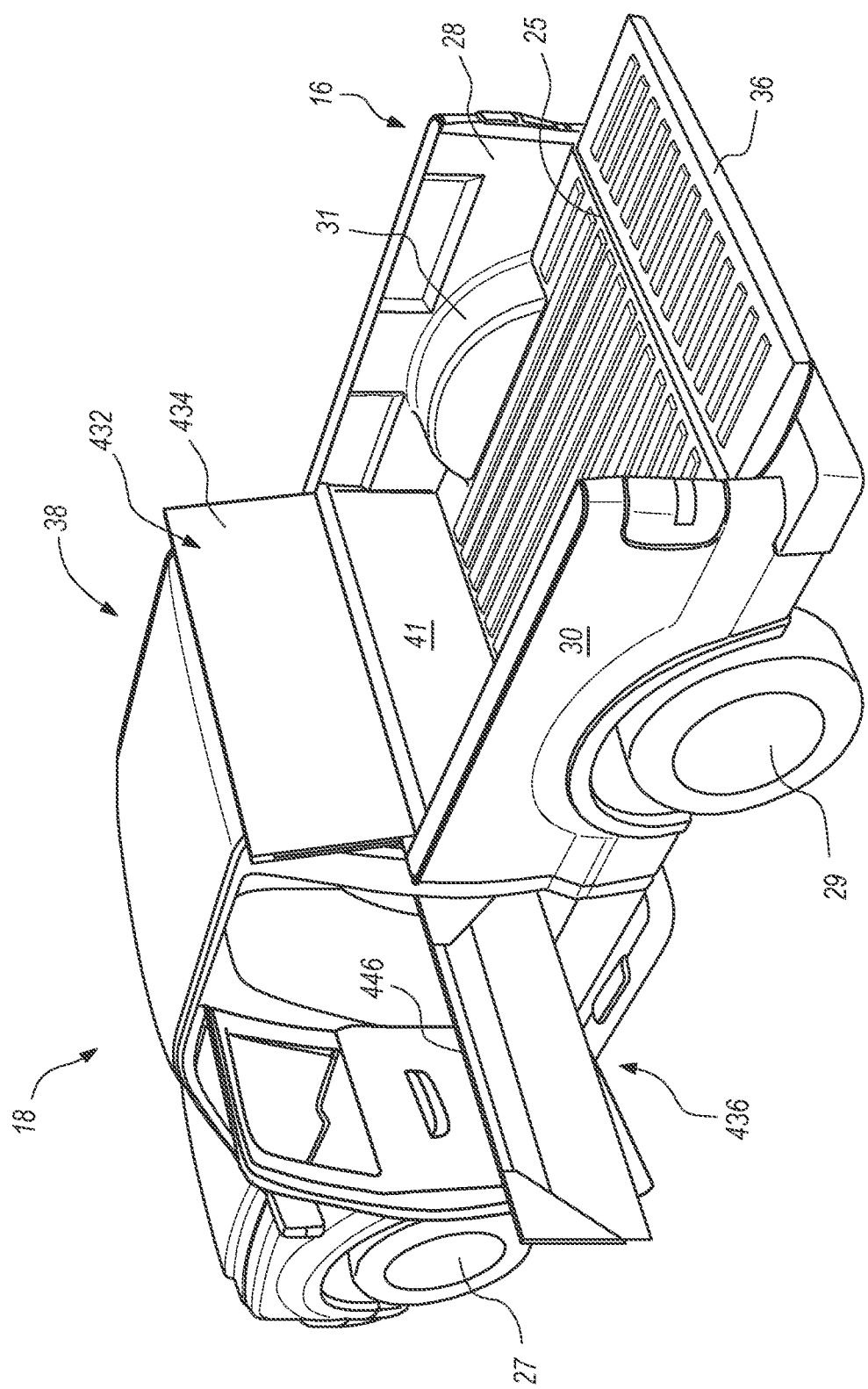
FIG. 40 is an upper perspective view of the pickup truck and the collapsible folding truck trunk in a collapsed configuration and stored in the cab of the pickup truck

The collapsible folding truck trunk 436 may be selectively transitional between the collapsed configuration and the deployed configuration. In the collapsed configuration, the plurality of base panels 444 may overlap each other, such that the base panels 444 are pivoted onto each other so as to define a common footprint. Moreover, in the collapsed configuration, the side wall panels 452, 454, 456 may be folded or bunched together to assume a minimal size. When the collapsible folding truck trunk 436 is in the collapsed configuration, the trunk 436 may assume a generally planar configuration, to facilitate placement of the collapsed trunk 436 against the forward wall 41 of the truck bed 16, or alternatively, for placement within the cab 38, such as behind a row of passenger seating, as is shown in FIG. 40.

In the deployed configuration, the plurality of base panels 444 may be co-planar to each other, such that the base panels 444 are in a side-by-side arrangement, with the pivot fold 46 residing between the base panels 444. Furthermore, in the deployed configuration, the side wall panels 452, 454, 456, 458 may assume respective, generally planar configurations, with the upper edge 448 of the side wall 442 being spaced from the base wall 440. Along these lines, as the collapsible folding truck trunk 436 moves from the collapsed configuration toward the deployed configuration, the upper edge 448 of the side wall 442 may move away from the base wall 440. Adjacent side wall panels 452, 454, 456, 458 may be separated by a crease or fold line. Conversely, as the collapsible folding truck trunk 436 moves from the deployed configuration toward the stowed configuration, the upper edge 448 may move toward the base wall 440.

To transition the collapsible folding truck trunk 436 from the deployed configuration toward the collapsed configuration, the side panels 452, 454, 456, 458 may be folded over the base wall 440, which may result in bunching or folding of the side panels 452, 454, 456, 458. For instance, the side wall panels 452, 454, 456 may be folded into a generally triangular configuration as they are folded onto the base wall 440. Once the side panels 452, 454, 456, 458 are folded onto the base wall 440, the base wall panels 444 may be folded on to each other, with the side panels 452, 454, 456, 458 being captured between the base wall panels 444. The collapsible folding truck trunk 436 may include a latch or other locking mechanism for retaining the collapsible folding truck trunk 436 in the collapsed configuration.

The collapsible folding truck trunk 436 may include one or more handles 455 connected to respective portions of the side wall 442 to facilitate lifting and carrying of the trunk 436, particularly when the trunk 436 is in the deployed configuration. The handles 455 may be fabricated from woven nylon, plastic, rubber, or other materials known in the art. The trunk 436 may include at least one pair of handles 455 in opposed relation to each other, i.e., connected to opposing side wall panels.

The collapsible folding truck trunk 436 may optionally include a divider 462 for dividing the storage cavity 450 when the trunk 436 is in the deployed configuration. In the exemplary embodiment, the divider 462 may include a divider wall 464 and an attachment element 466 coupled to the divider wall 464. The attachment element 466 may be selectively engageable with the base wall 440 to allow the divider wall 464 to extend upwardly from the base wall 440 to divide the storage cavity 450 into two discrete regions. According to one embodiment, the attachment element 466 includes hook and loop fasteners (i.e., VELCRO™) which may be attachable to a corresponding strip 468 of hook and loop fasteners extending along the base wall 440 and side wall 442. The attachment element 466 may extend along one or more vertical edges of the divider wall 464 to facilitate connection between the divider wall 464 and the side wall 442. The strip 468 formed on the base wall 440 and side wall 442 may be wide enough to allow for selective positioning of the divider 462 within the trunk 436. In this regard, the divider 462 may be moved closer to the side wall panel 52, or alternatively, moved away from the side wall panel 452, based on the desire of the user.

It is contemplated that the divider 462 may not only divide the storage compartment into several smaller sub-compartments, the divider 462 may enhance the overall rigidity of the trunk 436 by providing a brace or support to opposed side wall panels.

The divider wall 464 may include sufficient internal rigidity to independently extend upwardly from the base wall 440 when the attachment element 466 is attached to the base wall 60. For instance, the divider wall 464 may include a rigid body, such as a sheet of plastic, cardboard, rubber, or the like. Alternatively, the divider wall 464 may lack internal rigidity, yet still be capable of extending upwardly from the base wall 440 via selective attachment to the side wall 442.

Figure 39:
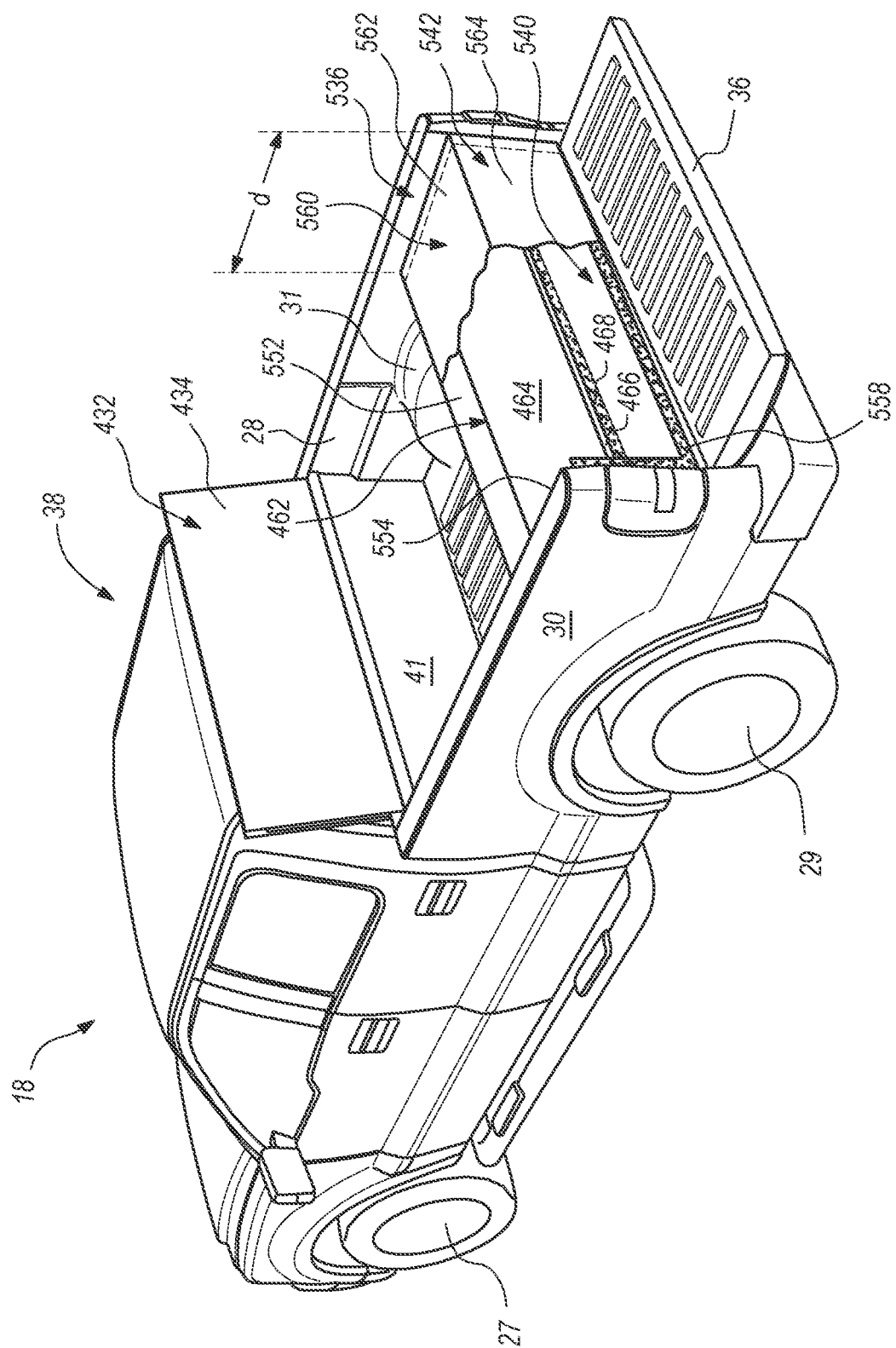
FIG. 39 is an upper perspective view of the pickup truck and another embodiment of the collapsible folding truck trunk sized to fit between the wheel well and a rear end of the truck bed.

The divider 462 depicted in FIGS. 37-39 includes a single divider wall that extends longitudinally through the storage cavity 450 approximately halfway between the side wall panels 452, 458 to divide the storage cavity 450 into a pair of approximately equal regions. However, it is contemplated that the divider 462 may include more than one divider wall, so as to divide the storage cavity into more than two regions. For instance, the divider may include a pair of intersecting divider walls that segregate the storage cavity 450 into four regions. Furthermore, it is contemplated that the divider may be arranged to extend transversely across the storage cavity 450, between side wall panels 454, 456.

The divider 462 may be capable of assuming a generally planar configuration, to facilitate storage of the divider 462 when the collapsible folding truck trunk 436 is in the collapsed configuration. For instance, the divider 462 may be placed between the pair of base panels 444 when the collapsible folding truck trunk 436 is in the collapsed configuration.

As noted above, the collapsible folding truck trunk 436 may be specifically sized and structured to accommodate the protruding configuration of the wheel well 31. In the embodiment depicted in FIG. 38, the collapsible folding truck trunk 436 may include an expandable portion 470 which conforms to the physical contour of the wheel well 31 as it is placed over the wheel well 31. The expandable portion 470 may be comprised of a resilient, stretchable element, such as an elastic sheet formed of a stretchable fabric known in the art. Exemplary materials may include lycra, neoprene, rubber, as well as other resiliently stretchable materials.

The expandable portion 470 may form part of the base wall 440 and the side wall 442. In this regard, it is understood that the remaining portions of the base wall 440 and the side wall 442 may generally be non-expandable or rigid. More specifically, the non-expandable portion of the base wall 440 may include an edge 472 that is of a configuration which mimics the outer contour of the wheel well 31.

Likewise, the non-expandable portion of the side wall 442 may include an edge 474 that mimics the outer contour of the wheel well 31. As such, whereas the non-expandable portions of the base wall 440 and side wall 442 may be configured to extend around the periphery of the wheel well 31, the expandable portion 470 may be designed to extend over the wheel well 31 when the collapsible folding truck trunk 436 is positioned in the truck bed 16, with the side wall panel 452 extending between the wheel wells 31 (e.g., within a plane that intersects the wheel wells 31). The edges 472, 474 may be sized to extend around the wheel well 31 in close proximity to the wheel well 31 or spaced away from the wheel well 31.

One embodiment of the trunk 436 may include a pair of expandable portions 470 intended to interface with a respective wheel well 31. In other words, as the deployed trunk 436 is placed in the truck bed 16 adjacent the wheel wells 31, each expandable portion 470 may expand over one of the wheel wells 31 to engage with the wheel wells 31. The ability of the trunk 436 to engage with the wheel wells 31 in a cooperatively engageable manner may not only enhance the ability to store items near the rear of the pickup truck 18, such engagement may also help to prevent movement of the trunk 436 within the truck bed 16 during movement of the pickup truck 18.

According to one implementation, each expandable portion 470 may extend in one direction from the respective side panel 454, 456 by an amount in the range of 8-24 inches, and in another direction from the base wall 440 by an amount in the range of 8-24 inches. In this regard, the size of the expandable portion 470 may be varied to accommodate wheel wells 31 that vary in dimension. However, it is also contemplated that the trunk 436 may be useable with different truck beds 14, with the expandable portion 470 providing an ability to universally fit different sized wheel wells 14.

The ability of the expandable portion 470 to expand over the wheel well 31 as the trunk 436 is placed in its desired position may be attributable to the elastic nature of the expandable portion 470. Thus, as the expandable portion 470 is placed over the wheel well 31 and expands, an internal tension within the expandable portion 470 may increase. Such tension may bias the trunk 436 out of position on the truck bed 16. However, the trunk 436 may be of sufficient weight to overcome such biasing force and maintain the trunk 436 in the desired position.

According to another embodiment, the expandable portion 470 may be fabricated from a non-elastic, yet expandable structure, such as a piece of preformed fabric, which is capable of being deployed over the wheel well 31. In this regard, the term "preformed" refers to the size and shape of the fabric as being similar to at least a portion of the wheel well 31 to allow the expandable portion 470 to extend over the wheel well 31 as the expandable portion 470 is placed over the wheel well 31. In this regard, the preformed fabric may be capable of extending over the wheel well 31 without increasing the tension within the preformed fabric.

While the collapsible folding truck trunk 436 depicted in FIG. 38 may be specifically designed to accommodate the wheel well 31 by including the expandable portion 470 to extend around the wheel well 31, it is contemplated that other embodiments may accommodate the wheel well 31 through other structural features. One such embodiment is depicted in FIG. 39, which includes a collapsible folding truck trunk 536 which may be formed without an expandable portion, yet may still allow the truck trunk 536 to be used without interference from the wheel well 31. In particular, the collapsible folding truck trunk 536 is designed to be sized and dimensioned to reside in the space between the wheel well 31 and the rear end 25 of the truck bed floor 23.

The collapsible folding truck trunk 536 is similar to the collapsible folding truck trunk 436 described above, except for the differences discussed below. Thus, the following discussion of the truck trunk 536 will be focused on the unique attributes of the collapsible folding truck trunk 536 relative to the truck trunk 436.

The collapsible folding truck trunk 536 may include a base wall 140 and a side wall 142 including side panels 552, 554, 556, 558. The collapsible folding truck trunk 536 may include a depth "d" defined as the distance between the side panels 552, 558, or in the case of a trunk 536 which does not include a side panel 558, the distance between the opposed lateral edges of the base wall 540. The collapsible folding truck trunk 536 may be sized and dimensioned such that the depth "d" of the collapsible folding truck trunk 536 is slightly less than or equal to the distance D between the wheel well 31 and the rear end 25 of the truck bed floor 23. The side panel 552 may abut against the wheel wells 31, which may prevent the trunk 536 from sliding toward the cab 38 during movement of the truck 18. In other words, in the deployed position, the collapsible folding truck trunk 536 may be positioned relative to the wheel well 31 such that the side panel 552 extends in a plane that does not intersect the wheel well 31, or that forms a tangent to the wheel well 31.

Therefore, when the collapsible folding truck trunk 536 is deployed, a user may place the collapsible folding truck trunk 536 within the truck bed 16 between the space between the wheel well 31 and the rear end 25 of the truck bed floor 23. As such, the wheel well 31 does not interfere with the collapsible folding truck trunk 536, and thus, the collapsible folding truck trunk 536 is capable of residing on the truck bed floor 23 with the base wall 140 being substantially parallel to the plane defined by the truck bed floor 23.

The collapsible folding truck trunk 436, 536 may include a cover 560 for enclosing items stored therein. The cover 560 may be engageable with the side wall 442, 542 to extend over the storage cavity. The cover 560 may be engageable with the side wall 442, 542 via a zipper, snaps, hook and loop fasteners (i.e., VELCRO™), etc. The cover 560 may include an upper panel 562 and/or a side panel 564. For instance, both the upper panel 562, 564 may be included to completely cover the openings of the truck trunk 436, 536. Alternatively, the cover 560 may include only the upper panel 562, thereby leaving a vertical opening in the trunk 436, 536. The vertical opening may be aligned with the tailgate 36 when the tailgate is in the raised position to cover the vertical opening. Furthermore, the vertical opening may be exposed or uncovered to provide access to the interior of the trunk when the tailgate 36 is in the lowered position. Alternatively, the cover 560 may only include the side panel 564, thereby leaving the upper portion of the trunk 436, 536 exposed.

It is contemplated that the truck trunk 436, 536, and the cover 560 may be formed from a waterproof material (e.g., plastic) or have a waterproof coating applied thereto to protect items contained therein from water damage, particularly when the trunk 436, 536 is used in the bed 16 of a pickup truck 18, and exposed to the natural elements.

Although the figures show various embodiments of a collapsible folding truck trunk used in the bed of a pickup truck, it is understood that the scope of the present disclosure is not limited thereto. For instance, it is contemplated that other versions of a collapsible folding trunk may be used in a sedan, station wagon, sport utility vehicle (SUV), hatchbacks, or other vehicles known in the art. Moreover, it is contemplated that various embodiments of the collapsible trunk may be used to accommodate not only wheel wells, but other structural features protruding into the storage space of a vehicle. Furthermore, the term "trunk" is used broadly herein to encompass any container for storing items.

Referring now to the drawings, a trunk 1130 for a bed 1110 of truck 1100 is shown in FIGS. 41-51. Trunk 1130 provides an isolated space within the bed 1110 of the truck 1110 in that the walls 1182, 1184, 1186, floor 1188, top cover 1132, and front cover 1134 provide a barrier from surfaces of the bed 1110 of the truck 1100 so that objects (e.g. a toolbox, tools) may be placed in the trunk 1130 and protected from potential dirt on the surfaces of the bed 1110 of the truck 1100. Trunk 1130 has three compartments: a central compartment 1152, a left compartment 1182, and a right compartment 1186 within which storage items, such as storage items 1160, 1162, and 1164, can be placed in various compartments of trunk 1130. While left compartment 1154 and right compartment 1156 can be accessed by opening top cover 1132, central compartment 1152 can be accessed either by opening top cover 1132 or by opening front cover 1134.

Figure 41:
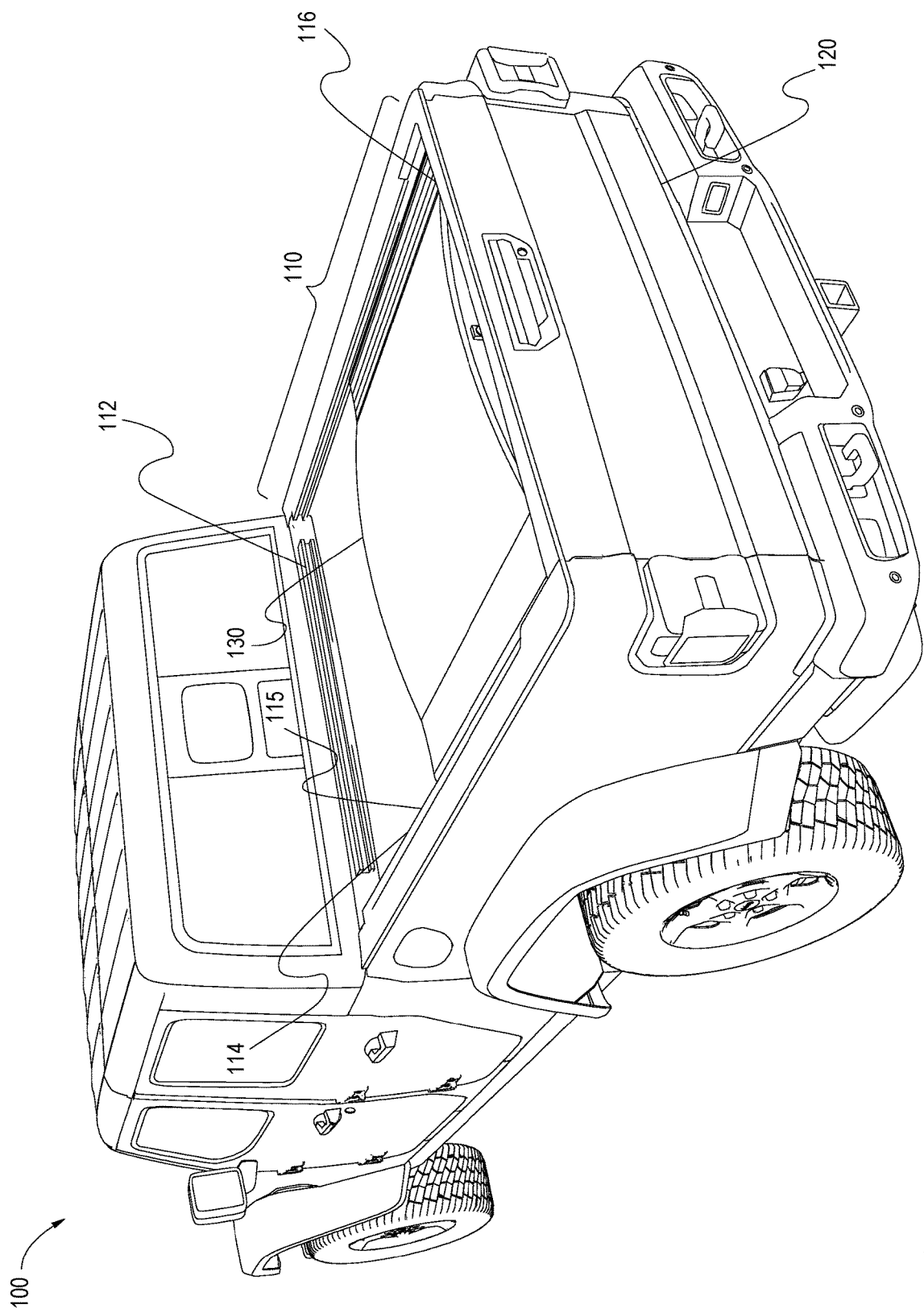
FIG. 41 illustrates a first embodiment of the trunk traversed to a back position within the truck bed.
Figure 42:
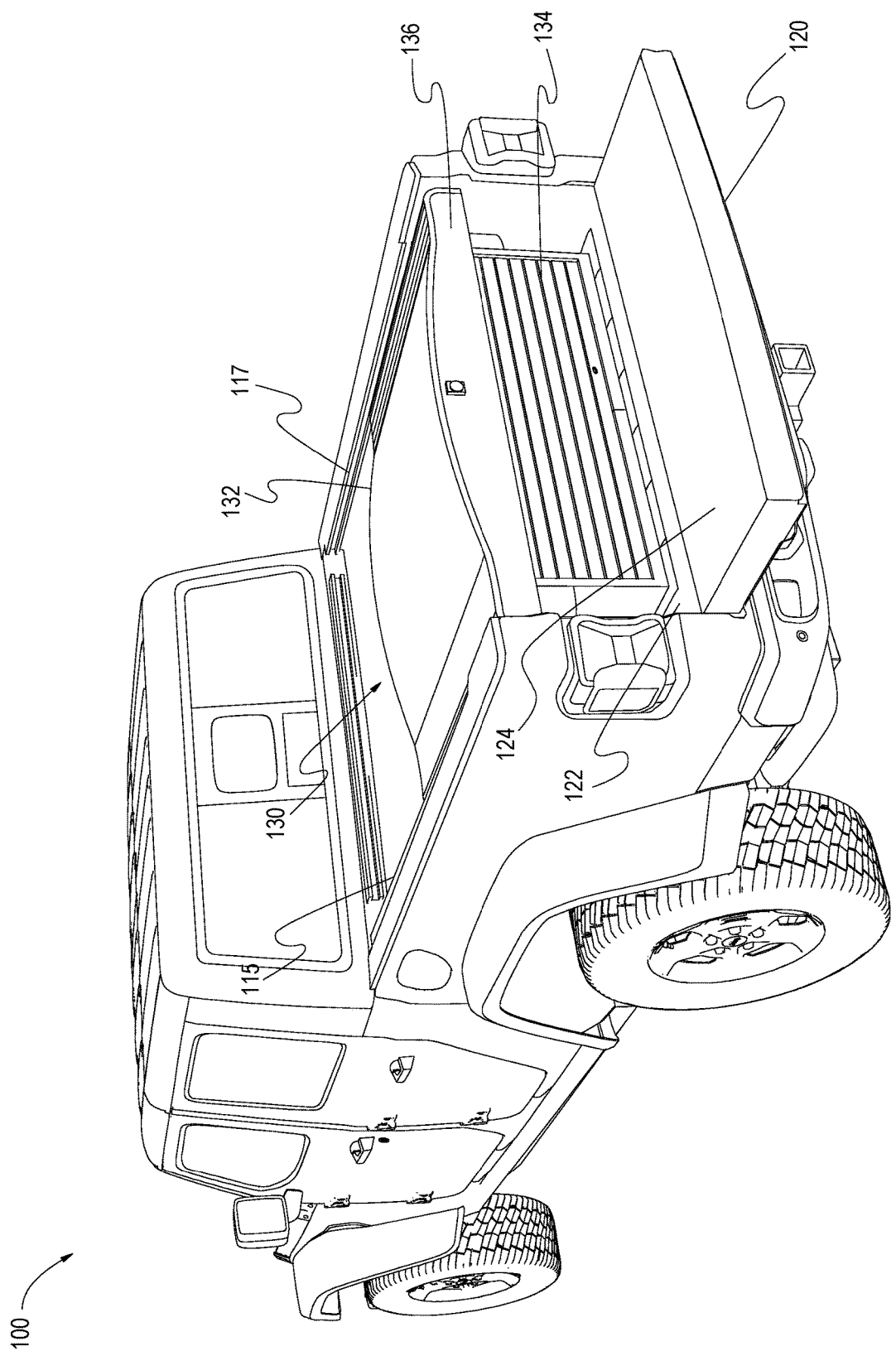
FIG. 42 illustrates the trunk with the truck tailgate in the open position.
Figure 49:
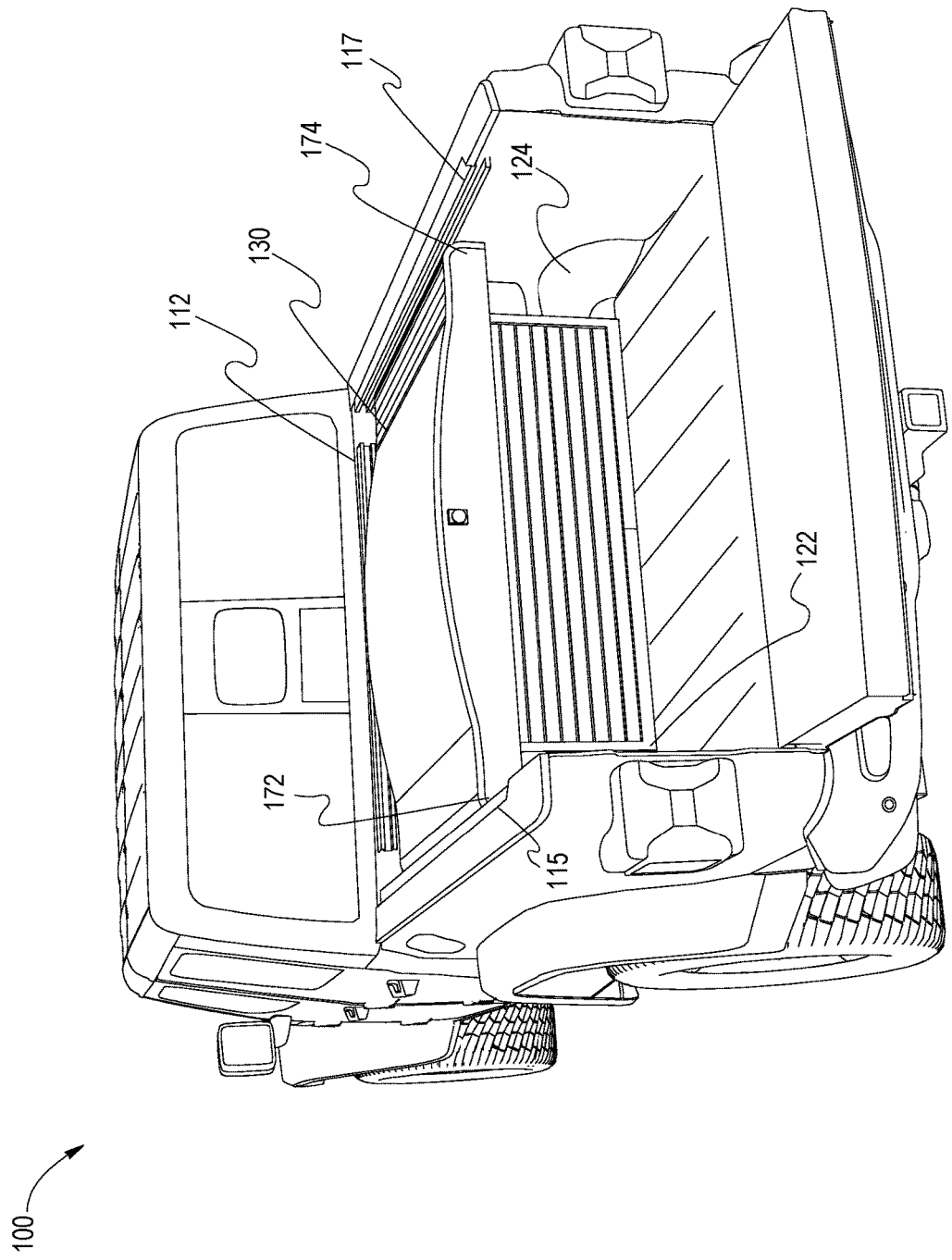
FIG. 49 illustrates the trunk traversed to a rear position juxtaposed next to the truck cabin.
Figure 50:
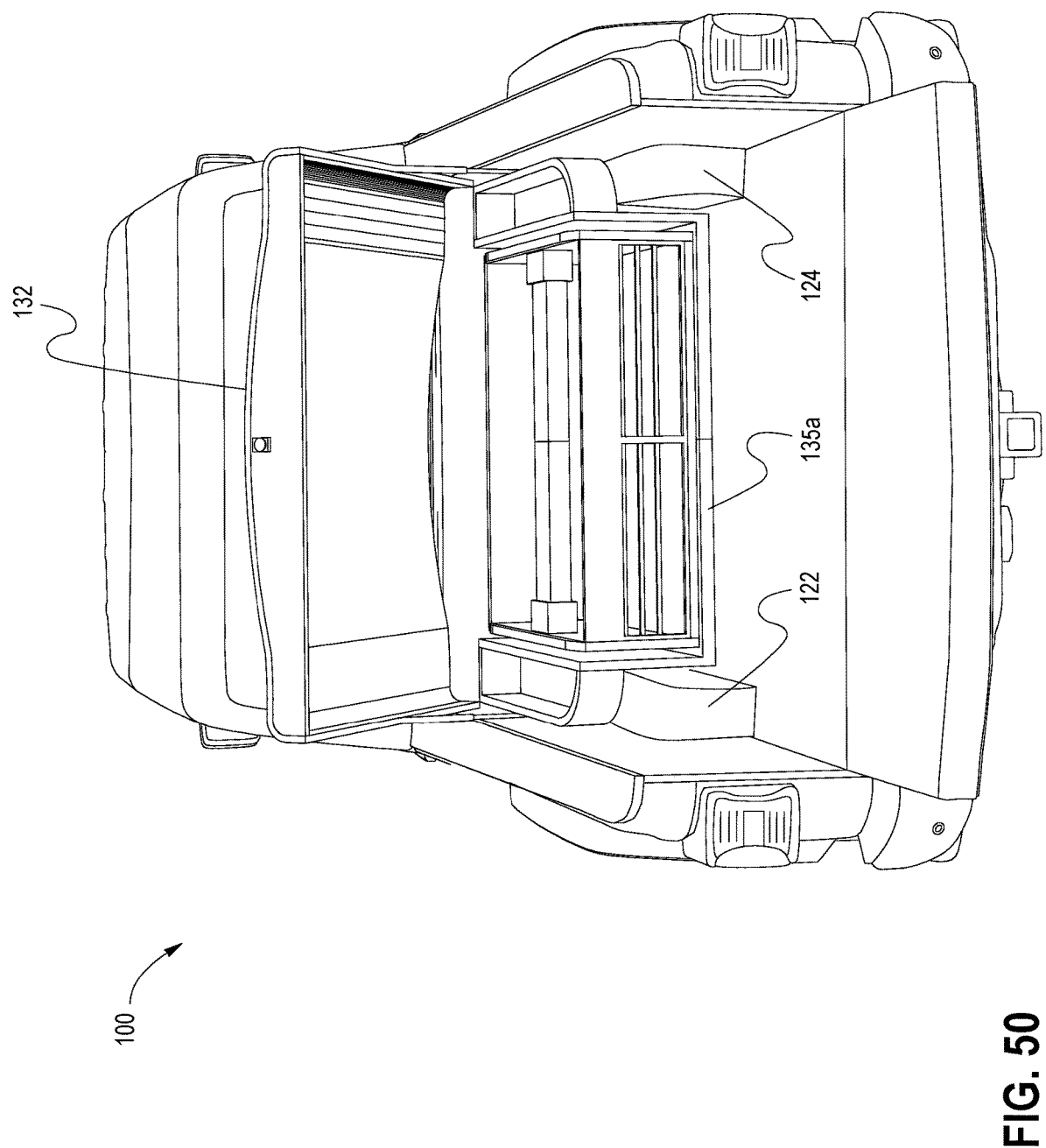
FIG. 50 illustrates the trunk with a top cover in an open position juxtaposed next to the truck cabin.
Figure 51:
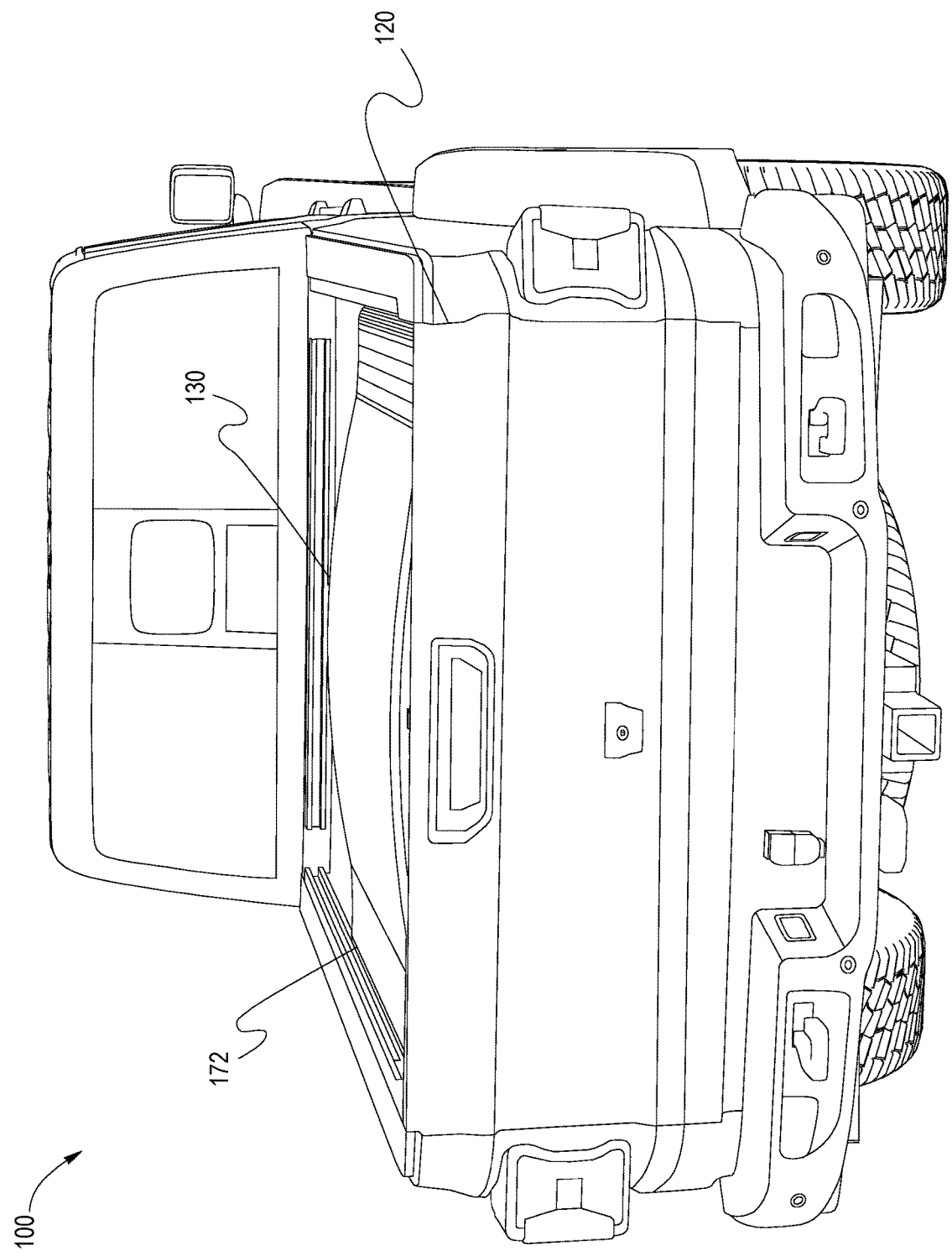
FIG. 51 illustrates the trunk with the top cover and the front cover in a closed position, traversed to a front position juxtaposed next to the closed truck tailgate.

Trunk 1130 may be positioned in any position along a length of truck bed 1110, such as a front bed position shown in FIGS. 41, 42, and 51, a front tailgate position shown in FIGS. 43-48, a rear bed position shown in FIGS. 49 and 50. The front bed position in FIGS. 41, 42, and 51 allows a user to access items in trunk 1130 when the tailgate 1120 is closed, the front tailgate position in FIGS. 43-48 allows a user to easily access items in trunk 1130 when the tailgate 1120 is open, and the rear bed position in FIGS. 49 and 50 allows a user to maximize space in truck bed 1110, both when the trunk top cover 1132 and front cover 1134 are closed, as shown in FIG. 49, and when the trunk top cover 1132 and front cover 1134 are open, as shown in FIG. 50. Left compartment 1154 has a height 1155 and right compartment 1156 has a height 1157 that are both less than the height 1153 of central compartment 1152. This allows trunk 1130 to be positioned in the rear bed position in FIGS. 49 and 50 while accommodating the extra space that wheel wells 1122 and 1124 take within bed 1110. The trunk 1130 may be easily moved between positions along the length of truck bed 1110 so that great strength is not required to reconfigure the position of the trunk 1130 within the truck bed 1110. Weaker people may reconfigure the trunk 1130 between the positions without assistance or help from another person. Preferably, a lock, such as locks 1172 and 1174, may be used to lock trunk 1130 in position within a position and prevent trunk 1130 from sliding when trunk 1100 is on the move, or is parked on a slope.

Figure 52:
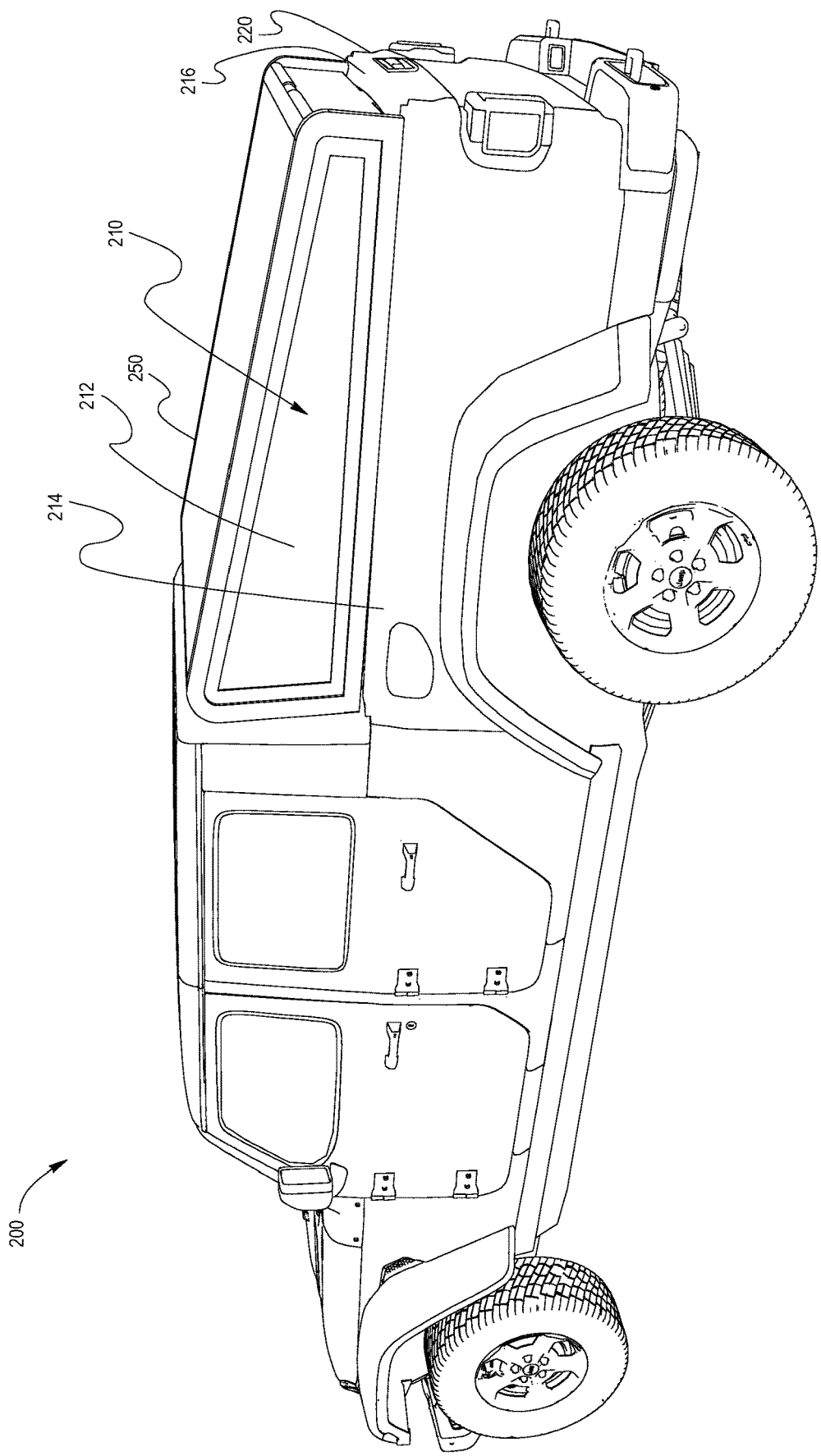
FIG. 52 illustrates a second embodiment of the trunk traversed to a back position within the truck bed, where the truck has a cover designed to cover the truck bed.
Figure 53:
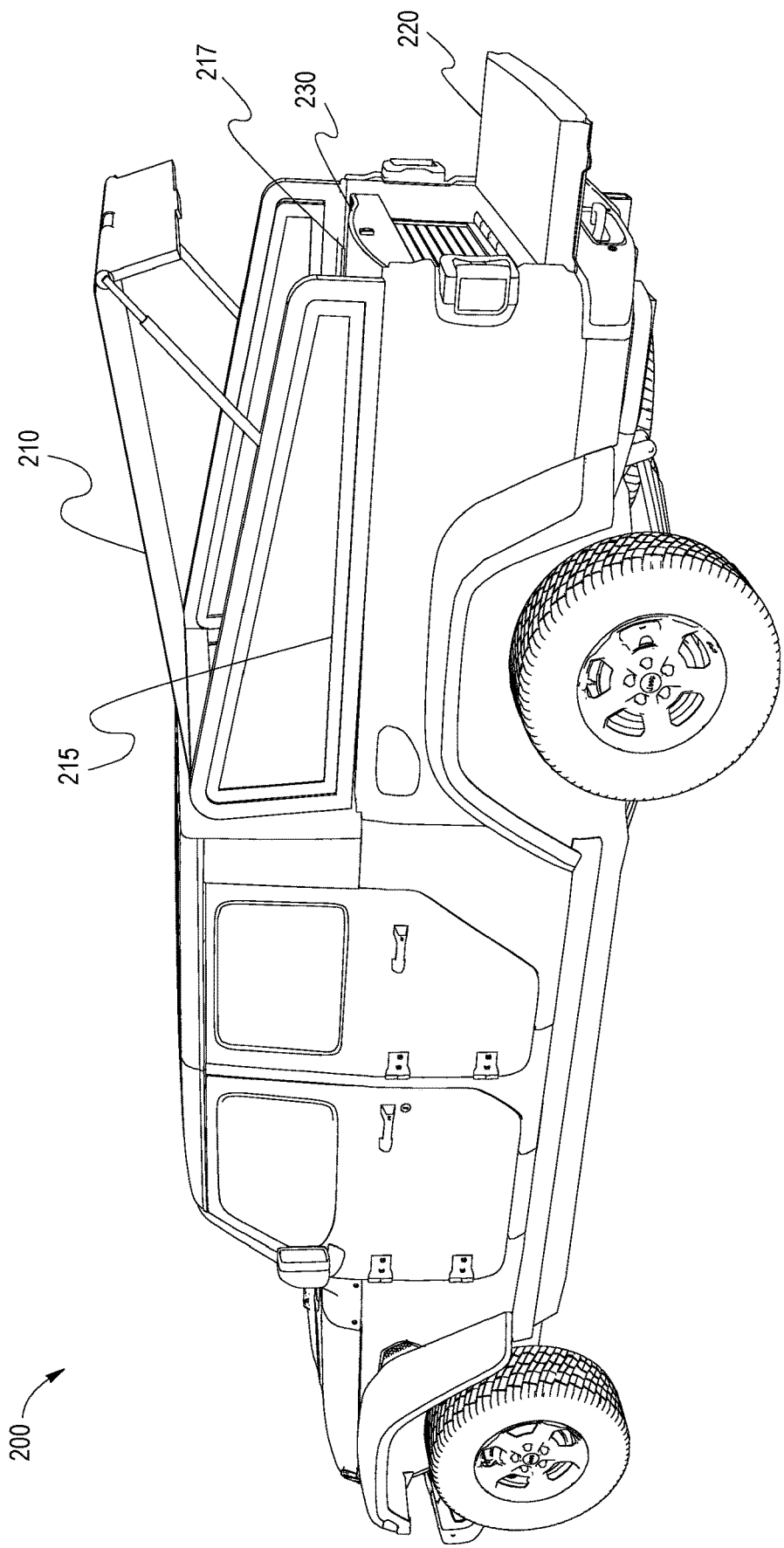
FIG. 53 illustrates the truck having an open cover and an open tailgate showing the trunk having a closed top cover and front cover.
Figure 54:
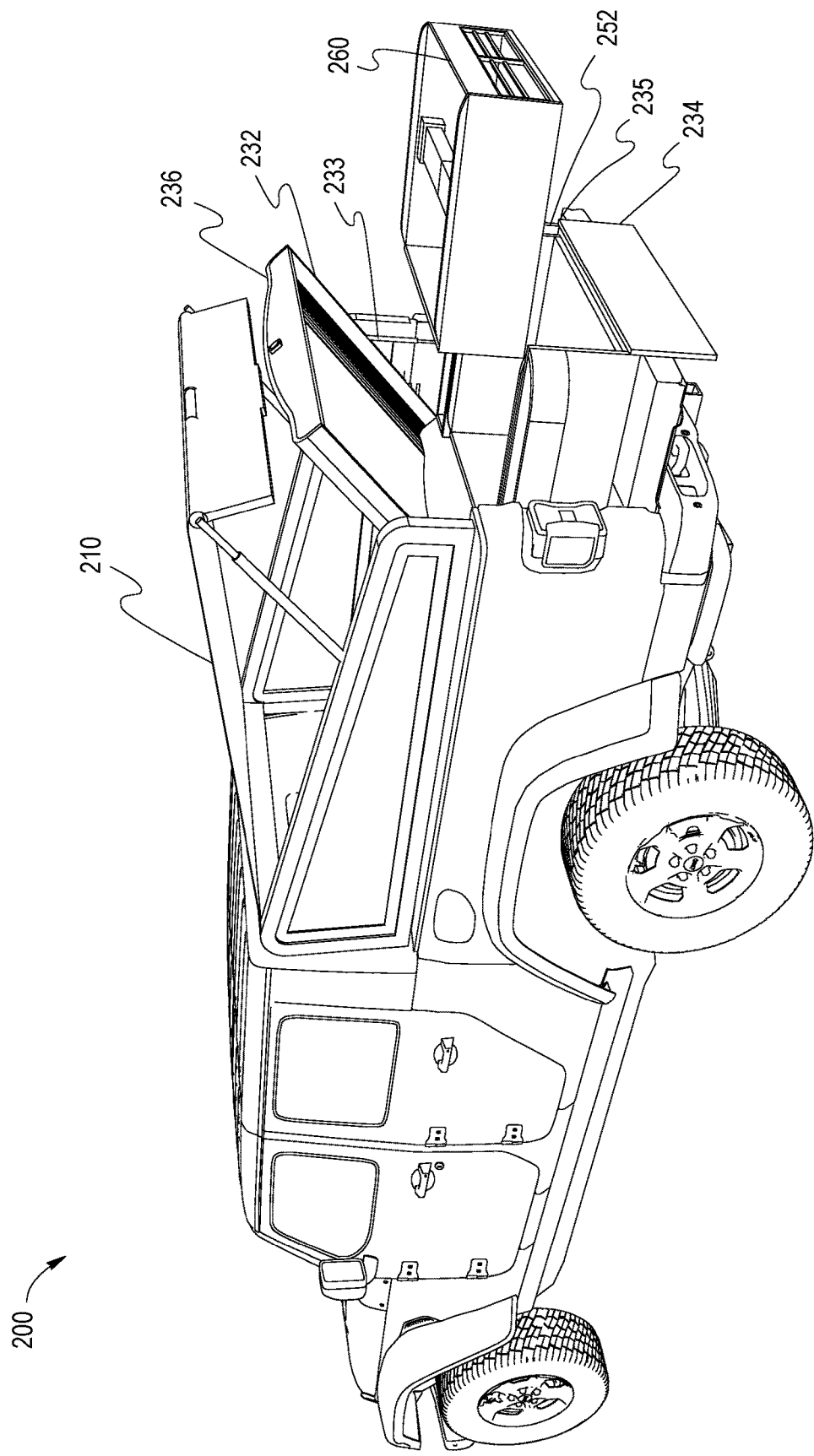
FIG. 54 illustrates the trunk traversed to a front position above the open truck tailgate having an open top cover and front cover with a storage item ready to be placed in the central compartment.
Figure 55:
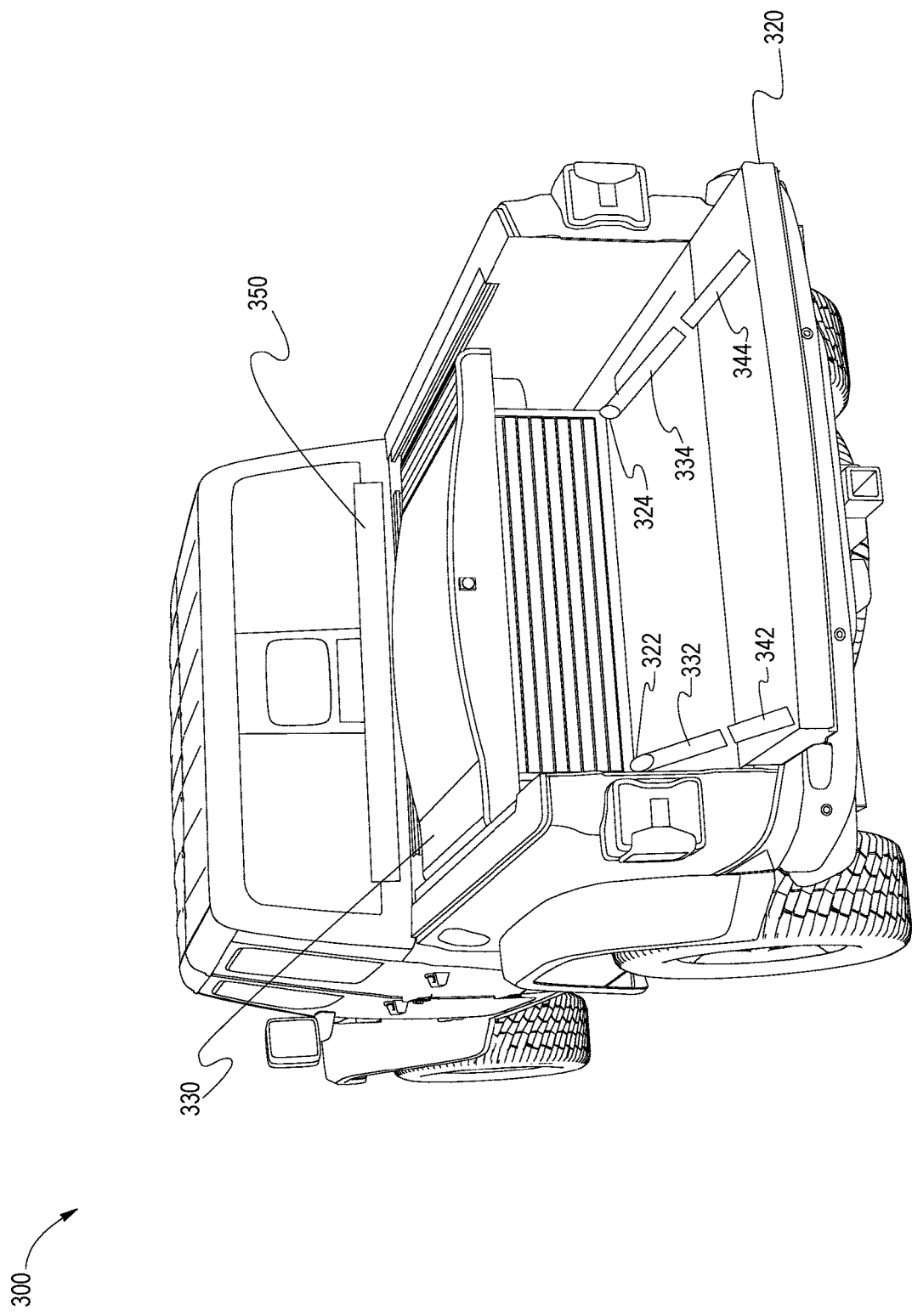
FIG. 55 illustrates a third embodiment of the trunk traversed to a back position within the truck bed having wheels resting in recessed tracks of the truck bed and coupled to a cable in the retracted position.
Figure 56:
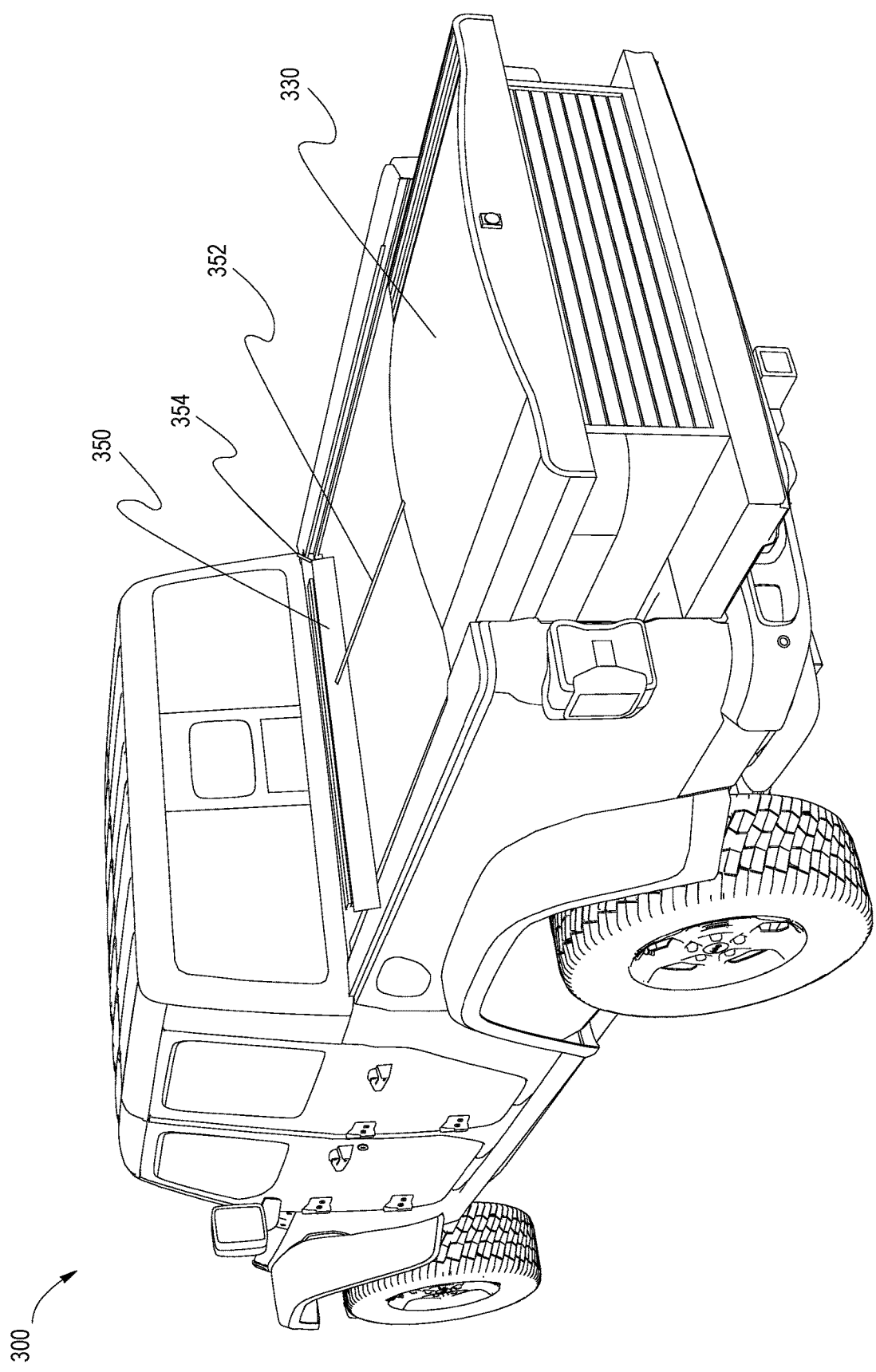
FIG. 56 illustrates the trunk traversed to a front position above the open tailgate, wherein the trunk has wheels resting in recessed tracks of the tailgate and coupled to the cable in an extended position.
Figure 57:
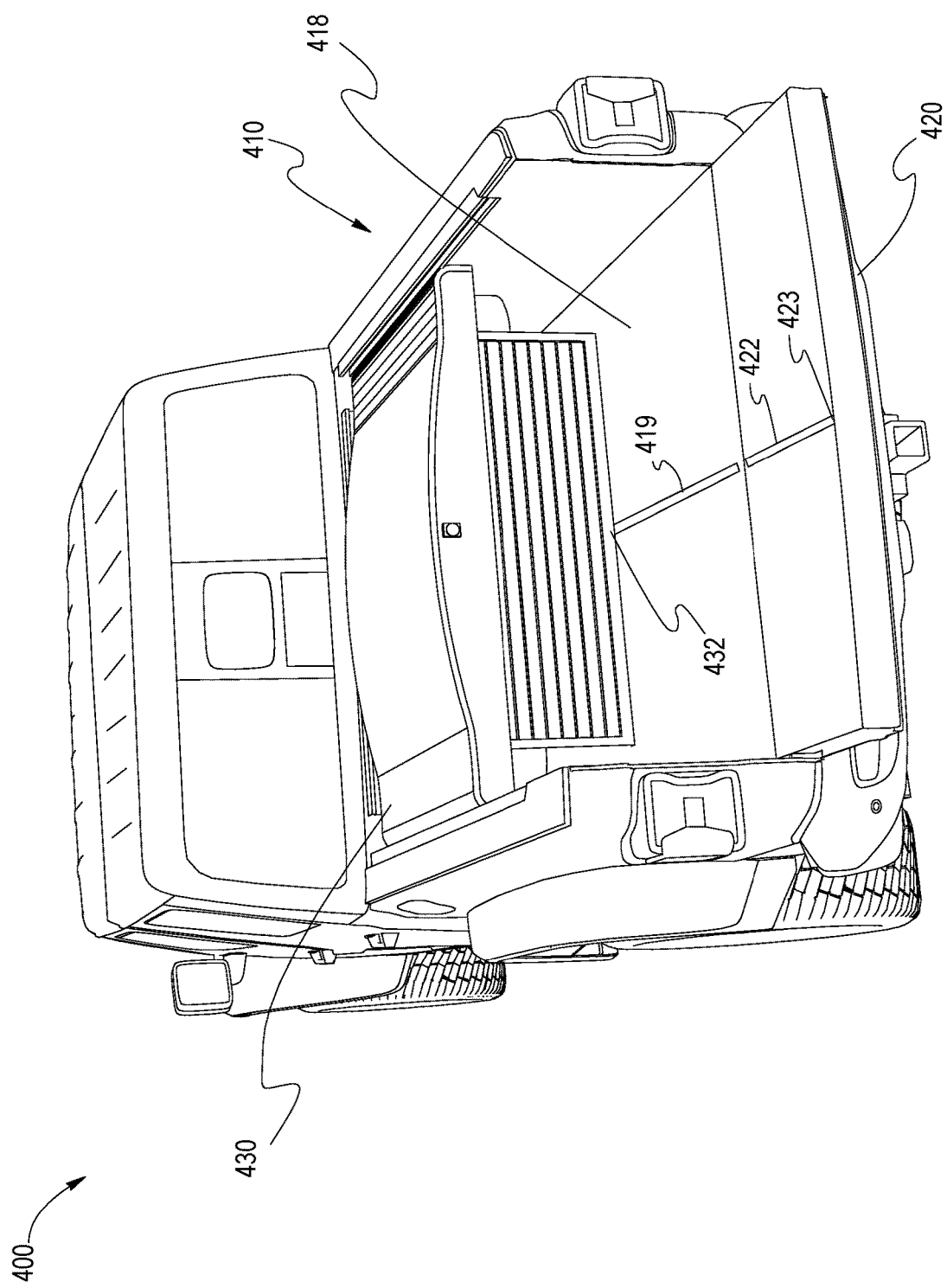
FIG. 57 illustrates a fourth embodiment of the trunk coupled to a truck bed rail that extends to align with a tailgate rail.

An inventive truck trunk may be configured to traverse the length of a truck bed in any suitable manner. For example, while a trunk 1130 for a bed 1110 of truck 1100 is shown in FIGS. 1-11, a trunk 1230 for a bed 1210 of truck 1200 is shown in FIGS. 52-54, a trunk 1330 for a bed 1310 of truck 1300 is shown in FIGS. 55-56, and a trunk 1430 for a bed 1410 of truck 1400 is shown in FIG. 57. The trunk 1130 in FIGS. 1-11 traverses along a length of truck bed 1110 via rails 1115 and 1117 along sidewalls 1114 and 1116 of bed 1110, the trunk 1230 in FIGS. 52-54 traverses along a length of truck bed 1210 via rails 1215 and 1217 along sidewalls 1214 and 1216 of bed 1210, the trunk 1330 in FIGS. 55-56 traverses along a length of truck bed 1310 via wheels 1322 and 1324 that roll along recessed tracks 1332, 1342 and recessed tracks 1334, 1344, respectively, and the trunk 1430 in FIG. 57 traverses along a length of truck bed 1410 via truck bed rail 1419 and tailgate rail 1422.

Referring now more particularly to FIGS. 41-51, truck 1100 has a truck bed 1110 having a cabin wall 1112, a driver side sidewall 1114, a passenger side sidewall 1116, a tailgate 1120, and a trunk 1130. The trunk 1130 is movable along a length of truck bed 1110 by sliding along driver side rail 1115 and passenger side rail 1117. Trunk 1130 has a side surface 1142 configured to engage with driver siderail 1115 and a side surface 1144 configured to engage with passenger siderail 1117. Driver siderail 1115 has a brake 1143 and passenger siderail 1117 has brake 1145 that prevent trunk 1130 from disengaging from the siderails to slide out of truck bed 1110 if trunk 1130 is pulled too far. Brakes 1143 and 1145 are preferably configured to be disengage able by applying pressure orthogonally to the length of the siderails to allow a user to slide trunk 1130 out of truck bed 1110. Driver siderail 1115 also has a locking mechanism 1172 and passenger siderail 1117 has a locking mechanism 1174 that act to prevent trunk 1130 from sliding to another position. For example, in FIG. 49, locking mechanisms 1172 and 1174 are shown as locking trunk 1130 in place while trunk 1130 is juxtaposed next to cabin wall 1112. While locking mechanisms 1172 and 1174 are shown as pins that are inserted into recesses of driver siderail 1115 and passenger siderail 1117, any suitable locking mechanisms could be used, for example rotating pinions or even zip ties, in alternative embodiments.

Figure 43:
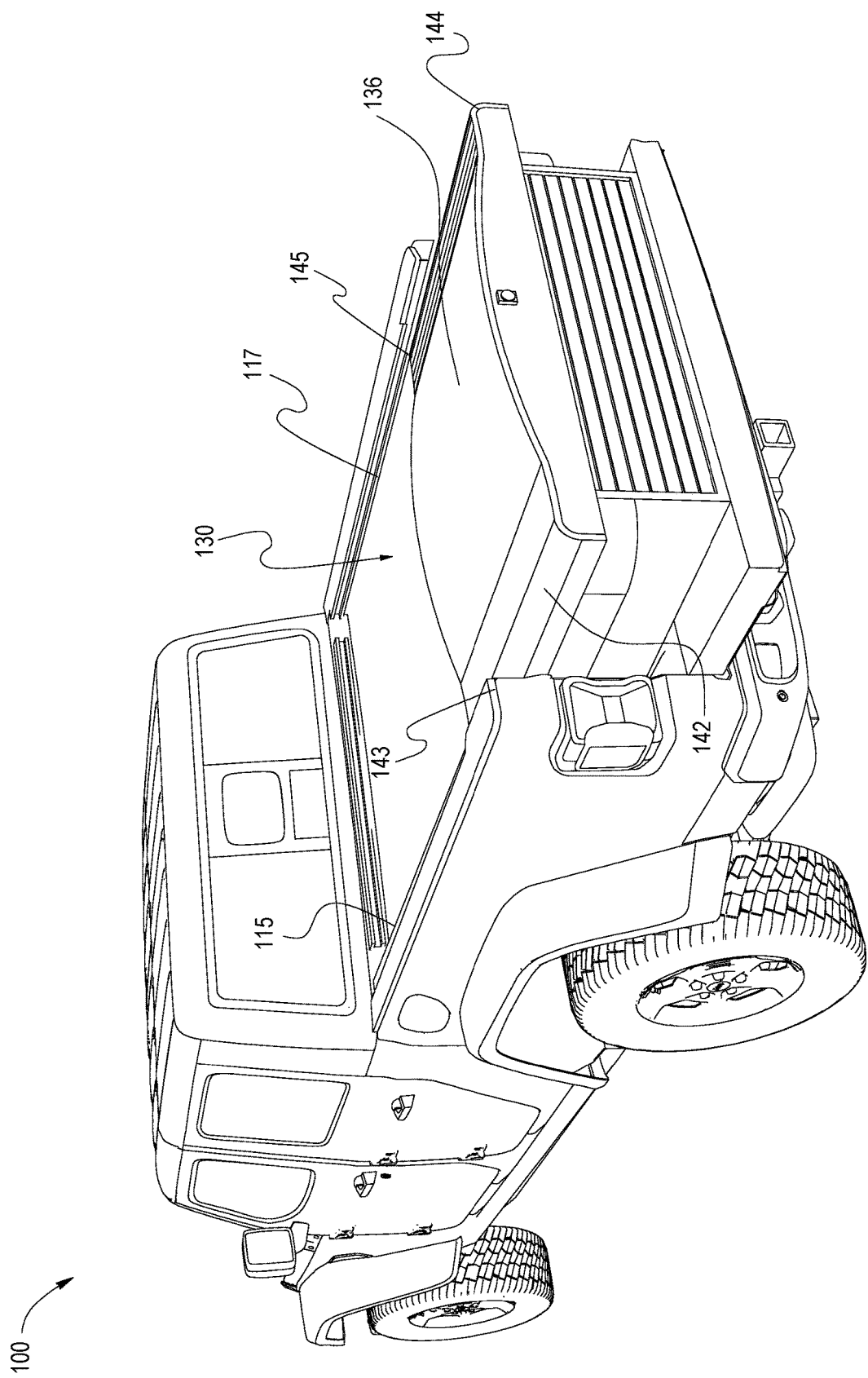
FIG. 43 illustrates the trunk traversed to a front position above the open truck tailgate.

Trunk 1130 may be disposed in any position along a length of truck bed 1110. For example in FIG. 41, truck 1130 is disposed in a front bed position with tailgate 1120 closed. In this configuration, a user could reach over an upper edge of tailgate 1120 to unlock lock 1136 (e.g. a rotating pinion lock) and open top cover 1132 of trunk 1130 to access any of cavities 1152, 1154, and/or 1156 of trunk 1130. A user could then open tailgate 1120 as shown in FIG. 42 to access the front cover 1134 of trunk 1130 or the top cover 1132 of trunk 1130. Once tailgate 1120 is open, a user could pull trunk 1130 further along siderails 1115 and 1117 such that at least a portion of trunk 1130 is positioned over tailgate 1120, as shown in FIG. 43. In FIG. 43, the front edge of trunk 1130 extends past the ends of driver siderail 1115 and passenger siderail 1117 while still remaining engaged to the siderails. This way, a user need not bend over to reach into the truck trunk 1130, as the access position is very easy to attain. The weight of trunk 1130 is supported by the upper surface 1124 of tailgate 1120, and the front edge of trunk 1130 is shown as substantially aligned with the front edge of tailgate 1120. In other embodiments, brakes 1143 and 1145 could be configured to ensure that the front edge of trunk 1130 stops just before the front edge of tailgate 1120, or just after hanging over the edge of the front edge of tailgate 1120 (e.g. within an inch or two).

Figure 44:
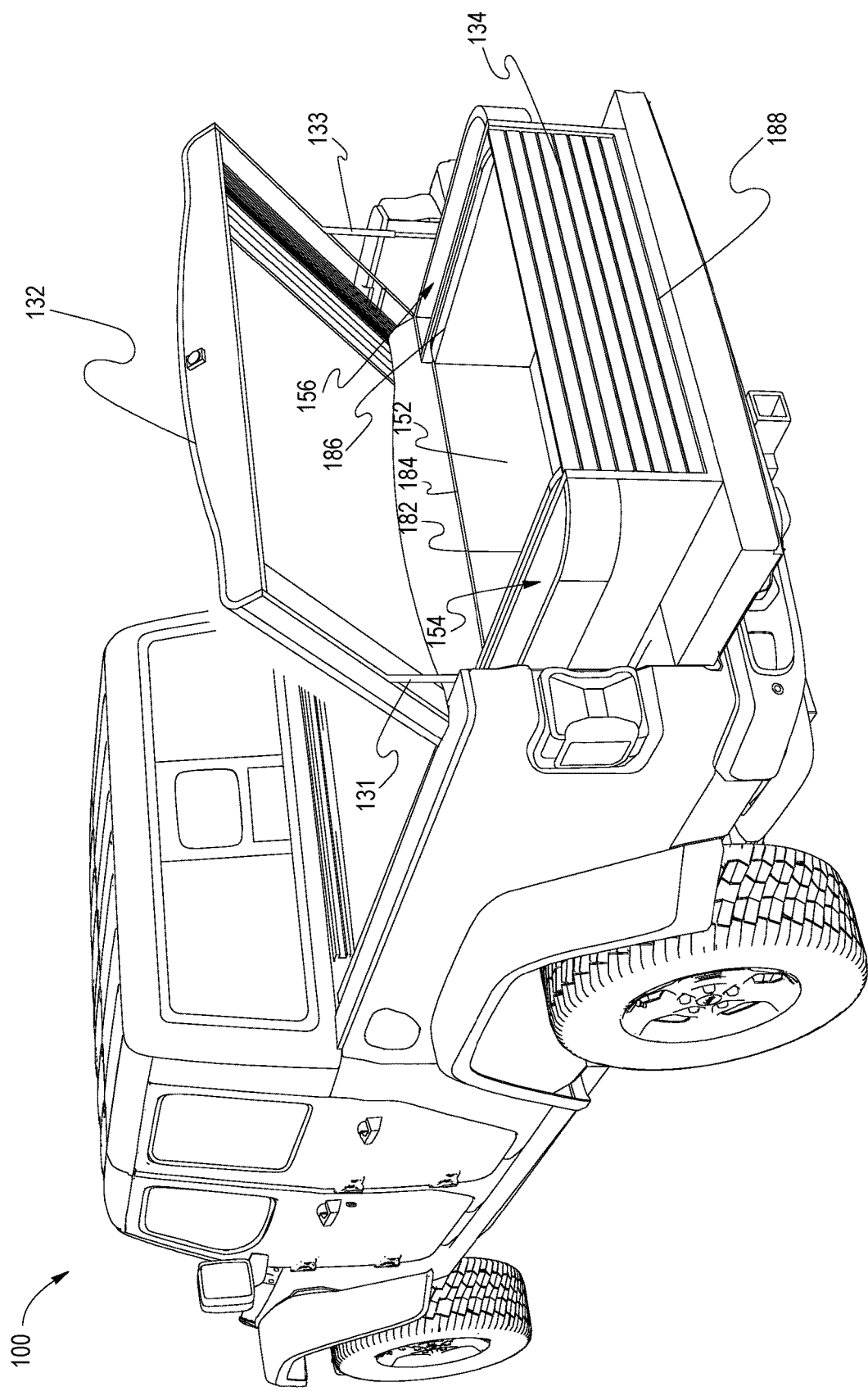
FIG. 44 illustrates the trunk with a top cover in an open position above the open truck tailgate.

As shown in FIG. 44, the top cover 1132 could be opened by pivoting along pivot point 1131 on pneumatic arm 1133. While top cover 1132 is shown as a door that pivots on a pivot point, any other suitable door could be used to cover an upper opening of trunk 1130. With top cover 1132 open, a user could access any of center compartment 1152, left compartment 1154, and/or right compartment 1156. Central compartment 1152 is defined by left wall 1182, rear wall 1184, and right wall 1186, which form natural partitions of trunk 1130.

Figure 45:
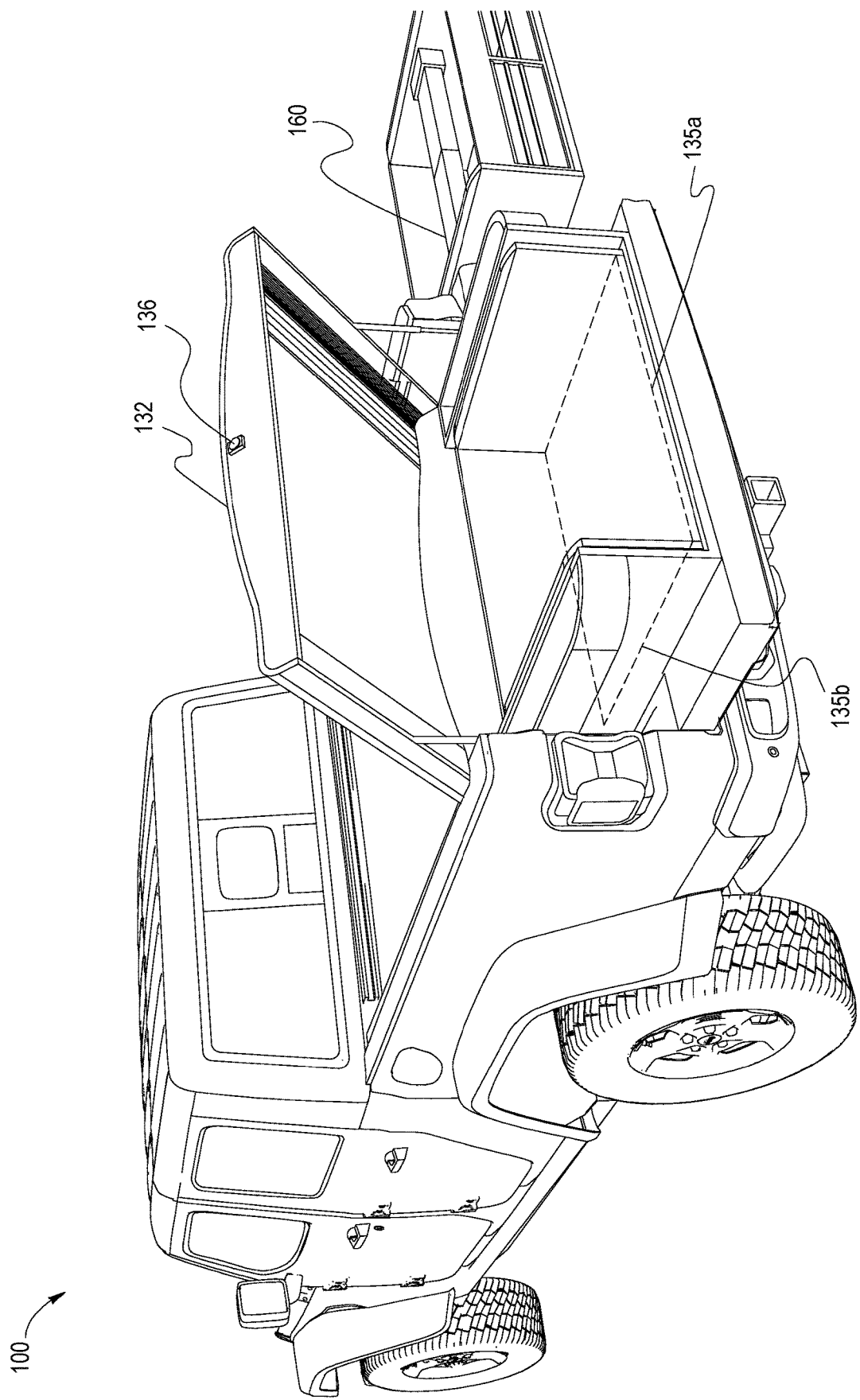
FIG. 45 illustrates the trunk with the top cover and the front cover in an open position.
Figure 46:
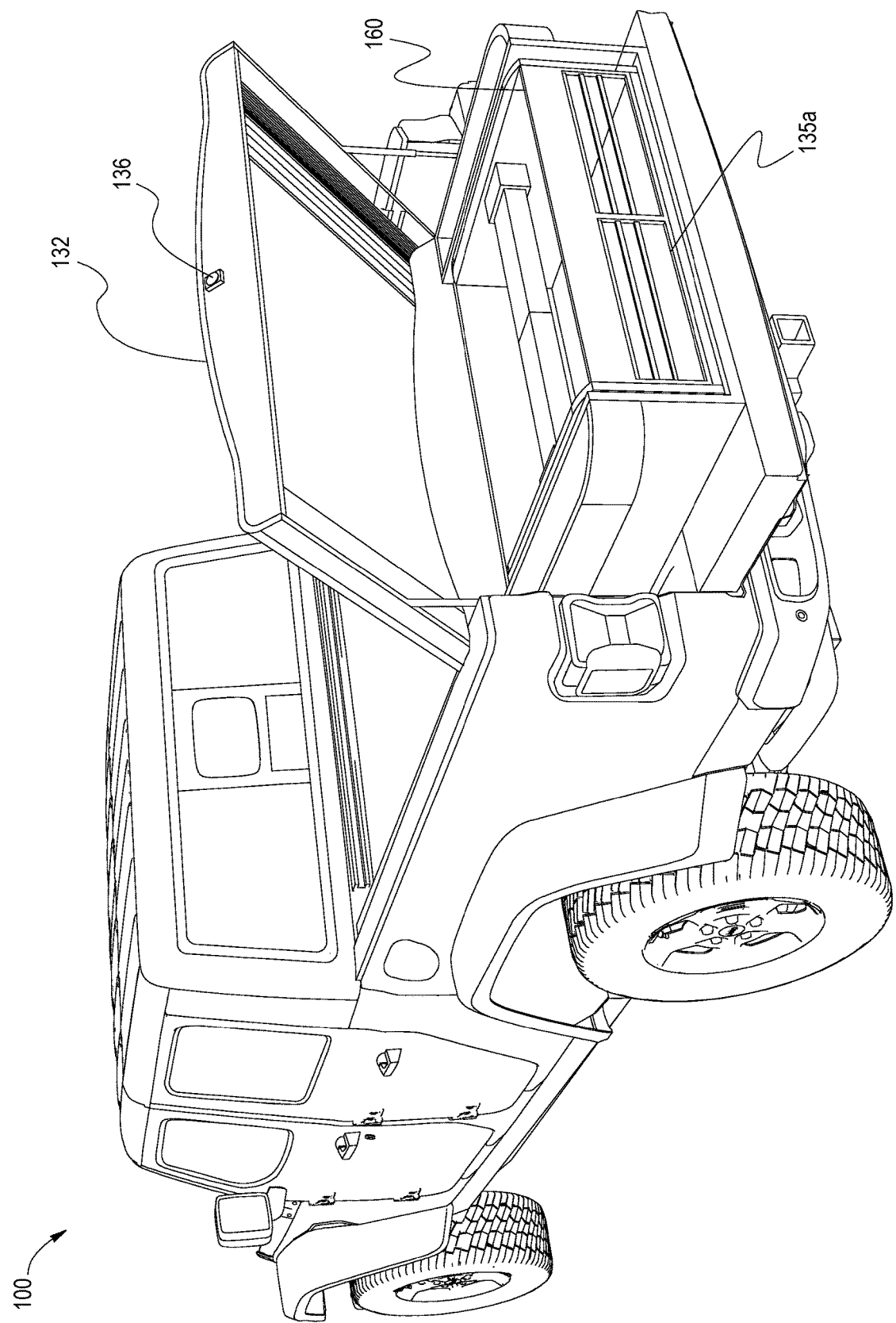
FIG. 46 illustrates the trunk with a storage item placed in the central compartment of the trunk.
Figure 47:
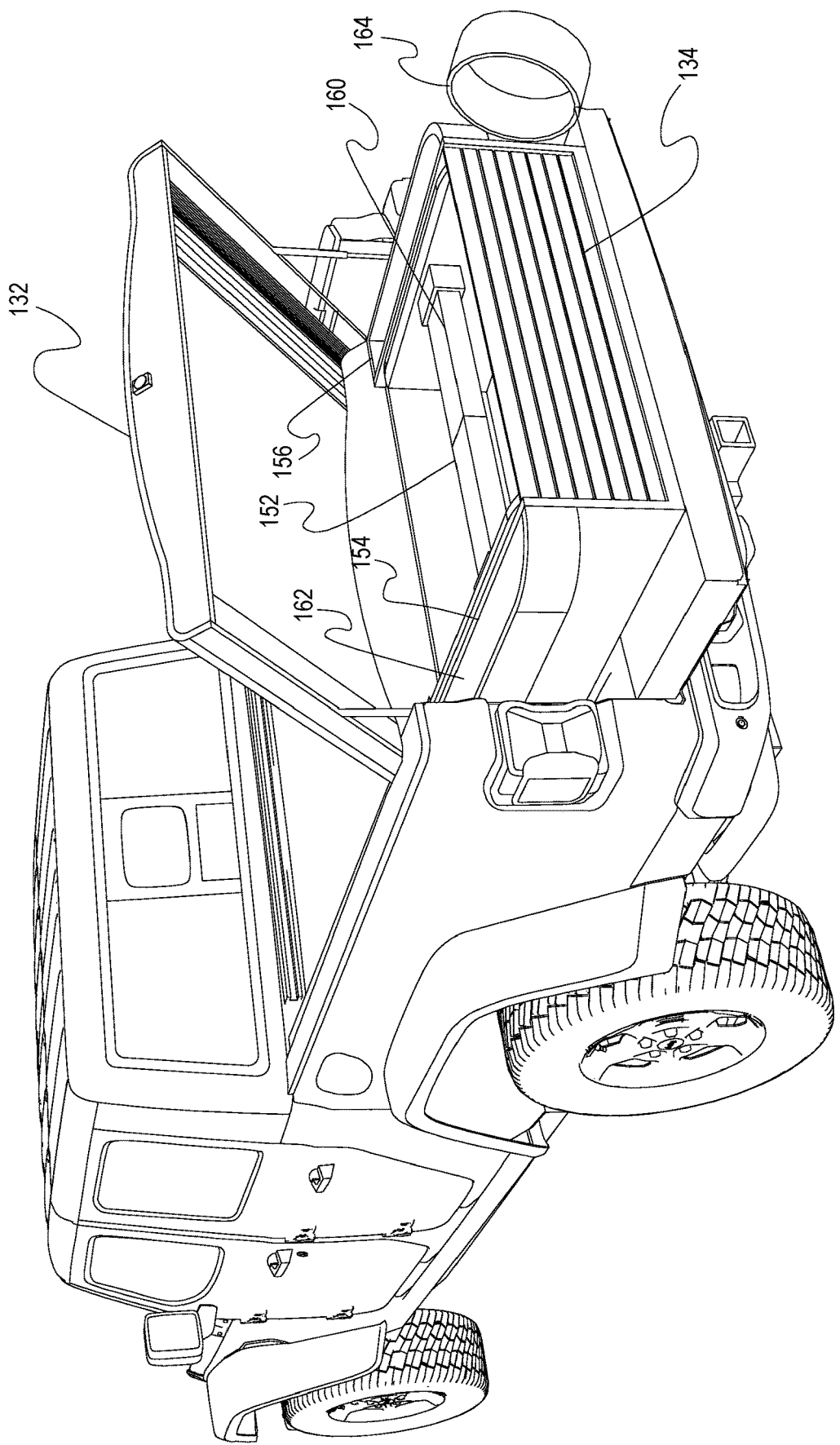
FIG. 47 illustrates the trunk with the top cover in an open position, the front cover in a closed position, and additional storage items placed in the left compartment.
Figure 48:
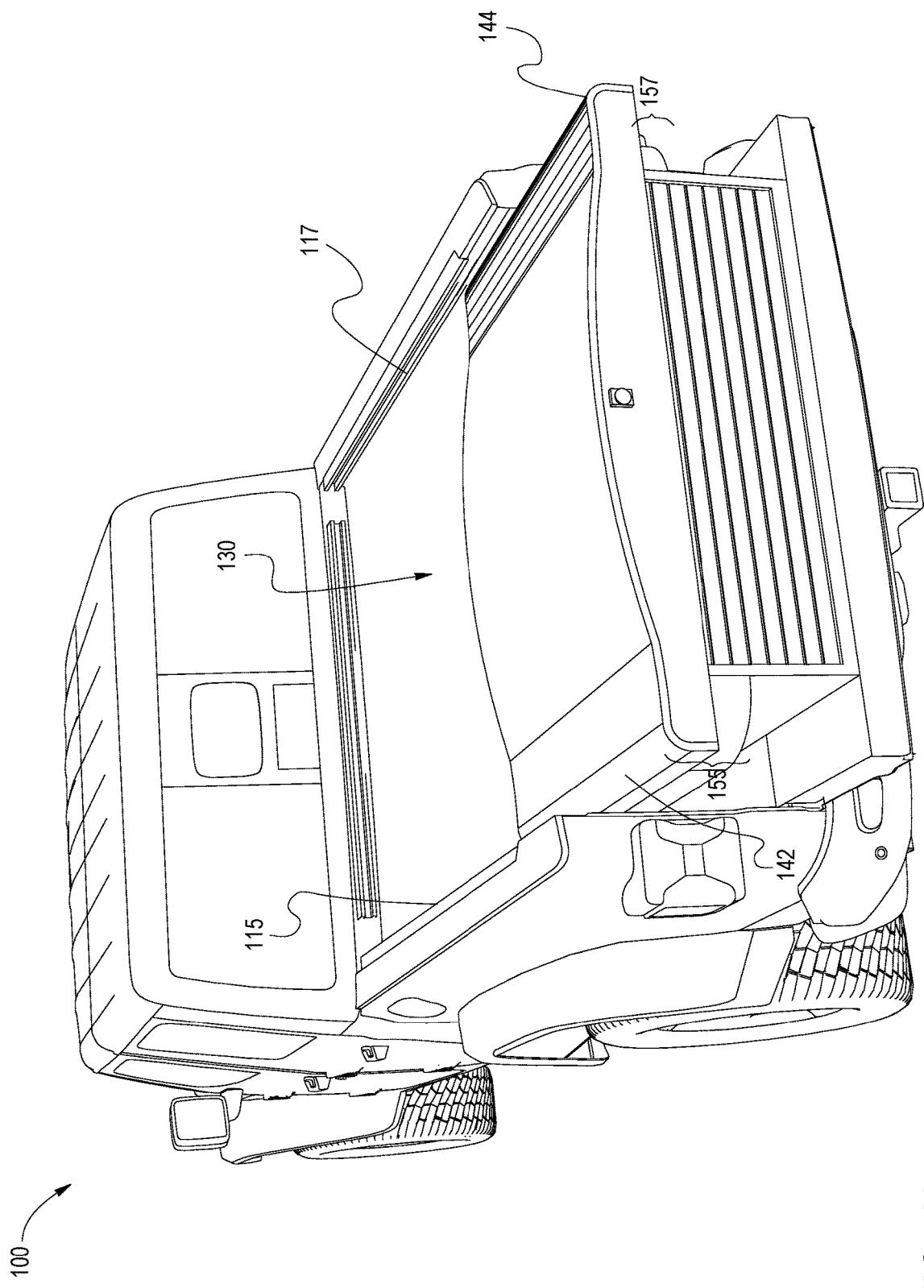
FIG. 48 illustrates the trunk with the trop and front covers in a closed position in a front position above the open truck tailgate.

As shown in FIG. 45, a user could also open front cover 1134, which enters recess 1135a to be stored within storage area 1135b within the bottom 1188 of trunk 1130. With both top cover 1132 and front cover 1134 open, a user could easily access central compartment 1152 from both the top and the front, allowing very large items, such as storage item 1160, to be placed in central compartment 1152. Smaller storage items, such as storage item 1162 and 1164 could be stored in the left and right compartments 1154 and 1156, as shown in FIG. 47.

Once items have been stored in trunk 1130, the top cover 1132 and front cover 1134 could be closed and lock 1136 could be engaged, and the trunk could be moved to a position away from the position above tailgate 1120, and towards a position above the floor of trunk 1130, such as the rear bed position shown in FIG. 49. Preferably, trunk 1130 is locked in place using locks 1172 and 1174. Trunk 1130 can be moved to be juxtaposed to cabin wall 1112 because left compartment 1154 has a height 1155, and right compartment 1156 has a height 1157, that positions the bottom of each compartment over the wheel walls 1122 and 1124, respectively. Contrasting the height 1155 of left compartment 1154 and the height 1157 of right compartment 1156 against the height 1153 of central compartment 1152 illustrates how space is maximized within trunk 1130 while still accommodating a trunk that can span the entire width of trunk bed 1110 and can be moved between the front bed position, the front tailgate position, and the rear bed positions.

As shown in FIG. 50, the top cover 1132 and front cover 1134 could be opened and the storage item 1160 removed to maximize the space used in truck bed 1110. This way, the truck bed could be used to near maximum efficacy without removing the trunk 1130 from the truck 1100.

Different truck bed covers could be used, as shown in FIGS. 52-54, where truck 1200 has truck bed cover 1250, covering truck bed 1210 having cabin wall 1212, driver sidewall 1214, and passenger sidewall 1216. Contemplated truck bed covers include flat cap tonneau covers, shells, roll-up tonneau covers, and fold-up tonneau covers. As shown, trunk 1230 slides along driver side rail 1215 and passenger side rail 1217 to slide over tailgate 1220 when open to be accessible in a front tailgate position. While top cover 1232 is similar to top cover 1132, front cover 1234 is a rotational cover that folds out to pivot over a front edge of tailgate 1220 when tailgate 1220 is in the open position. This not only shows how other door configurations could be used to allow a user to access central cavity 1252, but also shows how front cover 1234 could be used to hold and lock trunk 1230 in place until front cover 1234 is closed.

Alternative embodiments could be used to enable a trunk to slide and lock in place in different positions within a truck bed of a truck. For example, in FIGS. 55-56, a trunk 1330 has wheels 1322 and 1324 that roll within the truck bed recessed tracks 1332 and 1334, respectively, and over tailgate recessed tracks 1342 and 1344, respectively. Recessed track 1332 aligns with recessed track 1342 when tailgate 1320 is opened, and likewise recessed track 1334 aligns with recessed track 1344 when tailgate 1320 is opened. This allows a weight of the trunk 1330 to be transferred from the truck bed 1310 to the tailgate 1320 when trunk 1330 is moved from one position to another. While each wheel 1322 and 1324 could have their own brake and locking mechanism, trunk 1330 is preferably coupled to cable container 1350 via cable 1352, which locks trunk 1330 in place relative to the truck bed 1310 via lock 1354. When lock 1354 is engaged, cable 1352 is unable to extend and does not allow trunk 1330 to roll further distant from the truck cabin of truck 1300. When lock 1354 is disengaged, cable 1352 is able to extend or retract into cable container 1350 so that trunk 1330 could be relocated.

In FIG. 57, an alternative truck 1400 has a truck bed rail 1419 and a tailgate rail 1422 which are engageable to trunk bottom rail 1432 of trunk 1430. Truck bed rail 1419 is similar to siderails 1115 and 1117, but does not have a brake, as trunk bottom rail 1432 is configured to also engage tailgate rail 1422, which has a brake 1423 that prevents trunk 1430 from sliding off of an edge of tailgate 1420. Additional rails could be used in alternative embodiments.

The above description is given by way of example, and not limitation. Given the above disclosure, one skilled in the art could devise variations that are within the scope and spirit of the invention disclosed herein, including various ways of locking the lid 34. Further, the various features of the embodiments disclosed herein may be used alone, or in varying combinations with each other and are not intended to be limited to the specific combination described herein. Thus, the scope of the claims is not to be limited by the illustrated embodiments.

What is claimed is:

1. A truck with a truck bed having a trunk, the truck comprising:
   the truck bed defining a cabin wall, a passenger side sidewall, a driver side sidewall, a truck bed floor, and a tailgate pivotable between an opened position and a closed position;
   a container that is movable along a length of the bed between a first position and a second position and securable in at least one of the two positions, wherein a portion of the container is vertically located above the truck bed in the first position and vertically located above the tailgate in the second position;
   wherein a retractable cable coupled to the container that locks in place.

2. A truck with a truck bed having a trunk, the truck comprising:
   the truck bed defining a cabin wall, a passenger side sidewall, a driver side sidewall, a truck bed floor, and a tailgate pivotable between an opened position and a closed position;
   a container that is movable along a length of the bed between a first position and a second position and securable in at least one of the two positions, wherein a portion of the container is vertically located above the truck bed in the first position and vertically located above the tailgate in the second position;
   wherein a weight of the container is supported by the truck bed floor in the first position and the weight of the container is supported by the tailgate in the second position.

3. A truck with a truck bed having a trunk, the truck comprising:
   the truck bed defining a cabin wall, a passenger side sidewall, a driver side sidewall, a truck bed floor, and a tailgate pivotable between an opened position and a closed position;
   a container that is movable along a length of the bed between a first position and a second position and securable in at least one of the two positions, wherein a portion of the container is vertically located above the truck bed in the first position and vertically located above the tailgate in the second position;
   a driver side rail attached to and extending horizontally along the driver sidewall; and
   a passenger side rail attached to and extending horizontally along the passenger sidewall,
   wherein the container extends across a width of the truck bed and is slideably coupled to the driver side and passenger side rails to slide between the first position and the second position, and wherein a front side of the container extends past an end of the driver side rail and an end of the passenger side rail when placed in the second position.

4. The truck of claim 3, further comprising a barrier that prevents the container from sliding off of an end of at least one of the driver side and passenger side rails.

5. The truck of claim 1, further comprising:
a truck bed rail attached to and extending horizontally along the truck bed floor,
wherein the container is slideably coupled to the truck bed rail to slide between the first position and the second position, and
wherein a front side of the container extends past an end of the truck bed rail and when placed in the second position.

6. A truck with a truck bed having a trunk, the truck comprising:
the truck bed defining a cabin wall, a passenger side sidewall, a driver side sidewall, a truck bed floor, and a tailgate pivotable between an opened position and a closed position;
a container that is movable along a length of the bed between a first position and a second position and securable in at least one of the two positions, wherein a portion of the container is vertically located above the truck bed in the first position and vertically located above the tailgate in the second position;
at least two truck bed recessed tracks extending horizontally along the truck bed floor;
at least two tailgate recessed tracks extending horizontally along the tailgate; and
at least two sets of wheels extending from a lower edge of the container to roll within the at least two truck bed recessed tracks and the at least two tailgate recessed tracks between the first position and the second position.

7. The truck of claim 6, further comprising a retractable cable coupled to the container having a brake that prevents the container from rolling off of an end of the tailgate.

8. The truck of claim 1, wherein the container is fabricated from a rigid material, resilient material, or combinations thereof.

9. The truck of claim 1, further comprising a top cover that covers an upper opening of a central cavity of the container when closed and operates by at least one of:
(a) rotating up to an opened position and down to a closed position; and
(b) rolling up to the opened position and out to the closed position.

10. The truck of claim 1, wherein the container further comprises a left cavity and a right cavity, wherein the top cover covers each of the central cavity, left cavity, and right cavity of the container when closed.

11. A truck with a truck bed having a trunk, the truck comprising:
the truck bed defining a cabin wall, a passenger side sidewall, a driver side sidewall, a truck bed floor, and a tailgate pivotable between an opened position and a closed position;
a container that is movable along a length of the bed between a first position and a second position and securable in at least one of the two positions, wherein a portion of the container is vertically located above the truck bed in the first position and vertically located above the tailgate in the second position;

wherein the container further comprises a left cavity and a right cavity, wherein the top cover covers each of the central cavity, left cavity, and right cavity of the container when closed;
wherein the left cavity comprises a shorter height than the central cavity to be positioned over a wheel well of the truck bed.

12. A truck with a truck bed having a trunk, the truck comprising:
the truck bed defining a cabin wall, a passenger side sidewall, a driver side sidewall, a truck bed floor, and a tailgate pivotable between an opened position and a closed position;
a container that is movable along a length of the bed between a first position and a second position and securable in at least one of the two positions, wherein a portion of the container is vertically located above the truck bed in the first position and vertically located above the tailgate in the second position;
a top cover that covers an upper opening of a central cavity of the container when closed and operates by at least one of:
(a) rotating up to an opened position and down to a closed position; and
(b) rolling up to the opened position and out to the closed position;
a front cover that covers a front opening of the central cavity of the container when closed and operates by at least one of:
(a) rotating down to an opened position and up to a closed position; and
(b) rolling down to the opened position and up to the closed position.

13. The truck of claim 12, wherein the front cover rotates down to cover a front edge of the tailgate to the opened position.

14. The truck of claim 12,
wherein the container further comprises a left cavity and a right cavity,
wherein the top cover covers each of the central cavity, left cavity, and right cavity of the container when closed, and
wherein the front cover covers only the central cavity of the container when closed.

15. A truck with a truck bed having a trunk, the truck comprising:
the truck bed defining a cabin wall, a passenger side sidewall, a driver side sidewall, a truck bed floor, and a tailgate pivotable between an opened position and a closed position;
a container that is movable along a length of the bed between a first position and a second position and securable in at least one of the two positions, wherein a portion of the container is vertically located above the truck bed in the first position and vertically located above the tailgate in the second position;
a top cover that covers an upper opening of a central cavity of the container when closed and operates by at least one of:
(a) rotating up to an opened position and down to a closed position; and
(b) rolling up to the opened position and out to the closed position;
wherein the top cover comprises a tonneau cover.

* * * * *